(12) United States Patent
Ross et al.

(10) Patent No.: US 11,204,976 B2
(45) Date of Patent: Dec. 21, 2021

(54) EXPANDED KERNEL GENERATION

(71) Applicant: Groq, Inc., Mountain View, CA (US)

(72) Inventors: Jonathan Alexander Ross, Palo Alto, CA (US); Tom Hawkins, Bellingham, WA (US); Gregory Michael Thorson, Palo Alto, CA (US); Matt Boyd, Portland, OR (US)

(73) Assignee: Groq, Inc., Mountain View, CA (US)

( * ) Notice: Subject to any disclaimer, the term of this patent is extended or adjusted under 35 U.S.C. 154(b) by 113 days.

(21) Appl. No.: 16/686,864

(22) Filed: Nov. 18, 2019

(65) Prior Publication Data
US 2020/0159814 A1    May 21, 2020

Related U.S. Application Data

(60) Provisional application No. 62/769,444, filed on Nov. 19, 2018.

(51) Int. Cl.
*G06F 17/16* (2006.01)
*G06N 20/10* (2019.01)
(Continued)

(52) U.S. Cl.
CPC ............ *G06F 17/16* (2013.01); *G06F 7/5443* (2013.01); *G06F 7/76* (2013.01); *G06F 9/544* (2013.01);
(Continued)

(58) Field of Classification Search
CPC .......... G06F 17/16; G06F 7/76; G06F 7/5443; G06F 17/153; G06N 20/10; G06N 7/00;
(Continued)

(56) References Cited

U.S. PATENT DOCUMENTS 9,805,303 B2 *  10/2017  Ross ..................... G06N 3/063
2020/0117993 A1 *  4/2020  Martinez-Canales .......................
G06K 9/6262

FOREIGN PATENT DOCUMENTS

EP        3343463 A1    7/2018
WO   WO 2016/186826 A1   11/2016

OTHER PUBLICATIONS

PCT International Search Report and Written Opinion, PCT Application No. PCT/US2019/062303, dated Mar. 25, 2020, 18 pages.

* cited by examiner

*Primary Examiner* — Tan V Mai
(74) *Attorney, Agent, or Firm* — Fenwick & West LLP

(57) ABSTRACT

A method comprises receiving a kernel used to convolve with an input tensor. For a first dimension of the kernel, a square block of values for each single dimensional vector of the kernel that includes all rotations of that single dimensional vector is generated. For each additional dimension of the kernel, group blocks of an immediately preceding dimension into sets of blocks, each set of blocks including blocks of the immediately preceding dimension that are aligned along a vector that is parallel to the axis of the dimension; and generate, for the additional dimension, one or more blocks of values, each block including all rotations of blocks within each of the sets of blocks of the immediately preceding dimension. The block of values corresponding to the last dimension in the additional dimensions of the kernel is output as the expanded kernel.

20 Claims, 41 Drawing Sheets

(51) Int. Cl.
*G06N 3/08* (2006.01)
*G06F 7/76* (2006.01)
*G06N 7/00* (2006.01)
*G06F 7/544* (2006.01)
*G06F 9/54* (2006.01)
*G06K 9/62* (2006.01)
*G06F 17/15* (2006.01)
*G06N 3/04* (2006.01)

(52) U.S. Cl.
CPC ......... *G06F 17/153* (2013.01); *G06K 9/6251* (2013.01); *G06N 3/04* (2013.01); *G06N 3/08* (2013.01); *G06N 7/00* (2013.01); *G06N 20/10* (2019.01)

(58) Field of Classification Search
CPC ........ G06N 3/04; G06N 3/0454; G06N 3/063; G06K 9/6251; G06K 9/627; G06K 9/00973; G06K 9/4628
USPC ........................................................ 708/200
See application file for complete search history.

501 - Receive input and pad based on kernel size
502 – Tile input into tiles with size equal to kernel size
FIG. 5A

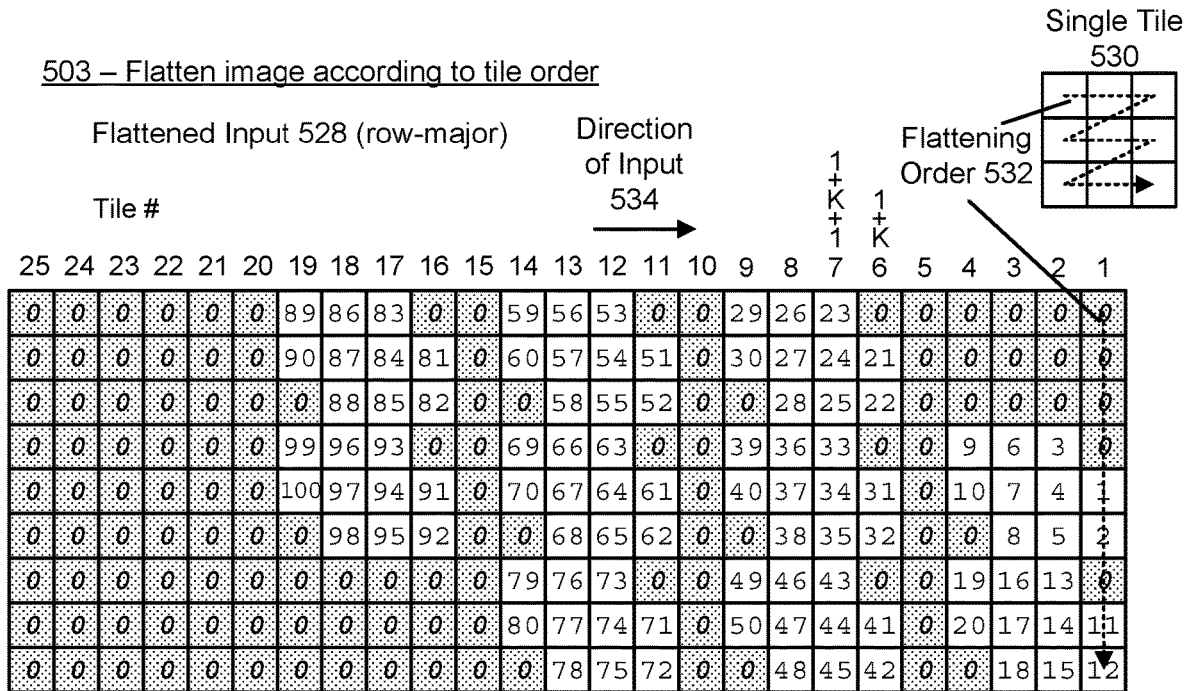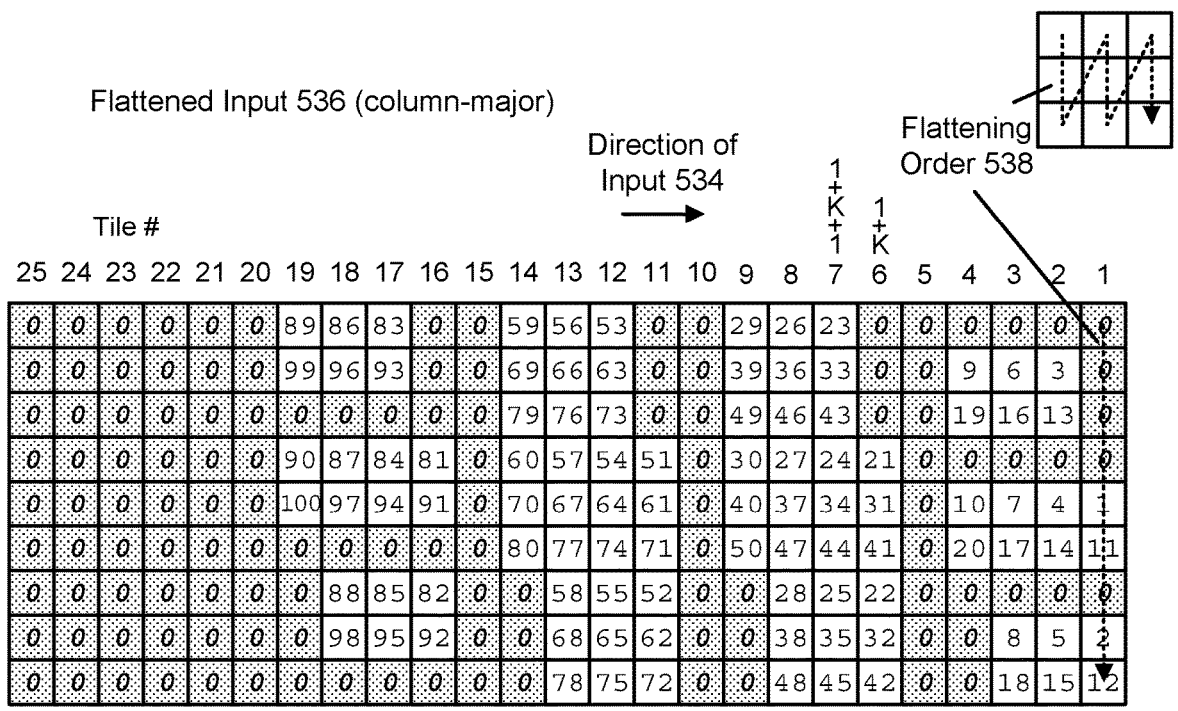
FIG. 5B

504 – Tile additional input channels with first flattened input
Kernel 542 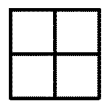
Input Channel 540A 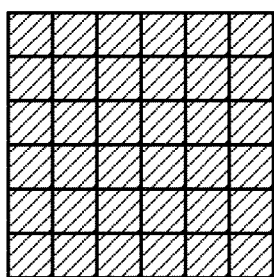
Input Channel 540B 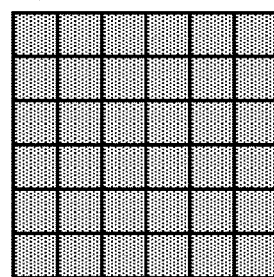
Input Channel 540N 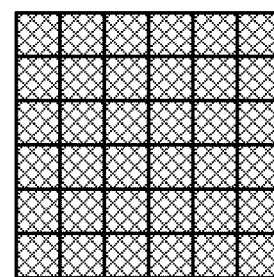
Flattened Input Channel 544A 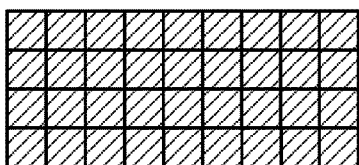
Flattened Input Channel 544B 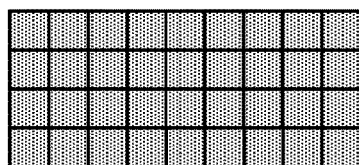
Flattened Input Channel 544N 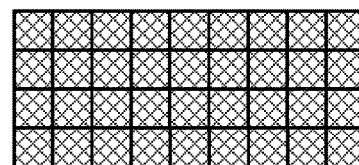
Flattened Input Stream 546
Flattened Input Channel 544A
Flattened Input Channel 544B
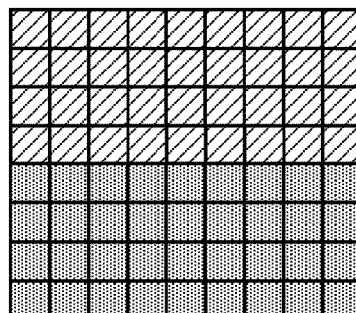
→ Direction of Input 534
⋮
Flattened Input Channel 544N 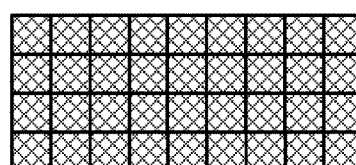
FIG. 5C

601 - Receive input and pad based on kernel size
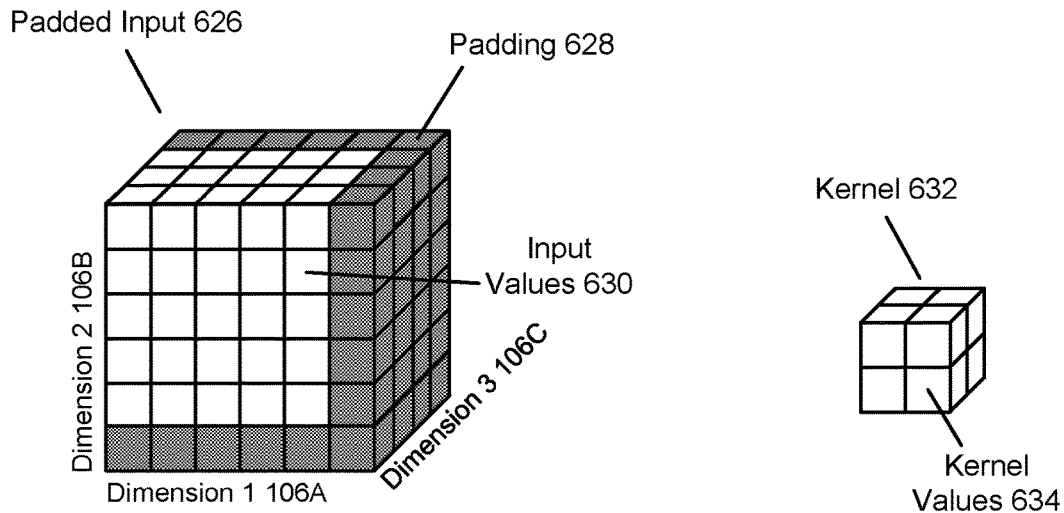
602 – Tile input into tiles with size equal to kernel size
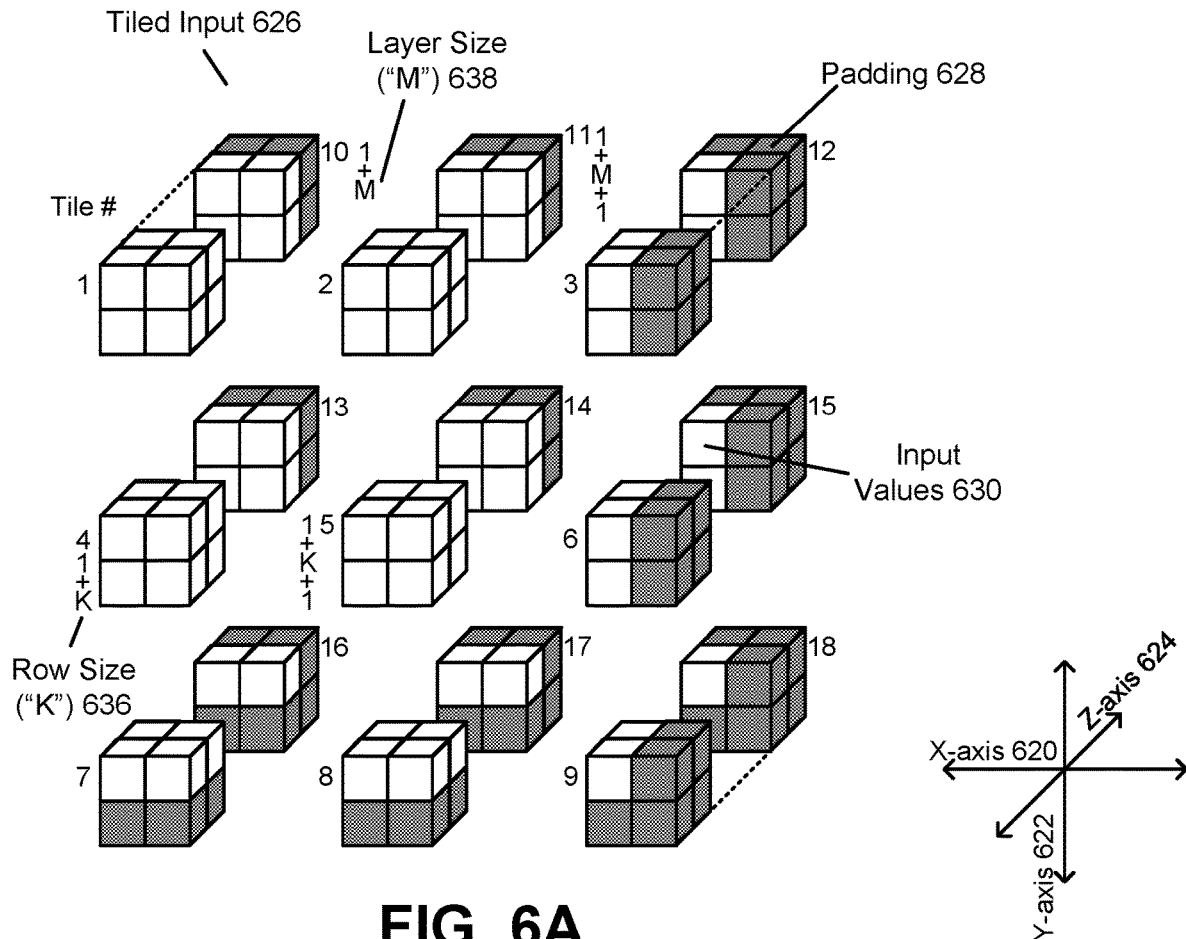
FIG. 6A

800
For 1D Kernel
801 - Receive kernel
Kernel 820
| a | b | c |
802 – Rotate kernel
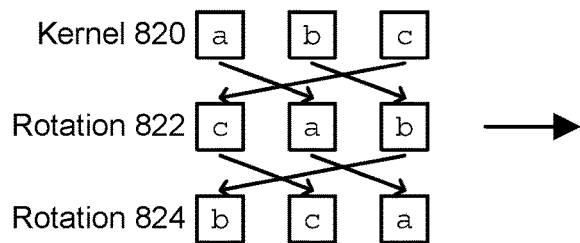
803 – Generate expanded kernel
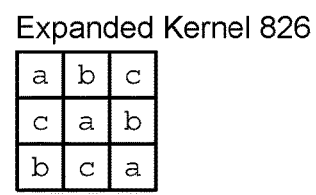
Expanded Kernel 826
FIG. 8

901 - Receive kernel

Kernel 920A

| a | b | c |
|---|---|---|
| d | e | f |

Kernel 920B

| a | b |
|---|---|
| c | d |
| e | f |

For 2D Kernel 900
Kernel 920C

| a | b | c |
|---|---|---|
| d | e | f |
| g | h | i |

902A – Rotate 1st dimension, permute all rotations for rows (row-major order)

Kernel Rotation 922A

| a | b | c | | d | e | f |
|---|---|---|---|---|---|---|
| c | a | b | | f | d | e |
| b | c | a | | e | f | d |

Kernel Rotation 922B

| a | b | | c | d | | e | f |
|---|---|---|---|---|---|---|---|
| b | a | | d | c | | f | e |

Kernel Rotation 922C

| a | b | c | | d | e | f | | g | h | i |
|---|---|---|---|---|---|---|---|---|---|---|
| c | a | b | | f | d | e | | i | g | h |
| b | c | a | | e | f | d | | h | i | g |

903A – Rotate 2nd dimension, permute all rotations for blocks generated from 1st dimension rotation (row-major method)

Kernel Rotation 924A
Block 926A, Block 926B

| a | b | c | | d | e | f |
|---|---|---|---|---|---|---|
| c | a | b | | f | d | e |
| b | c | a | | e | f | d |

| d | e | f | | a | b | c |
|---|---|---|---|---|---|---|
| f | d | e | | c | a | b |
| e | f | d | | b | c | a |

↓

Expanded Kernel 932A

| a | b | c | d | e | f |
|---|---|---|---|---|---|
| c | a | b | f | d | e |
| b | c | a | e | f | d |
| d | e | f | a | b | c |
| f | d | e | c | a | b |
| e | f | d | b | c | a |

Kernel Rotation 924B
Block 928A, Block 928B, Block 928C

| a | b | | c | d | | e | f |
|---|---|---|---|---|---|---|---|
| b | a | | d | c | | f | e |

| e | f | | a | b | | c | d |
|---|---|---|---|---|---|---|---|
| f | e | | b | a | | d | c |

| c | d | | e | f | | a | b |
|---|---|---|---|---|---|---|---|
| d | c | | f | e | | b | a |

↓

Expanded Kernel 932B

| a | b | c | d | e | f |
|---|---|---|---|---|---|
| b | a | d | c | f | e |
| e | f | a | b | c | d |
| f | e | b | a | d | c |
| c | d | e | f | a | b |
| d | c | f | e | b | a |

Kernel Rotation 924C
Block 930A, Block 930B, Block 930C

| a | b | c | | d | e | f | | g | h | i |
|---|---|---|---|---|---|---|---|---|---|---|
| c | a | b | | f | d | e | | i | g | h |
| b | c | a | | e | f | d | | h | i | g |

| g | h | i | | a | b | c | | d | e | f |
|---|---|---|---|---|---|---|---|---|---|---|
| i | g | h | | c | a | b | | f | d | e |
| h | i | g | | b | c | a | | e | f | d |

| d | e | f | | g | h | i | | a | b | c |
|---|---|---|---|---|---|---|---|---|---|---|
| f | d | e | | i | g | h | | c | a | b |
| e | f | d | | h | i | g | | b | c | a |

Expanded Kernel 932C

| a | b | c | d | e | f | g | h | i |
|---|---|---|---|---|---|---|---|---|
| c | a | b | f | d | e | i | g | h |
| b | c | a | e | f | d | h | i | g |
| g | h | i | a | b | c | d | e | f |
| i | g | h | c | a | b | f | d | e |
| h | i | g | b | c | a | e | f | d |
| d | e | f | g | h | i | a | b | c |
| f | d | e | i | g | h | c | a | b |
| e | f | d | h | i | g | b | c | a |

FIG. 9A

Kernel 920C

|   |   |   |
|---|---|---|
| a | b | c |
| d | e | f |
| g | h | i |

Columns  1  2  3

<u>902B – Rotate 1st dimension, permute all rotations for rows (column-major order)</u>

<u>903A – Rotate 2nd dimension, permute all rotations for blocks generated from 1st dimension rotation (column-major method)</u>

904 – Repeat for all kernel filters
Kernel Filter 942A
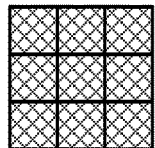
Expanded Kernel Filter 944A
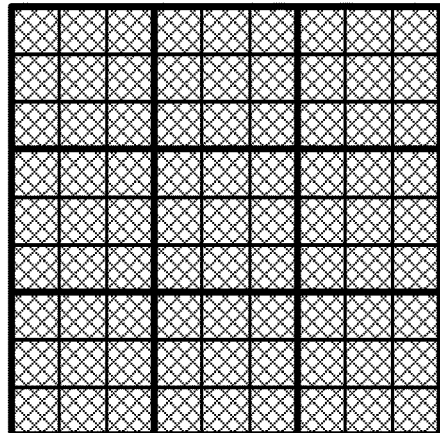
Kernel Filter 942B
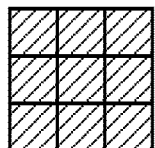
Expanded Kernel Filter 944B
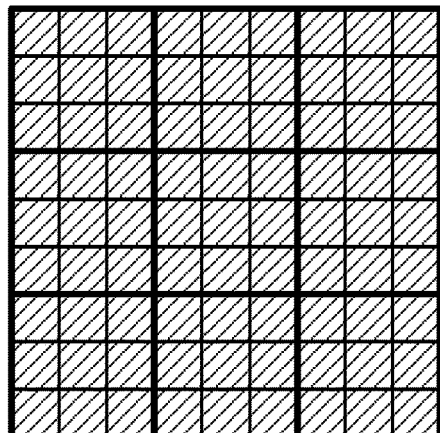
⋮
Kernel Filter 942N
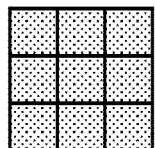
Expanded Kernel Filter 944N
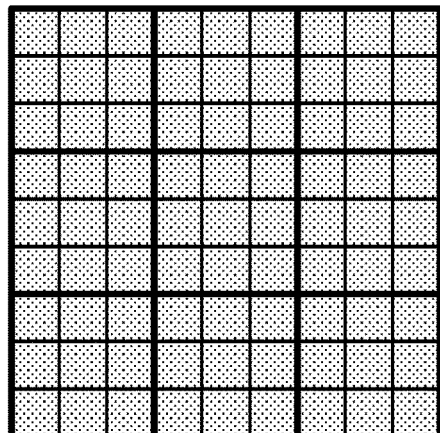
FIG. 9C

For 3D Kernel 1000
1001 - Receive kernel
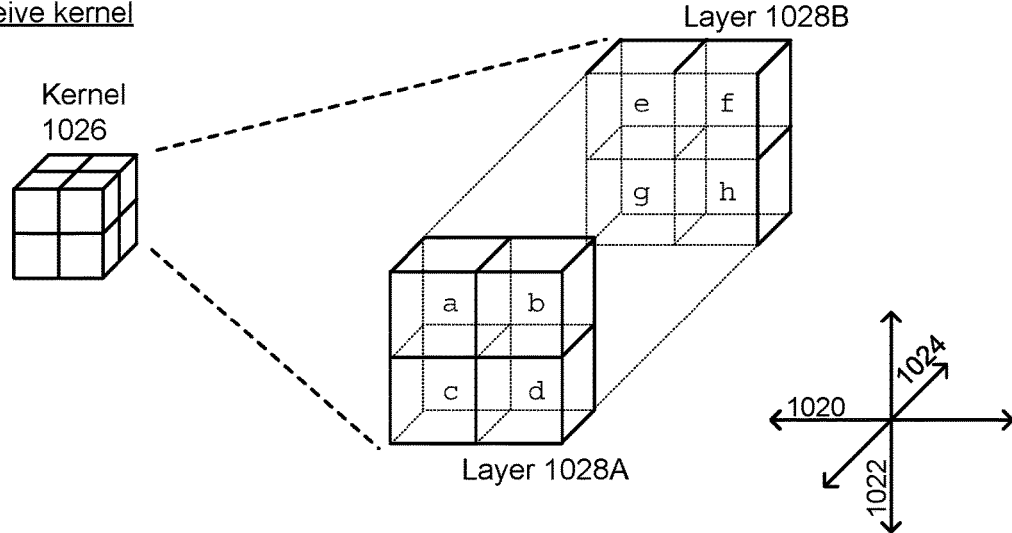
1002 – Rotate 1st dimension, permute all rotations for rows (row-major order)
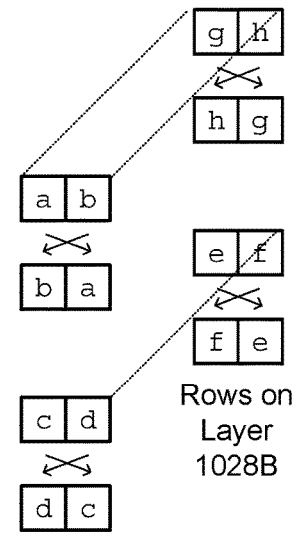
1003A – Rotate 2nd dimension:
a) Group blocks into vector along axis of dimension
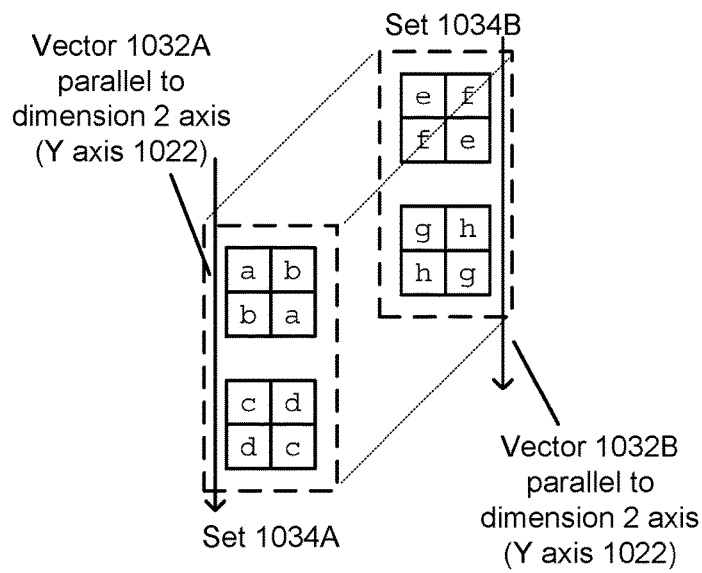
*(The blocks between the sets are not aligned along a single vector 1032A or 1032B as they are on different layers)*
FIG. 10A

1003B – Rotate 2nd dimension:
2) generate all rotations for blocks generated from 1st dimension rotation, process separately for each set of blocks (row-major order)
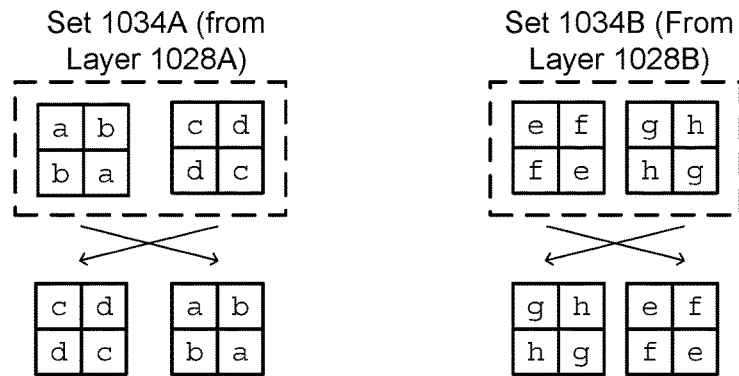
1004A – Rotate 3rd dimension:
a) group blocks into vector along axis of dimension
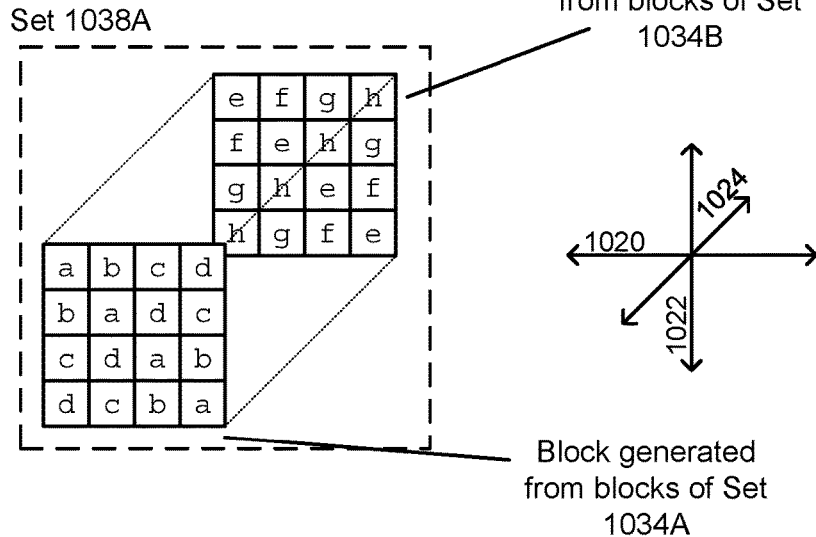
FIG. 10B

1004B – Rotate 3rd dimension:
2) generate all rotations for blocks generated from 2nd dimension rotation, process separately for each set of blocks (row-wise method)

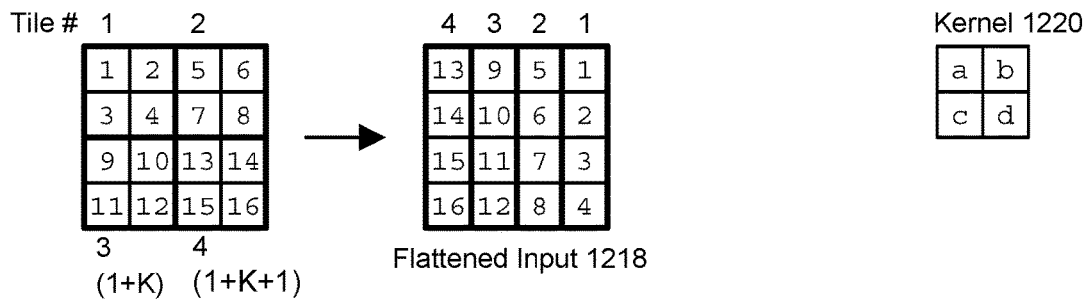
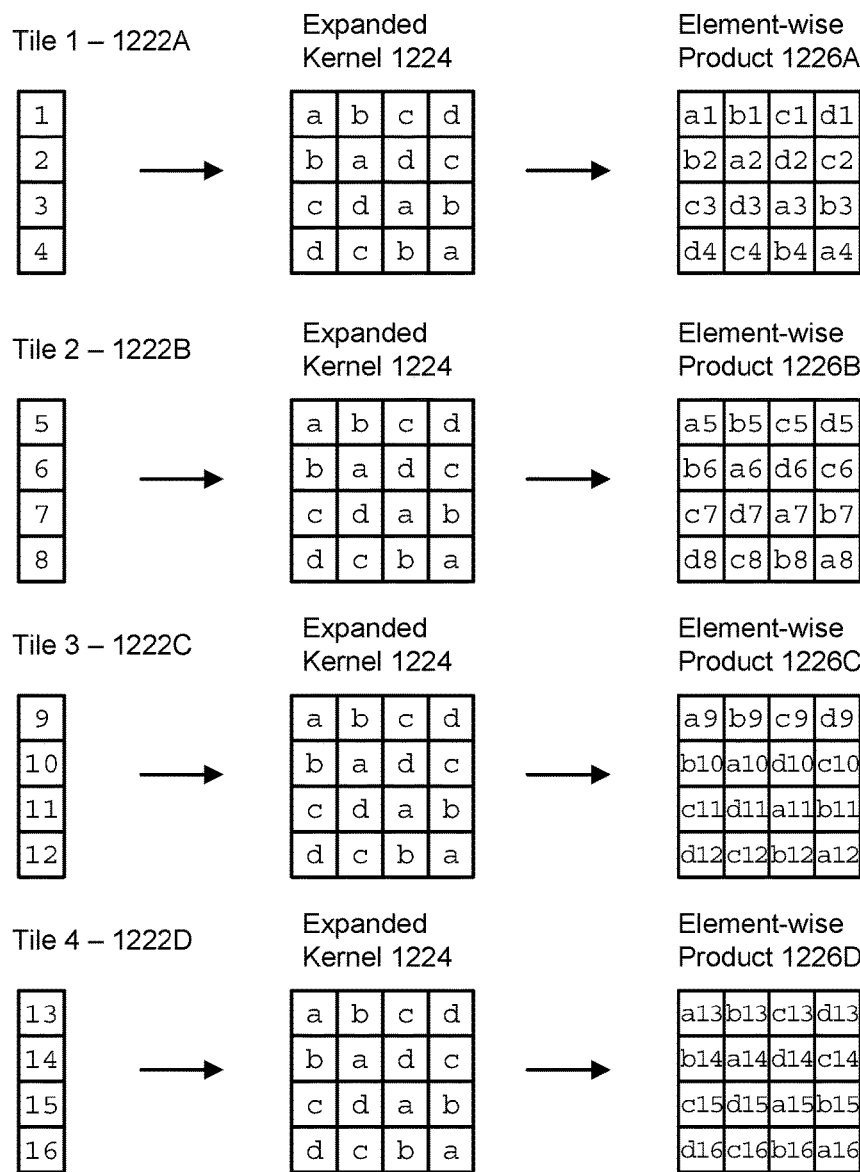
FIG. 12A

A
Element-wise Product 1226A

| a1 | b1 | c1 | d1 |
|----|----|----|----|
| b2 | a2 | d2 | c2 |
| c3 | d3 | a3 | b3 |
| d4 | c4 | b4 | a4 |

B
Element-wise Product 1226B

| a5 | b5 | c5 | d5 |
|----|----|----|----|
| b6 | a6 | d6 | c6 |
| c7 | d7 | a7 | b7 |
| d8 | c8 | b8 | a8 |

C
Element-wise Product 1226C

| a9  | b9  | c9  | d9  |
|-----|-----|-----|-----|
| b10 | a10 | d10 | c10 |
| c11 | d11 | a11 | b11 |
| d12 | c12 | b12 | a12 |

D
Element-wise Product 1226D

| a13 | b13 | c13 | d13 |
|-----|-----|-----|-----|
| b14 | a14 | d14 | c14 |
| c15 | d15 | a15 | b15 |
| d16 | c16 | b16 | a16 |

1203 – Determine, for each kernel position in a tile of the original input, which tile values are needed to generate element-wise convolution product (row-wise stride)

Position 1 – 1230A

Kernel position 1232

Element-wise product pairs for Position 1 – 1234A

| a1 | A |
| b2 | A |
| c3 | A |
| d4 | A |

Location in 1226A-D

Control Pattern after Position 1 – 1236A

| A |
| A |
| A |
| A |

Position 2 – 1230B

Element-wise product pairs for Position 2 – 1234B

| a2 | A |
| b5 | B |
| c4 | A |
| d7 | B |

Location in 1226A-D

Control Pattern after Position 2 – 1236B

| A | A |
| B | A |
| A | A |
| B | A |

Position 3 – 1230C

Element-wise product pairs for Position 3 – 1234C

| a3  | A |
| b4  | A |
| c9  | C |
| d10 | C |

Location in 1226A-D

Control Pattern after Position 3 – 1236C

| A | A | A |
| A | B | A |
| C | A | A |
| C | B | A |

Position 4 – 1230D

Element-wise product pairs for Position 4 – 1234D

| a4  | A |
| b7  | B |
| c10 | C |
| d13 | D |

Location in 1226A-D

Control Pattern after Position 4 – 1236D

| A | A | A | A |
| B | A | B | A |
| C | C | A | A |
| D | C | B | A |

FIG. 12B

1311 – Generate values for all positions of the control pattern    1300

Tests (equal to number of kernel dimensions) 1330

| test_k(row, column) = | $floor((r \bmod (h*w))/h) < floor((c \bmod (h*w))/w)$ |
|---|---|
| test_1(row, column) = | $r \bmod h < c \bmod w$ | h = kernel height, w = kernel width, r = row #, c = column #

Results table 1332

| test_k result | test_1 result | indication result |
|---|---|---|
| false (0) | false (0) | A (00) |
| false (0) | true (1) | B (01) |
| true (1) | false (0) | C (10) |
| true (1) | true (1) | D (11) |

Control Pattern 1320

|  | 8 | 7 | 6 | 5 | 4 | 3 | 2 | 1 | 0 |
|---|---|---|---|---|---|---|---|---|---|
| 8 | A | A | A | A | A | A | A | A |   |
| 7 | B | A | A | B | A | A | B | A | A |
| 6 | B | B | A | B | B | A | B | B | A |
| 5 | C | C | C | A | A | A | A | A |   |
| 4 | D | C | C | B | A | A | B | A | A |
| 3 | D | D | C | B | B | A | B | B | A |
| 2 | C | C | C | C | C | C | A | A |   |
| 1 | D | C | C | D | C | C | B | A | A |
| 0 | ? | D | C | D | D | C | B | B | A | row # (r) on vertical axis, column # (c) on horizontal axis

Value to be computed 1324 (points to "?" at row 0, col 8)

Kernel 1322

| a | b | c |
|---|---|---|
| d | e | f |
| g | h | i |

Height(h) = 3

Width(w) = 3

1312 – Determine test results for the position using row and column numbers

Test results 1326

| test_k(0, 8) = | 0 < 2 | true |
|---|---|---|
| test_1(0, 8) = | 0 < 2 | true |

1313 – Reference table to find indicator value

Value at row 0, col 8 = D (or 11)

FIG. 13A

1351 – Generate values for all positions of the control pattern     1301

Tests (equal to number of kernel dimensions) 1370

| test_m(row, column) = | $floor((r \bmod (h*w*d))/(h*d)) < floor((c \bmod (h*w*d))/(w*d))$ |
|---|---|
| test_k(row, column) = | $floor((r \bmod (h*w))/h) < floor((c \bmod (h*w))/w)$ |
| test_1(row, column) = | $r \bmod h < c \bmod w$ |

Results table 1372

| test_m result | test_k result | test_1 result | indication result |
|---|---|---|---|
| false (0) | false (0) | false (0) | A (000) |
| false (0) | false (0) | true  (1) | B (001) |
| false (0) | true  (1) | false (0) | C (010) |
| false (0) | true  (1) | true  (1) | D (011) |
| true  (1) | false (0) | false (0) | E (100) |
| true  (1) | false (0) | true  (1) | F (101) |
| true  (1) | true  (1) | false (0) | G (110) |
| true  (1) | true  (1) | true  (1) | H (111) |

Control Pattern 1360

|   | 7 | 6 | 5 | 4 | 3 | 2 | 1 | 0 |
|---|---|---|---|---|---|---|---|---|
| 7 | A | A | A | A | A | A | A | A |
| 6 | B | A | B | A | B | A | B | A |
| 5 | C | C | A | A | C | C | A | A |
| 4 | D | C | B | A | D | C | B | A |
| 3 | E | E | E | E | A | A | A | A |
| 2 | F | E | F | E | B | A | B | A |
| 1 | G | G | E | E | C | C | A | A |
| 0 | ? | G | F | E | D | C | B | A | row # (r) / column # (c)

Value to be computed 1364

Kernel (3D) 1362

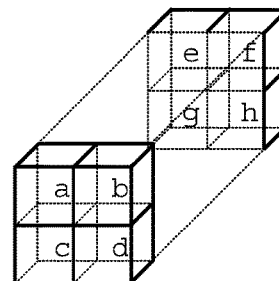

Height(h) = 2
Width(w) = 2
Depth(d) = 2

1352 – Determine test results for the position using row and column numbers

Test results 1366

| test_m(0, 7) = | 0 < 1 | true |
| test_k(0, 7) = | 0 < 1 | true |
| test_1(0, 7) = | 0 < 1 | true |

1353 – Reference table to find indicator value

Indication 1368 = H  (or 111)

1D Kernel 1380

| a | b | c |

Control Pattern
1382 for 1D Kernel

| A | A | A |
| B | A | A |
| B | B | A |

2D Kernel 1384

| a | b | c |
| d | e | f |
| g | h | i |

Control Pattern
1386 for 2D Kernel

| A | A | A | A | A | A | A | A |
| B | A | B | A | A | B | A | A |
| B | B | A | B | B | A | B | A |
| C | C | C | A | A | A | A | A |
| D | C | C | B | A | A | B | A |
| D | D | C | B | B | A | B | A |
| C | C | C | C | C | A | A | A |
| D | C | C | D | C | C | B | A |
| D | D | C | D | D | C | B | A |

3D Kernel 1388

Control Pattern
1390 for 3D Kernel

| A | A | A | A | A | A | A |
| B | A | B | A | B | A | A |
| C | C | A | A | C | C | A |
| D | C | B | A | D | C | B |
| E | E | E | E | A | A | A |
| F | E | F | E | B | A | B |
| G | G | E | E | C | C | A |
| H | G | F | E | D | C | B |

1400

Access, from a buffer, a flattened input stream that includes a set of parallel vectors, each vector representing a set of input values of a unique kernel-sized tile of an input tensor that is to be convolved by a kernel to generate an output activation
1410

Receive an expanded kernel generated by rotationally permuting values from the kernel, the expanded kernel having vectors that each correspond to an output value position of a kernel-sized tile of the output activation
1420

Receive a control pattern that includes a set of vectors, each vector corresponding to the output value position for the kernel-sized tile of the output activation, each vector including delay values that indicate a parallel vector of the flattened input stream to access input values for the convolution
1430

Generate (using a hardware accelerated processor) for each output value position of each kernel-sized tile of the output activation, a dot product between a first vector that includes values of the flattened input stream as selected by the delay values of the corresponding vector of the control pattern, and a second vector corresponding to a vector in the expanded kernel corresponding to the output value position
1440

FIG. 14

1500 For 1D Kernel

Flattened Input 1522

| 0 | 18 | 15 | 0 | 0 | 12 | 9 | 0 | 0 | 6 | 3 | 0 |
|---|----|----|---|---|----|---|---|---|---|---|---|
| 0 | 0 | 16 | 13 | 0 | 0 | 10 | 7 | 0 | 0 | 4 | 1 |
| 0 | 0 | 17 | 14 | 0 | 0 | 11 | 8 | 0 | 0 | 5 | 2 |

12 11 10 9 8 7 6 5 4 3 2 1

Control Pattern 1524

| A | A | A |
|---|---|---|
| B | A | A |
| B | B | A |

Expanded Kernel 1526

| a | b | c |
|---|---|---|
| c | a | b |
| b | c | a |

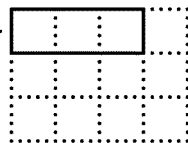

1501A – Process Tile #1

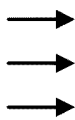

1502A – Output position 1 of 3 (3 = tile size)

1511A – Select values from flattened input according to tile position (i.e., delay amount) indicated in control pattern for output position

Control Pattern Vector for position 1 in output tile - 1528A

| A | = tile 1 |
| A | = tile 1 |
| A | = tile 1 |

→

Selected input values based on control pattern vector for position - 1530A

| 0 |
| 1 |
| 2 |

A = delay select from tile x
B = delay select from tile x+1
where x is tile # of current tile being processed 1512A – Multiply-accumulate selected input values and a vector, selected from the expanded kernel, corresponding to the position in the output tile

Selected input values - 1530A

| 0 |
| 1 |
| 2 |

• dot product

Expanded Kernel Vector for position 1 in output tile - 1532A

| a | b | c | row 1 of 3 in expanded kernel

= a0+b1+c2 =

Output Position 1 – 1534A

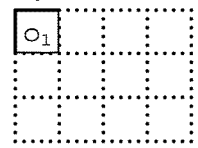

FIG. 15A

Flattened Input 1522

| 0 | 18 | 15 | 0 | 0 | 12 | 9 | 0 | 0 | 6 | 3 | 0 |
|---|---|---|---|---|---|---|---|---|---|---|---|
| 0 | 0 | 16 | 13 | 0 | 0 | 10 | 7 | 0 | 0 | 4 | 1 |
| 0 | 0 | 17 | 14 | 0 | 0 | 11 | 8 | 0 | 0 | 5 | 2 |
| 12 | 11 | 10 | 9 | 8 | 7 | 6 | 5 | 4 | 3 | 2 | 1 |

Control Pattern 1524

| A | A | A |
|---|---|---|
| B | A | A |
| B | B | A |

Expanded Kernel 1526

| a | b | c |
|---|---|---|
| c | a | b |
| b | c | a |

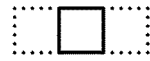

1503A – Output position 2 of 3

1513A – Select values from flattened input according to tile position (i.e., delay amount) indicated in control pattern for output position

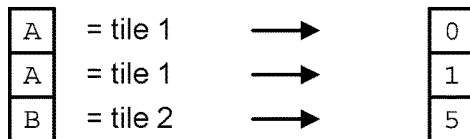

Control Pattern Vector for position 2 in output tile - 1536A

| A | = tile 1 |
| A | = tile 1 |
| B | = tile 2 |

Selected input values based on control pattern vector for position - 1538A

| 0 |
| 1 |
| 5 |

A = delay select from tile x
B = delay select from tile x+1
where x is tile # of current tile being processed 1514A – Multiply-accumulate selected input values and a vector, selected from the expanded kernel, corresponding to the position in the output tile Selected input values - 1538A

| 0 |
| 1 |
| 5 |

• dot product

Expanded Kernel Vector for position 2 in output tile - 1542A

| c | a | b |

= c0+a1+b5 = row 2 of 3 in expanded kernel

Output Position 2 – 1544A

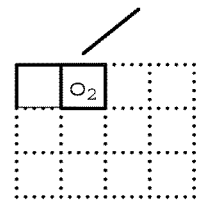

FIG. 15B

Flattened Input 1522

| 0 | 18 | 15 | 0 | 0 | 12 | 9 | 0 | 0 | 6 | 3 | 0 |
|---|----|----|---|---|----|---|---|---|---|---|---|
| 0 | 0  | 16 | 13| 0 | 0  | 10| 7 | 0 | 0 | 4 | 1 |
| 0 | 0  | 17 | 14| 0 | 0  | 11| 8 | 0 | 0 | 5 | 2 |

12 11 10 9 8 7 6 5 4 3 2 1

Control Pattern 1524

| A | A | A |
|---|---|---|
| B | A | A |
| B | B | A |

Expanded Kernel 1526

| a | b | c |
|---|---|---|
| c | a | b |
| b | c | a |

1504A – Output position 3

1515A – Select values from flattened input according to tile position (i.e., delay amount) indicated in control pattern for output position Control Pattern Vector for position 3 in output tile - 1546A

| A | = tile 1 |
|---|----------|
| B | = tile 2 |
| B | = tile 2 |

→

Selected input values based on control pattern vector for position - 1548A

| 0 |
|---|
| 4 |
| 5 |

A = delay select from tile x
B = delay select from tile x+1
where x is tile # of current tile being processed

1516A – Multiply-accumulate selected input values and a vector, selected from the expanded kernel, corresponding to the position in the output tile Selected input values - 1548A

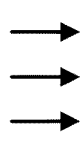

dot product

Expanded Kernel Vector for position 3 in output tile - 1552A

| b | c | a |

= b0+c4+a5 = row 3 of 3 in expanded kernel

Output Position 3 – 1554A

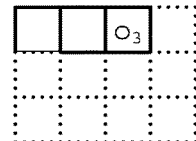

1505 – Repeat process 1501A for all tiles in input (e.g., 1501B-L)

FIG. 15C

1612A – Multiply-accumulate selected input values and a vector, selected from the expanded kernel, corresponding to the position in the output tile
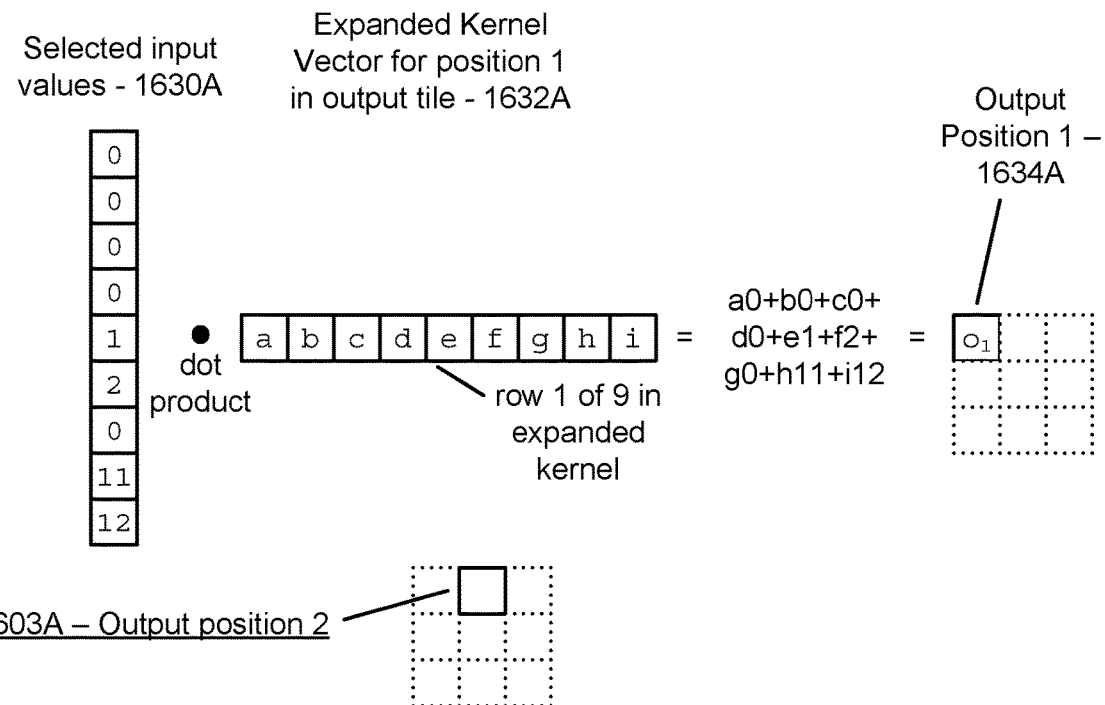
1613A – Select values from buffered flattened input according to tile position (i.e., delay amount) indicated in control pattern for output position
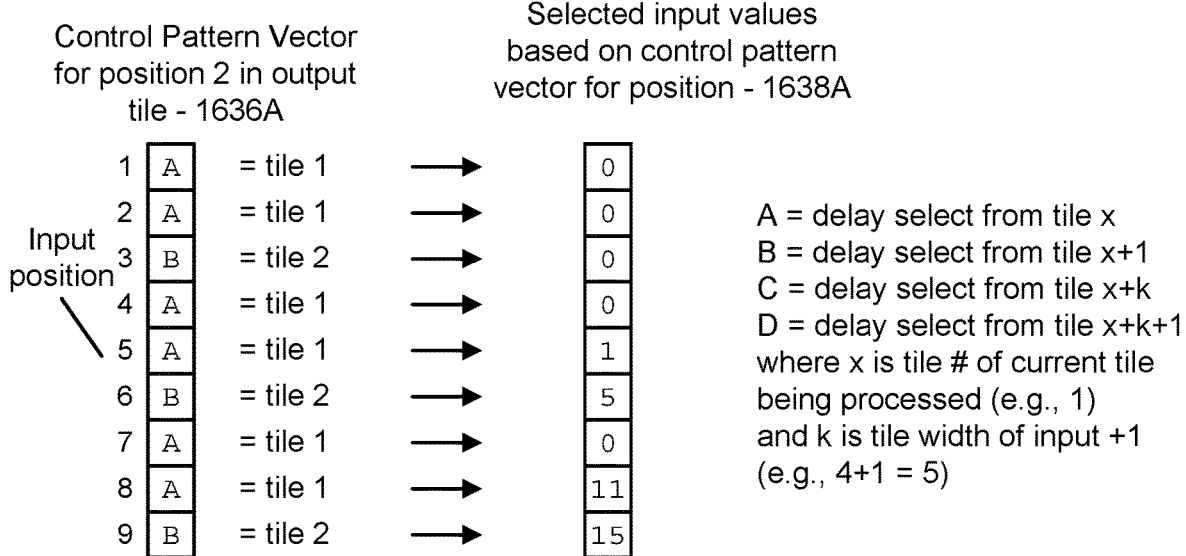
FIG. 16B

1614A – Multiply-accumulate selected input values and a vector, selected from the expanded kernel, corresponding to the position in the output tile

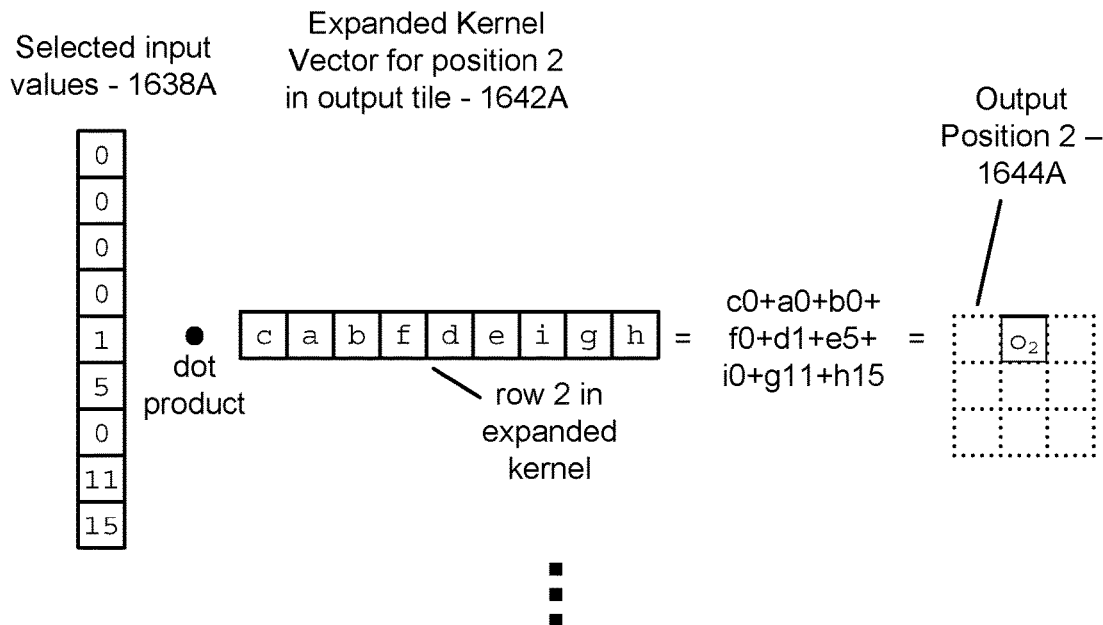

1606A – Output position 5

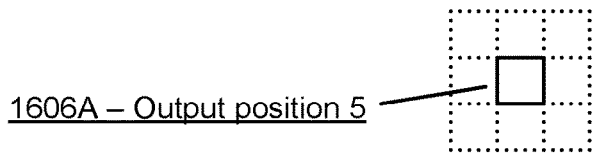

1615A – Select values from flattened input according to tile position (i.e., delay amount) indicated in control pattern for output position

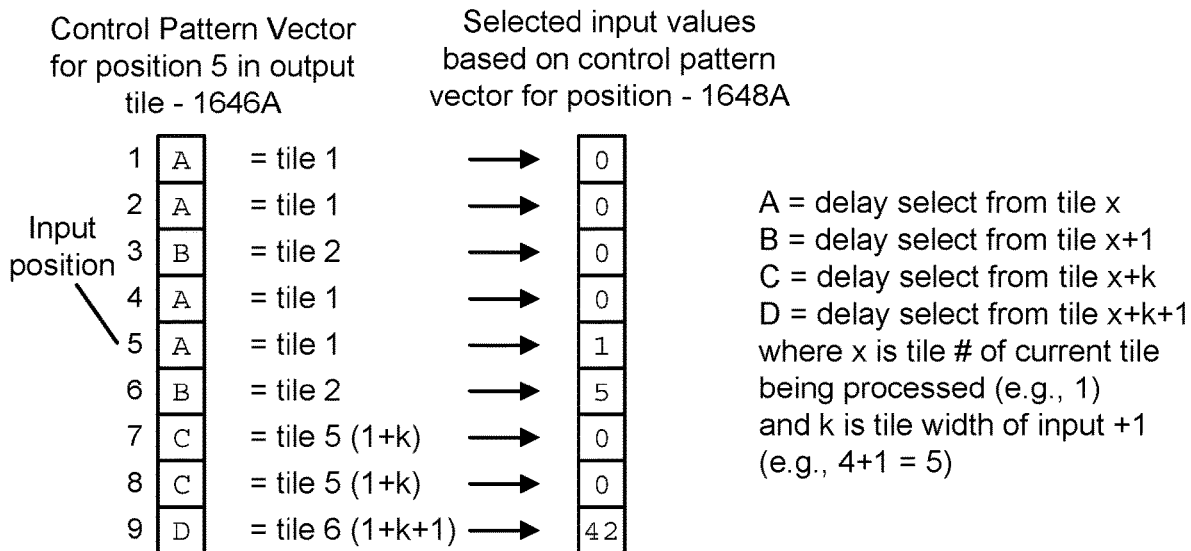

A = delay select from tile x
B = delay select from tile x+1
C = delay select from tile x+k
D = delay select from tile x+k+1
where x is tile # of current tile being processed (e.g., 1) and k is tile width of input +1 (e.g., 4+1 = 5)

FIG. 16C

1615A – Multiply-accumulate selected input values and a vector, selected from the expanded kernel, corresponding to the position in the output tile
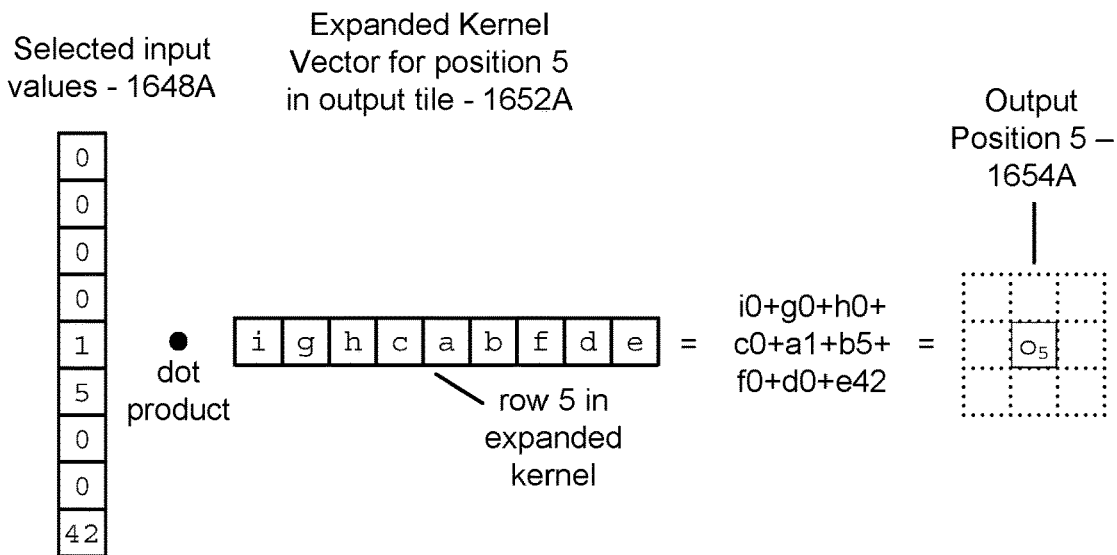
1616 – Repeat process above for all output positions in tile 1
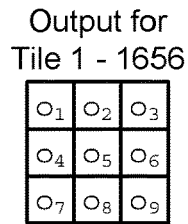
Output for Tile 1 - 1656
1617 – Repeat process above for all tiles in input
FIG. 16D

1712 – Multiply-accumulate selected input values and selected expanded kernel vector that is selected based on output tile position
Selected input values - 1728
Expanded Kernel Vector for position 8 in output tile - 1730
Output Position 8 – 1732
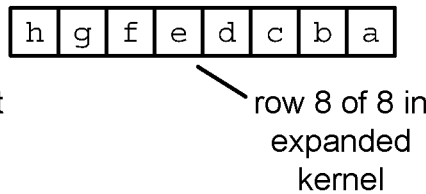
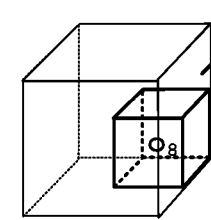
dot product
row 8 of 8 in expanded kernel
1713 – Repeat for all tiles and channels
FIG. 17B

EXPANDED KERNEL GENERATION

CROSS-REFERENCE TO RELATED APPLICATIONS

This application claims the benefit of priority to U.S. Provisional Patent Application No. 62/769,444, filed Nov. 19, 2018, the entire contents of which are incorporated herein by reference.

TECHNICAL FIELD

The disclosure generally relates to matrix computation, and specifically to spatial locality transform of matrices.

BACKGROUND

Modern neural networks include multiple layers. Each layer may include a large number of input values, which are subsequently transformed to generate outputs (i.e., activations), which serve as input for later layers. Typically, these input and output values are represented as matrices (e.g., arrays of values having one to multiple dimensions). A common transformation that is performed on these input values is a convolution. A convolution applies a kernel, which includes weight values, and which may also be represented as a matrix, to adjacent values in the input to generate an output value. This is repeated for all values in the input (as modified by the weights), to generate an output set of values. However, as the kernel will stride, or slide across, the same input values multiple times in order to generate the multiple outputs, due to having to read in the adjacent values multiple times, it can be computationally expensive when executed using a naïve approach.

Thus, a system is desired that can more efficiently compute a convolution of input values modified by weights by a kernel to generate the output values.

BRIEF DESCRIPTION OF THE DRAWINGS

FIG. 5A illustrates a first part of an example of flattening an input tensor in the case of a two dimensional kernel, in accordance with an embodiment.

FIG. 5B illustrates a second part of the example of flattening an input tensor in the case of a two dimensional kernel, in accordance with an embodiment.

FIG. 5C illustrates an example of flattening an input tensor for multiple input channels, in accordance with an embodiment.

FIG. 6A illustrates a first part of an example of flattening an input tensor in the case of a three dimensional kernel, in accordance with an embodiment.

FIG. 8 illustrates an example of generating an expanded kernel in the case of a one dimensional kernel, in accordance with an embodiment.

FIG. 9A illustrates examples of generating an expanded kernel for different two dimensional kernels, in accordance with an embodiment.

FIG. 9C illustrates an example of generating an expanded kernel in the case of multiple kernel filters, in accordance with an embodiment.

FIG. 10A illustrates a first part of an example of generating an expanded kernel in the case of a three dimensional kernel, in accordance with an embodiment.

FIG. 10B illustrates a second part of the example of generating an expanded kernel in the case of a three dimensional kernel, in accordance with an embodiment.

FIG. 12A illustrates a first part of an example of a conceptual basis for the generation of the control pattern, in accordance with an embodiment.

FIG. 12B illustrates a second part of an example of a conceptual basis for the generation of the control pattern, in accordance with an embodiment.

FIG. 13A illustrates an example of a portion of the generation of values for a control pattern for a two dimensional kernel, in accordance with an embodiment.

FIG. 13B illustrates an example of a portion of the generation of values for a control pattern for a three dimensional kernel, in accordance with an embodiment.

FIG. 14 is a flow diagram illustrating a method of generating an output of a convolution using the flattened input, expanded kernel, and control pattern, in accordance with an embodiment.

FIG. 15A illustrates a first part of an example of generating an output activation using the flattened input, expanded kernel, and control pattern in the case of a one dimensional kernel, in accordance with an embodiment.

FIG. 15B illustrates a second part of the example of generating an output activation using the flattened input, expanded kernel, and control pattern in the case of a one dimensional kernel, in accordance with an embodiment.

FIG. 15C illustrates a third part of the example of generating an output activation using the flattened input, expanded kernel, and control pattern in the case of a one dimensional kernel, in accordance with an embodiment.

FIG. 16B illustrates a second part of the example of generating an output activation using the flattened input, expanded kernel, and control pattern in the case of a two dimensional kernel, in accordance with an embodiment.

FIG. 16C illustrates a third part of the example of generating an output activation using the flattened input, expanded kernel, and control pattern in the case of a two dimensional kernel, in accordance with an embodiment.

FIG. 16D illustrates a fourth part of the example of generating an output activation using the flattened input, expanded kernel, and control pattern in the case of a two dimensional kernel, in accordance with an embodiment.

FIG. 17B illustrates a second part of an example of generating an output activation using the flattened input, expanded kernel, and control pattern in the case of a three dimensional kernel, in accordance with an embodiment.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Exemplary System

Figure 1:
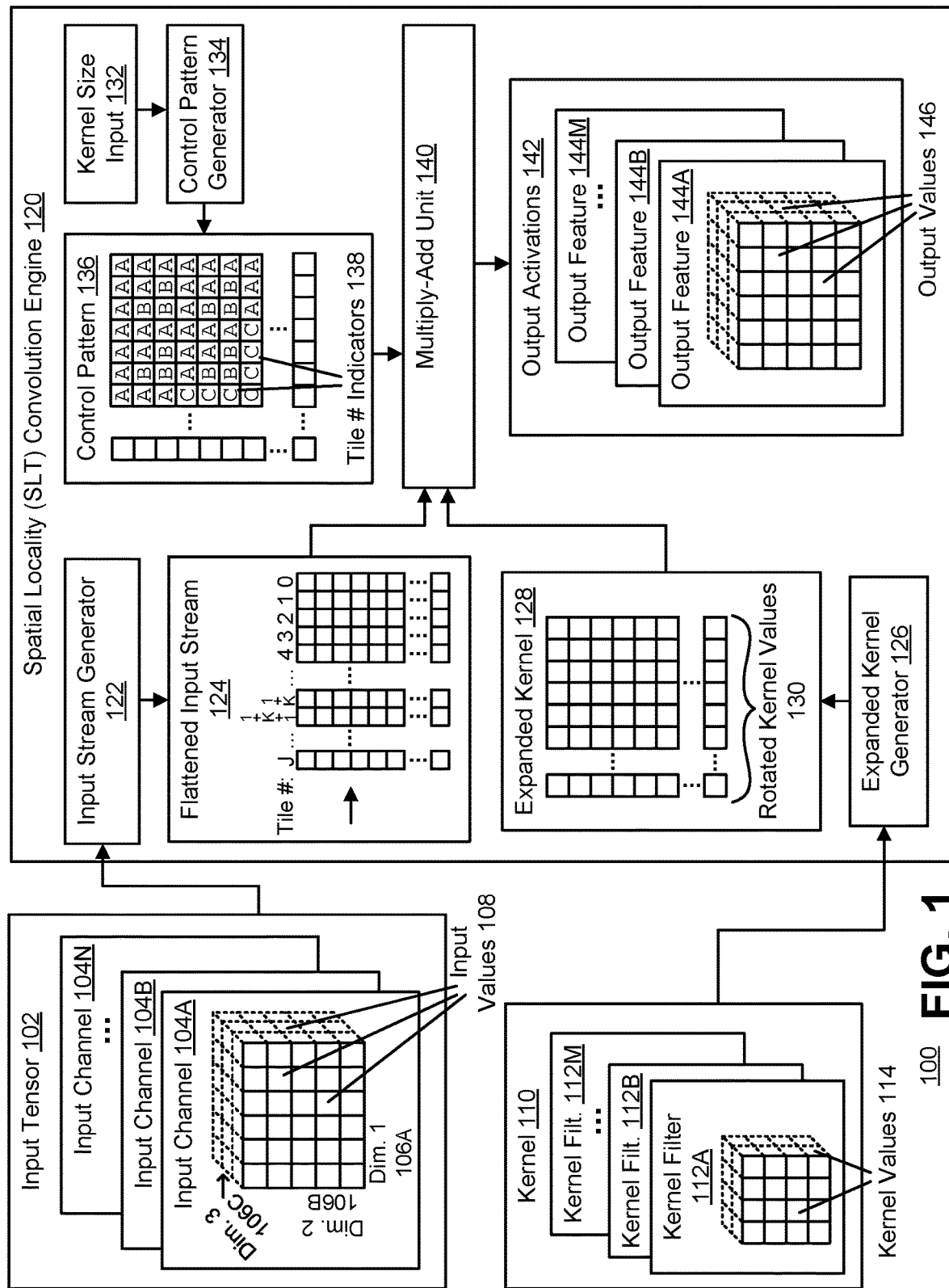
FIG. 1 illustrates a system 100 for convolution of an input tensor via spatial locality transform (SLT) of a kernel to generate output activations, in accordance with an embodiment.

FIG. 1 illustrates a system 100 for convolution of an input tensor via spatial locality transform (SLT) of a kernel to generate output activations, in accordance with an embodiment. In one embodiment, the system 100 includes the input tensor 102, kernel 110, input stream generator 122, flattened input stream 124, expanded kernel generator 126, expanded kernel 128, control pattern generator 134, control pattern 136, multiply-add unit 140, and output activations 142. However, in other embodiments the system 100 includes different elements, and/or the system 100 includes a different number of the elements shown.

The input tensor 102 is a collection of input values 108 which are modified by the kernel 110 in the convolution operation to generate the output activations 142. In one embodiment, the input tensor 102 is represented by a matrix. The matrix may have one, two, three, or more than three dimensions, and may be stored as an array in memory. The number of dimensions of the array may be equal to the number of dimensions of the matrix. In another embodiment, the input tensor 102 has multiple input channels 104A-N (generally referred to as input channel(s) 104). Each input channel 104 includes a matrix of one or more dimensions, such as the dimensions 1-3 106A-C of the matrix in input channel 104A as illustrated.

A kernel 110 is applied to the input tensor 102 in a convolution operation to generate output activations, such as the output activations 142. Additional details regarding the convolution operation are described below with reference to FIG. 2. The kernel 110 can be represented by one or more dimensional matrix. The matrix includes the kernel values 114, which, in the case of a neural network, represent weights that are applied to the input values 108 of the input tensor 102. The number of dimensions of the input tensor 102, and specifically, the dimensions of the matrix of each input channel 104, should be at least equal to, or larger than, the number of dimensions of the kernel 110. The size (i.e., the number of elements of the kernel 110 spanning each dimension) can be smaller than or larger than the input tensor 102. If the kernel 110 is larger than the input tensor 102, the input tensor 102 can be padded such that the size of the kernel 110 is smaller than or equal to the padded input tensor 102, allowing the convolution operation to take place. The resulting output activation 142 is a matrix that is the same size as the (padded) input tensor 102.

In one embodiment, the kernel 110 includes one or more kernel "filters" 112A-M (generally referred to as kernel filter(s) 112). The number of kernel filters 112 does not need to equal the number of input channels 104. Each kernel filter 112 includes a set of sub-filter kernels, which are themselves filters and which equal the number of input channels 104. A convolution operation is performed on each input channel 104 with each sub-filter kernel, and the resulting outputs matrices are summed to generate a single output activation feature matrix, or output feature 144A-M (generally referred to as output feature(s) 114). This is repeated for each kernel filter 112. The number of output features 144 that are generated is equal to the number of kernel filters 112 that are present in the kernel 110. Thus, for example, if the kernel 110 includes one kernel filter 112, then a single output feature 144 is generated. However, if the kernel 110 includes five kernel filters 112, then the output activations 142 will have five output features 144. This allows the neural network to apply different kernel weights to different parts of the input (i.e., the different input channels 104) and combine the results into novel outputs (i.e., the different output features 144), which can then be used as further inputs in another layer of the neural network. Additional details regarding the use of multiple input channels 104 and multiple kernel filters 112 are described below with reference to FIGS. 16E-F.

The input stream generator 122 converts the input tensor 102 into the flattened input stream 124. In order to more efficiently read in the input tensor 102, and to avoid reading a same value of the input tensor 102 multiple times when the kernel 110 is striding over the input tensor 102, the input stream generator 122 converts the input tensor 102 into the flattened input stream 124, which can then be fed into a buffer or other memory to be accessed by the multiply-add unit 140 in an efficient manner as described below that significantly reduces the number of reads of the input values that are necessary.

To perform the conversion of the input tensor, input stream generator 122 may first pad the input tensor 102. The input tensor 102 may be padded such that its size is a modulo (i.e., a multiple) of the size of the kernel 110. In addition, the kernel 110 has a point of "focus." This point of focus is the position of the kernel 110 at which the output value of the convolution with that kernel 110 is generated. The input stream generator 122 pads the input tensor 102 such that the kernel 110, when striding over the input tensor 102, reaches every input value in the input tensor 102. Thus, for example, if the kernel is a 3×3 kernel, with the point of focus being the center of that kernel, a two dimensional matrix of the input tensor 102, after being padded to be a modulo of the kernel, may further be padded around the outside boundary of the matrix with a single vector of padding values to allow the focus of the kernel to slide across the input values at the outside edges of the input tensor 102.

Finally, the input stream generator 122 may also pad the input tensor 102 to satisfy any requirements of a processor that is used to perform the convolution. Due to the size of the bus, number of parallel processors, memory size, or other constraints, the input stream generator 122 may further pad the input tensor 102 with padding values such that the input tensor 102, after being flattened to become the flattened input stream 124, meets the constraints of the processor. In one embodiment, the input stream generator 122 pads one side (e.g., the trailing edge) of each dimension of the input tensor 102 (or each input channel 104 of the input tensor 102) with padding values equal to the size of the kernel 110 (or the size of each sub-filter kernel of each kernel filter 122). The padding values described here may be any null, zero, or standard padding value.

After padding the input tensor 102, the input stream generator 122 divides, or segments, the input tensor 102, with padding, into tiles. Each tile is the size of the kernel 110. Thus, the padded matrix of the input tensor 102 is divided into multiple individual smaller matrices each the size of the kernel 102. While the input tensor 102 is being described here as being divided, this does not mean that the input stream generator 122 necessarily generates new matrices for each tile. Instead, the input stream generator 122 may simply delineate the boundaries of each tile in the matrix of the input tensor 102.

In the case of multiple input channels 104, the input stream generator 122 divides the matrix of each input channel 104 into its own set of multiple tiles. The size of the tile for each input channel 104 is equal to the size of the sub-filter kernel of each kernel filter 112 that is applied to that input channel 104.

After dividing the input tensor 102, the input stream generator 122 identifies a flattening order. This is the order in which the values of each tile in the input tensor 102 are read. The order can be any order, and can include a row-major order, column-major order, diagonal-major order, aisle-major, and so on. In the row-major order, the values in each row are read in a particular order (e.g., left to right), and each row in turn is read in a particular order as well (e.g., top to bottom). In the column-major order, instead of reading each row, each column is read in a particular order (e.g., left to right), with the values in each row being read in a particular order for each column (e.g., top to bottom). In diagonal-major order, the tile may be read along the diagonal. If the tile includes more than one layer, each layer may be processed successively. Other orders can also be possible, so long as the same ordering pattern is used subsequently in the generation of the expanded kernel 128 and the generation of the control pattern 136.

The input stream generator 122 reads the values of each tile in the identified flattening order, and arranges the values as they are read for each tile in a single vector, thereby "flattening" the tile. The input stream generator 122 reads all the tiles of the input tensor 102 and generates a corresponding number of vectors. The vectors are placed parallel to each other to generate the flattened input stream 124. The input stream generator 122 may read the tiles in a particular order, such as a row-major order, column-major order, or so on. So long as the order of the tiles is reflected in the generation of the expanded kernel 128 and the control pattern 136, any order can be used, and a valid output can be generated by the multiply-add unit 140.

If the input tensor 102 includes multiple input channels 104, then the matrix for each input channel 104 is processed separately, to generate a flattened input stream for each matrix of each input channel 104. The multiple flattened input streams may be combined together to form the (combined) flattened input stream 124. The multiple flattened input streams may be combined by "stacking" them together, concatenating them together, or via some other combination method.

The flattened input stream 124 is the result of the input stream generator 122 flattening the input tensor 102. Regardless of the number of dimensions of the input tensor 102, the flattened input stream 124 for each matrix of the input tensor 102 is (at most) two dimensional. This is because each tile of the input tensor 102 is converted into a vector, as described above, and the vectors are placed parallel to each other. In one embodiment, if the input tensor 102 includes multiple input channels 104, the flattened input stream generated from each matrix of each input channel 104 may be combined with the flattened input streams of other matrices of other input channels 104 by laying (in the computer-readable memory) each flattened input stream next to each other, either vertically or horizontally. The combined flattened input stream may also be represented three dimensionally, with each flattened input stream generated from each input channel stacked on top of each other. In memory, this may be represented using a depth first storage approach, with the values along the depth of the three dimensional flattened input stream stored as the major order.

The flattened input stream 124 may be fed into a buffer or stored in memory. It can be read by the multiply-add unit 140 and referenced according to the tile number that each vector in the flattened input stream 124 corresponds to. In the illustrated example, the tiles of the flattened input stream 124 range from 0 to K to J. Here, tile #1+K represents a tile in the original input tensor 102 that is the first tile on a second row (or column) of tiles. The value K represents the number of tiles in a row or column of the padded input tensor 102 (depending on the order in which the tiles are read), and changes depending upon the width of the input tensor 102. For example, an input tensor having a padded width of 9 would have a K value of 3 if the kernel, and thus, the tile, were a 3×3 matrix. In this case, three tiles fit along the width of the input tensor, and thus the number of the first tile on the second row (i.e. the fourth tile overall) would be tile number 3 because the tile count begins from 0. If the input tensor 102 includes additional dimensions, additional markers are indicated for the first tile of each second series of values for that dimension. For example, if the input tensor 102 includes three dimensions, a separate marker M would indicate the number of tiles in a single layer of the input tensor 102, and the tile #1+M would indicate the index value of the first tile in the second layer of the input tensor 102. These markers, along with the tile numbers, can be used by the multiply-add unit to reference or point to the correct tile in the flattened input stream 124, as described below, using the indicators in the control pattern 136. Alternatively, the tile numbers, including the markers, may be used as clock cycle delay values to allow the multiply-add unit 140 to delay the reading of values from a buffer containing the flattened input stream 124. This allows the multiply-add unit 140 to similarly reference specific tiles in the flattened input stream 124.

This method of access, along with the other components of the system 100, as described in further detail below, allows the system 100 to make only $2^{s-1}$ reads of the input tensor 102, where s is the number of dimensions of the input, as compared to a standard convolution, which would require reads of some values in the input tensor equal to the number of values in the kernel 110, thus saving significant resources. Additional details regarding the input stream generator 122 and the flattened input stream 124 are described below with reference to FIGS. 3-6B.

The expanded kernel generator 126 generates the expanded kernel 128, which is used by the multiply-add unit 140 along with the flattened input stream 124 and the control pattern 136 to generate the output activations 142. The expanded kernel 128 is generated from the kernel 110. The purpose of "expanding" the kernel is so that a selected vector of input values of the flattened input stream 124 can be multiplied using a simple dot product with a vector (e.g., a column, row, aisle) of the expanded kernel 128, instead of having to stride the original kernel 110 over the input tensor 102, as shown below. This significantly simplifies the generation of the output activations 142. The expansion of the kernel 110 follows a specific pattern involving generating rotational combinations of the kernel 110 in a hierarchical manner. In the following description, reference is made to a first, additional, and last dimension. This is simply a means to refer to the dimensions of the kernel in an organized fashion, as the kernel may have one to many dimensions, and is not intended to indicate a ranking or size of each dimension. For example, if a kernel were three dimensional, a last dimension of the kernel does not necessarily refer to some three dimensional representation of the kernel, but simply to dimension number 3 of the kernel, insofar as it has 3 different dimension numbers (e.g., dimension 1, dimension 2, and dimension 3).

In one embodiment, the expanded kernel generator 126 takes a first dimension of the kernel 110 (or one kernel filter 112 or sub-filter kernel of a kennel filter 112) and generates a square block of values for each single dimensional vector of the kernel that includes all rotations of that single dimensional vector. The block is generated by placing each of the rotations in parallel to each single dimensional vector. For example, a 3×3 two dimensional kernel would have for a dimension 1, three 3×1 single dimensional vectors. For each of these vectors, all possible rotations of that vector are generated, thus creating two additional single dimensional vectors for each. These are placed parallel to the single dimensional vector that was used to generate the additional vectors, creating a square block for each single dimensional vector. These square blocks may be known as circulant matrices.

Thereafter, for each additional dimension of the kernel, the blocks of the immediately preceding or lower dimension area are grouped into sets. Each set includes the blocks of the immediately preceding dimension that are aligned along a vector that is parallel to the axis of that dimension. Thus, turning back to the example of the 3×3 matrix, if the previously generated square blocks were placed in the same position as the sources from which they were generated (i.e., the single dimensional vectors), then for dimension 2, a vector can pass through all the generated blocks. Thus, the set for dimension 2 includes all the blocks generated in the previous operation. In the 3×3 kernel, this includes three blocks, one for each vector of the kernel.

With each set that is generated, the expanded kernel generator 126 generates all rotations of the blocks in that set. Using the prior example, three blocks are in the sole set for dimension 2. Thus, the rotations for this set generate two additional combinations of the three blocks, totaling 9 blocks. The two additional combinations are placed parallel to the blocks in the set, similar to the method described above for the single dimensional vectors. Here, as all the dimensions of the two dimensional kernel are considered, the expanded kernel generator 126 ends the generation of the expanded kernel, and the combined result of the 9 blocks is output as the expanded kernel 128.

However, if the kernel 110 includes further dimensions, the above process is repeated, resulting in different sets of blocks being rotated and combined. This eventually results in all the dimensions being considered, and the resulting combination of all the blocks with the blocks of lower dimensions is output as the expanded kernel 128. Therefore, as the number of dimensions increases, the number of sets increases. In each additional dimension, after rotating the blocks from the preceding dimension that align along the vector as described above, the combinations of the rotated blocks are placed in a new block. These new blocks are used in the computation of the next additional dimension and combined in various rotations. This continues until the last dimension, which has a dimension number equal to the total number of dimensions for the kernel. At the last dimension, a final set of rotations is performed, and the resulting combination of rotations is output as the expanded kernel. Therefore, the number of sets of blocks reduces in number for each additional dimension that is processed, and after rotations for the final dimension are processed, only a single set, the output block, remains.

The number of vectors (e.g., rows or columns) of the expanded kernel 128 further equals the number of elements in the kernel, or the number of elements in a tile of the input tensor 102. The actual size of expanded kernel 128 itself is dependent upon the size of the kernel 110. Each dimension of the two dimensional expanded kernel 128 has a size equal to the product of the size values of each dimension of the kernel 110. For example, if the kernel were a 2×2×2 matrix, then the expanded kernel 128 would have eight vectors (2^3)

and thus would have a size of 8×8, as the product of the values of the dimensions of the kernel is 8.

The expanded kernel 128 that is generated can be used, as described herein, in a dot product with selected values from the flattened input stream 124 to generate the output activations 142. As described previously, the values in the flattened input stream 124 may be selected via a delay or pointer using the indicators of the control pattern 136. After selecting these values, the selected values can then be combined with a selected vector of the expanded kernel 128 to generate an output value of the output activations 142 by multiplying each vector of the expanded kernel 128 with different selected values from the flattened input stream 124. As the number of vectors of the expanded kernel 128 equals the number of elements in a tile (which is the same size as the kernel 110 as previously described), the number of output values also equals the same number of elements for each tile, and thus comprises a tile of the output activations 142 (or an output matrix of values in the case of multiple kernel filters). The position of the tile in a matrix of the output activations 142 has a position that corresponds to a same position tile of the matrix of the input tensor 102.

Figure 2:
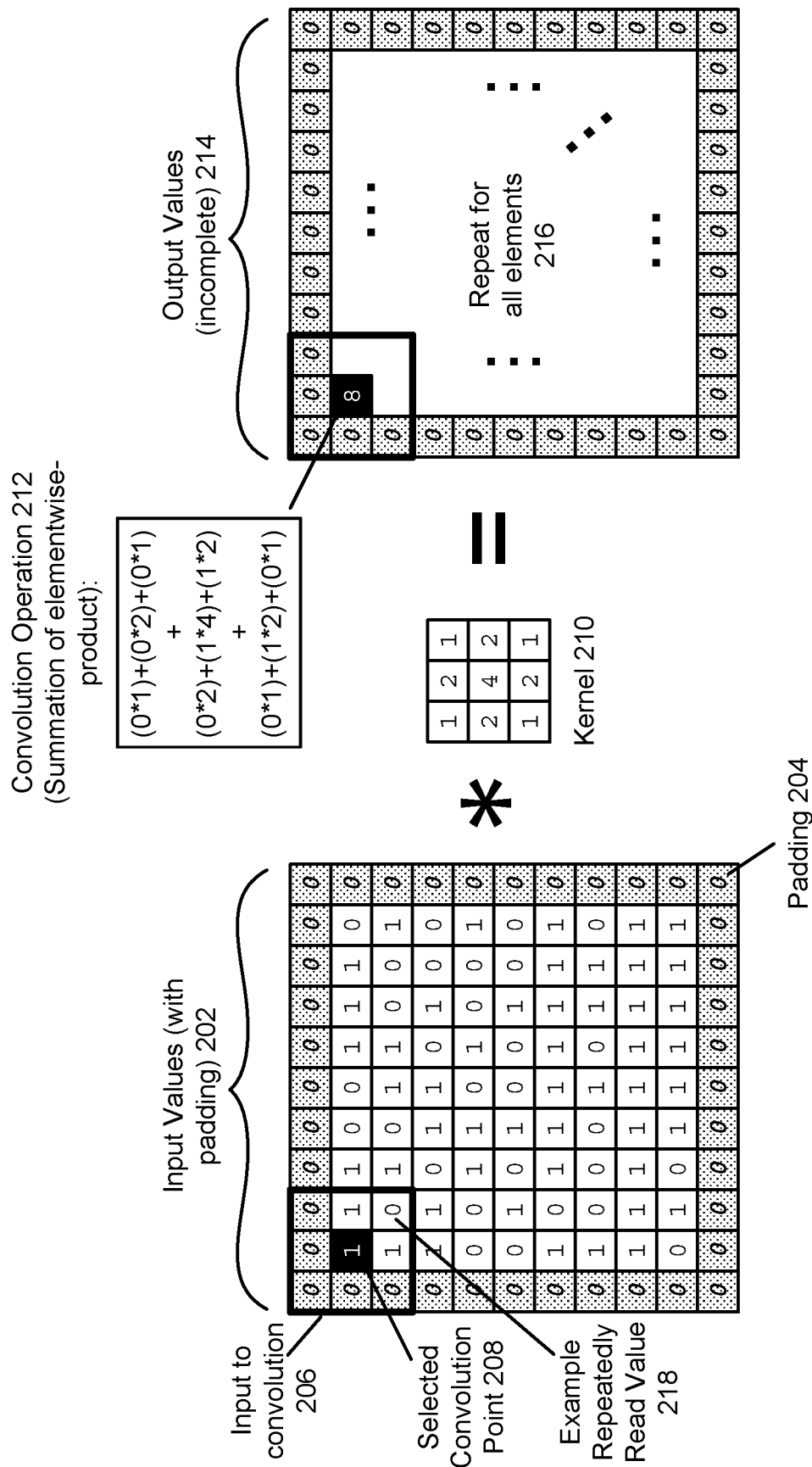
FIG. 2 is an example of a convolution of a two dimensional input by a kernel, in accordance with an embodiment.

The system 100 described here allows for the computation of the values in each output tile without having to re-read the input values as many times as in a naïve approach, such as the one described in FIG. 2. Each output tile is generated in a single pass of the expanded kernel and single selection of values from the flattened input stream 124, instead of by reading certain values in the input tensor repeatedly as the kernel 110 is slid across the input tensor 102 to each of the positions corresponding to the positions in the output tile.

In the case of multiple kernel filters 112, an expanded kernel would be generated for each kernel filter 112, and applied to the input, similar to the process described above. In the case of multiple input channels 104, each kernel filter 112 has multiple sub-filter kernels, each corresponding to an input channel 104. In this case, an expanded kernel would be generated for each sub-filter kernel, and each expanded kernel generated from each sub-filter kernel would be applied to a relevant portion of the flattened input stream 124 that corresponds to the input channel 104 for which that sub-filter kernel would have been applied in a naïve implementation of convolution. Additional details regarding the generation of the expanded kernel are described below with reference to FIGS. 7-10C.

The control pattern generator 134 generates the control pattern 136, based on information about the kernel size in the kernel size input 132. The kernel size indicates the size of each dimension of the kernel 110 (or of each kernel filter). The control pattern generator 134 takes this information and generates the control pattern 136 that is the same for kernels of the same size and dimensions. The control pattern generator 134 generates the value for each position of the control pattern 136 based on the coordinates (e.g., row number, column number) of that position, as well as the size of the dimensions of the kernel. For each position, the control pattern generator 134 executes one or more test inequalities (equal to the number of dimensions of the kernel). Each test inequality is an inequality between a modulo operation of the row number and a modulo operation of the column number of that position in the control pattern 136. The result of the test inequalities (i.e., true or false) are used to reference a table of control pattern values in order to generate the value for that position in the control pattern.

Although the control pattern generator 134 is described here as generating the control pattern 136 based on the kernel size input 132 using a programmatic method, in other embodiments the control pattern generator 134 accesses a pre-generated version of the control pattern 136 from memory, non-volatile storage, a program instruction stack, or other source, and selects the correct pre-generated control pattern 136 from this source based on the kernel size input 132.

The control pattern 136 is a matrix that indicates to the multiply-add unit 140 which portions of the flattened input stream 124 to select from in order to generate the selected values that are multiplied (using the dot product) with the vector of the expanded kernel 128 to generate each output value. In a naïve implementation of convolution, for each stride of the kernel 110 at a position on the input tensor 102, the convolution operation is performed by summing the values adjacent to the position representing the current focus of the kernel along with the value at the focus point itself, as weighted by the corresponding values in the kernel (which are at the same positions). The resultant sum is the output value for the position corresponding to that focus. Hence, for each focus position, different values from the input tensor 102 are selected for summation. As the flattened input stream 124 is divided into different tiles, each output position, and in particular each output position in an output tile, are computed using values from an input tile at the same position as the output tile, or from input values in adjacent input tiles. Therefore, the control pattern 136 indicates to the multiply-add unit 140, for each output position in a tile, the different specific input tiles from which to pull the input values to perform the convolution computation, i.e., the previously noted dot product. In particular, each vector of the control pattern 136 corresponds to a different position in the output tile and indicates the tile from the input matrix from which to select input values for the computation of the value of the output position.

As the output is generated tile by tile, the control pattern 136 may only need to indicate the input tile that has a position that corresponds to the position of the current output tile being processed, as well as input tiles that have positions corresponding to adjacent positions to the current output tile being processed. For example, in a two dimensional matrix of the input tensor 102, the tiles are horizontally and vertically adjacent to the current output tile being processed. In a three dimensional matrix, this may include the tiles that are in adjacent layers. For higher dimensional matrices, this would include further tiles that are "adjacent." Thus, the number of tile positions indicated by the control pattern 136 is a power of two of the dimensional size of the input matrix. The size of the control pattern 136 is the same size as the expanded kernel 128 generated from the kernel 110.

The control pattern 136 indicates tiles in accordance with the tile number of each tile in the flattened input stream 124. As adjacent tiles to an input tile are not necessarily adjacent in tile number, the indicators in the control pattern 136 do not indicate tiles directly via tile number, but via relative positions in relation to the tile number of the current tile being processed. Thus, for example, a relative position may indicate the current tile, a row (or column) below (or to the right of) the current tile, or a layer behind the current tile. As the width/height and depth of a matrix of the input tensor 102 is known, the relative positions can be computed based on this information. For example, a tile that is a row below the current tile would be the tile number of the current tile plus the width of the matrix. Therefore, the control pattern 136 may indicate for such a tile the value of the row width, or a pointer or reference to the row width. A tile that is a row below and one to the right of the current tile would be indicated by the current tile number, plus the row width, plus one. Thus, the control pattern 136 may indicate for such a tile the row width+1, or an indicator of the row width+1. In one embodiment, the row width is the variable K as described above. Each of these combinations of indicators may be indicated by one or more bits. As the control pattern 136 has a fractal pattern, each subsection of the matrix of the control pattern 136 may be indicated by a single major bit, with additional subsections indicated by additional bits, and the individual values in that subsection having a second bit. The combination of the individual value and the subsections that that value belong to indicate the relative tile position.

In the case of multiple kernel filters 112, multiple control patterns 136 may be selected if the kernel filter, or sub-filter kernel, has different dimensions. For each kernel of a different dimension, a corresponding control pattern 136 would be selected or generated according to the methods described above. The corresponding control pattern 136 would be used to select values from the portion of the flattened input stream 124. Additional details regarding the generation of the control pattern 136 and its characteristics are described below with reference to FIGS. 11-13.

The multiply-add unit 140 performs the final computation using the flattened input stream 124, the expanded kernel 128, and the control pattern 136 to generate the output activations 142. As described in some detail above, the multiply-add unit 140 selects values from the flattened input stream 124 using the indicators from the control pattern 136. Each vector in the control pattern 136 indicates the specific tile from the flattened input stream 124 from which to access an input value, as described above. The identifier at each position in the control pattern 136 corresponds to an indication of which tile, i.e., which vector, of the flattened input stream 124 from which to select the input value. The position within the vector of the control pattern 136 also corresponds to the position of the selected vector in the flattened input stream 124 which contains the correct input value. By parsing through the entire vector of the control pattern 136, the multiply-add unit 140 generates a vector of selected input values.

The multiply-add unit 140 further selects a corresponding vector of the expanded kernel 128 that matches the position of the vector (e.g., a row number or column number) of the control pattern 136 which was used to select the values from the flattened input stream 124. The multiply-add unit 140 performs a dot product between the selected vector of the expanded kernel 128, and the vector comprising the selected values of the flattened input stream 124, to generate a single output value. The single output value is placed on an output tile that matches the position of the input tile currently being processed. Furthermore, the position of the single output value in the output tile corresponds to the position number of the vector in the control pattern 136 (or expanded kernel 128) used to generate that single output value.

The multiply-add unit 140 repeats the process described here for all vectors in the control pattern 136 (and expanded kernel 128), thus generating a total number of output values equal to the number of positions within the output tile. This allows the multiply-add unit 140 to generate an output tile of the output activations 142 for each input tile from the input tensor 102. The multiply-add unit 140 further repeats this process for all input tiles of the input tensor 102, in order to generate a same number of output tiles for the output activations 142. After generating the entire set of output tiles, the multiply-add unit 140 outputs the completed set of output tiles as the final output of the output activations 142.

In the case of multiple input channels 104, the multiply-add unit 140 generates "pre-outputs" for each input channel 104 using the specific sub-filter kernel or kernel component of the kernel 110 designated for that input channel 104. Each pre-output is generated in the same fashion as the output described above. However, after generating all the pre-outputs for each input channel, the multiply-add unit 140 sums the values of the pre-outputs into a single output matrix, which may be the output activations 142.

In the case of multiple kernel filters 112, the multiply-add unit 140 further applies each kernel filter 112 to the input tensor 102, and if there are multiple input channels 104, the multiply-add unit 140 applies each kernel filter 112 to all the input channels 104 as described above and sums the pre-outputs. This creates, for each kernel filter 112, a separate output feature 144. Each output feature 144 is a matrix of the same size as an input channel 104. The collection of all the output features 144 represents the output activations 142, and may be used as input channels 104 in a next layer of the neural network (i.e., the output activations 142 of one layer becomes the input tensor 102 of a next layer of the neural network). Additional details regarding the multiply-add unit 140 are described below with reference to FIGS. 14-17B.

Example Convolution Operation

FIG. 2 is an example of a convolution of a two dimensional input by a kernel, in accordance with an embodiment. While the input values 202 and output values 214 described herein are represented using matrices, in practice they may simply be represented using arrays, flat files, trees, or other methods and do not need to be arranged as a matrix, so long as the computational results are the same.

To perform a convolution on a set of input values 202, padding may first be applied to the input values 202, such that the "focus" of the kernel can be applied to the values at the edge of the input values 202, to allow for the size of the output values 214 to be the same as the size of the input values. However, in other cases padding is not applied to the input values 202, in which case the size of the output values 214 is smaller than the size of the input 202. Compared to the size of the input values 202, each side of the output values 214 are shrunk by a number of elements equal to the number of elements between the edge of the kernel and the focus point of the kernel, on the same side of the kernel as the side of the output values 214. The edge of the input values 202 is conceptually the position around the outer boundary of the matrix representing the input values 202 such that no other values are further from the center of the matrix than the values on this edge. As noted above, the "focus" (which may also be known as an "origin") of the kernel is the position of the kernel, which is conceptually above the current output pixel. Typically, it would correspond to a position of one of the values/elements in the kernel, and for a symmetric kernel, such as the 3×3 kernel in the illustrated example, the focus is usually the center element.

Therefore, in order for the position of the output values 214 to match the positions of the input values 202, padding is added to the input values such that the focus of the kernel when striding over the first position in the input values results in the focus being on the position of the input values 202 that matches the edge values on the matrix of the input values 202, and subsequently the generated output values 214 have a position that match the positions of these edge values. This ensures that the size of the output values 214 is the same as the size of the input values 202.

Thus, in the illustrated example, padding 204 of width 1 is added around the edges of the matrix representing the input values 202. Here, the padded input values 202 has a size that is a multiple of the size of the kernel 210, and thus additional padding is not needed to allow the size to become a multiple of the size of the kernel.

After padding, the kernel 210 is applied to the input values 202. The kernel 210 is applied by striding (i.e., moving) the kernel 210 across the entire input values 202. The kernel is strided over the input values 202 according to a stride value. The stride value is a value that determines how far to move the kernel for each stride. If this value is one, then the focus of the kernel is strided over every possible position of the input values 202. Due to the padding the kernel 210 does not exceed the boundaries of the padded input values 202 at any time, but the focus of the kernel can overlap every one of the original values of the input values 202. Note that if the stride value exceeds one, then the focus of the kernel is not applied to every value of the input values 202.

For every input value that is the focus of the kernel 210, a convolution operation 212 is performed on the input values 202 which are conceptually under the kernel 210. Thus, in the illustrated example, the focus of the kernel is the selected convolution point 208. Here, as illustrated by the heavily weighted dark square box 206 surrounding the selected convolution point 208, a total of 9 values, equal to the size of the kernel 210, and surrounding the selected convolution point 208, are selected. If the focus of the kernel 210 were not in its center, then this box would be shifted accordingly such that the position of the box would have its corresponding focus position be the selected convolution point 208. For example, if the focus point were the top left corner of the kernel 210, the box would be shifted down one spot and right one spot, such that the selected convolution point 208 were at the top left corner of the box.

The convolution operation 212 takes each of the input values 202 that are under the aforementioned boundary box 206 and performs a dot product between the input values 202 under the box and the values of the kernel 210, to generate a single output value of the output values 214. As illustrated, this output is "8" for the kernel 210 and the input values 202 when the focus of the kernel 210 is at the selected convolution point 208. Here, due to the padding and the selected focus position, the position of the output value is the same as the position of the selected convolution point 208 in the input values 202.

The kernel is then strided over one position in the input values 202 (either horizontally or vertically) and the convolution operation 212 is repeated. The convolution operation 212 is completed when the focus of the kernel 212 has visited all possible input values 202. This creates a completed set of output values with the same size as the input values (without padding). Such a convolution operation allows input values to be modified by weights (the kernel) and combined with other values in the input to generate a new output.

Mathematically, the convolution operation may be represented as:

$$c = A * B = \begin{bmatrix} a11 & \cdots & a1N \\ \vdots & \ddots & \vdots \\ aM1 & \cdots & aMN \end{bmatrix} * \begin{bmatrix} b11 & \cdots & b1N \\ \vdots & \ddots & \vdots \\ bM1 & \cdots & bMN \end{bmatrix} = \sum_{i=1}^{N} \sum_{j=1}^{M} a_{ij} * b_{ij} \quad (1)$$

Here, A may be the kernel, B may be the kernel, and c is the convolution result.

This convolution operation allows for a neural network to process complex data and generate a desired output based on that data. However, as shown here, this causes the same input values, such as the example repeatedly read value 218, to be read multiple times as the kernel 210 strides over the input values 202. During a single convolution of the input values, the example repeatedly read value 218 would be read nine times in the illustrated example as nine kernel positions will overlap with this value. If additional kernels are applied to the input values 202 as described, even more repeated reads will be made of that same value 218. Thus, while the convolution operation 212 is a powerful tool in machine learning, in a naïve approach as shown here, it can potentially generate a very large number of reads, i.e., a very large number of I/O operations, which can become a problem as input values 202 grow and as the number of convolutions increases. Therefore, as disclosed herein, a more optimized approach is provided which can significantly reduce the number of repeated reads of the values of the input. As noted above, the number of reads can be reduced to $2^{s-1}$ reads, where s is the number of dimensions of the input. Therefore, in the example here, only 2 reads are necessary for the two dimensional matrix of the input values 202, as opposed to the nine reads for each value as described above for the example value 218.

Flattened Input Stream Generation

Figure 3:
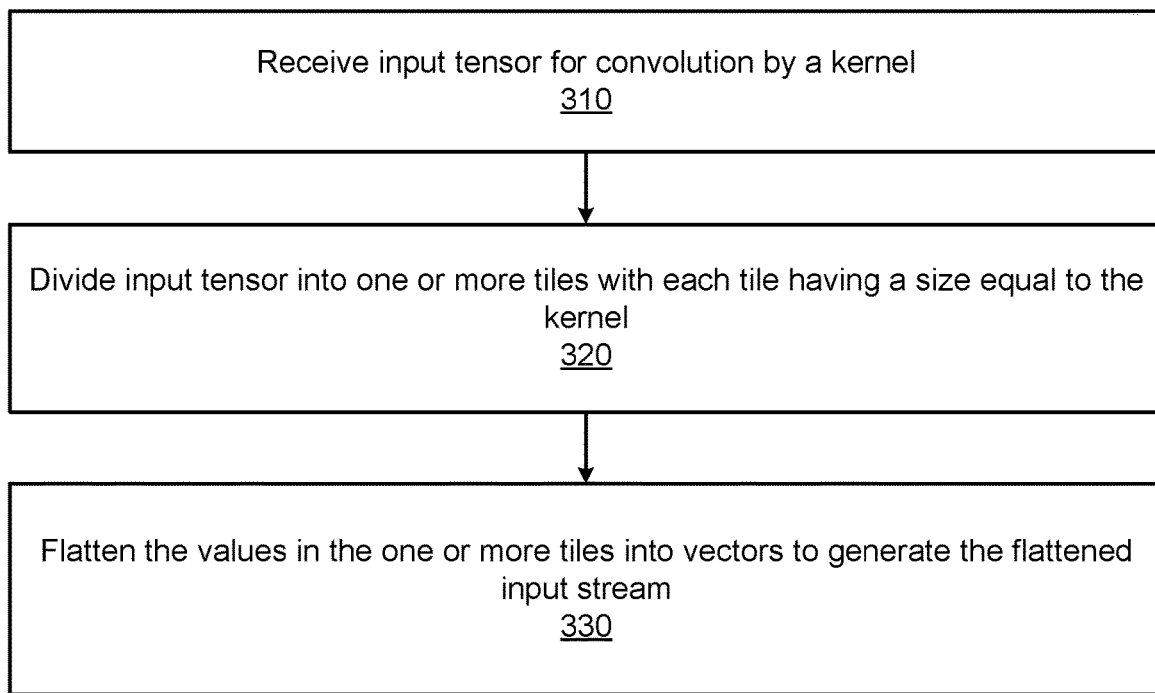
FIG. 3 is a flow diagram illustrating a method of flattening an input tensor, in accordance with an embodiment.

FIG. 3 is a flow diagram 300 illustrating a method of flattening an input tensor, in accordance with an embodiment. Although the illustrated flow diagram may show an order of operations, the operations illustrated may be performed in any order, and may have a greater or fewer number of operations. In one embodiment, the operations illustrated in FIG. 3 may be performed by the input stream generator 122.

The input stream generator 122 receives 310 an input tensor for convolution by a kernel. This input tensor may be the input tensor 102. The kernel may be kernel 110. In one embodiment, the input stream generator 122 pads the input tensor with padding values such that an output of the convolution of the input tensor using the kernel has a same size as the input tensor. In one embodiment, the input tensor with padding values has a size for each padded input tensor dimension that is a whole number multiple of the corresponding dimension of the kernel. In yet another embodiment, the input stream generator 122 pads a trailing edge of each dimension of the input tensor with padding values having a width equal to the size of the kernel in the corresponding dimension. The trailing edge of each dimension is an edge (i.e., a face or other end) of the input tensor that has a largest index value. The padding values may be zero or null, or some other value.

The input stream generator 122 divides 320 the input tensor into one or more tiles with each tile having a size equal to the kernel. Thus, a 9×9 input tensor (including padding) would be divided into 9 (two dimensional or 2D) tiles if the kernel were a 3×3 kernel. Similarly, a 9×9×9 input tensor would be divided into 27 (three dimensional or 3D) tiles given a 3×3×3 kernel. In one embodiment, the kernel does not have square dimensions, and in this case the input stream generator 122 divides the input tensor in an order aligned with a direction of the stride of the kernel across the input tensor. Therefore, if the kernel is strided in a row-major approach (left to right), then the input tensor is divided up along each row, before going to the next row, and so on. Alternatively, in another embodiment, the input stream generator 122 divides the input tensor in an order orthogonal with a direction of the stride of the kernel across the input tensor. Thus, in the above example, the input tensor is divided up along each column first (top to bottom, then to the next column).

The input stream generator 122 flattens 330 the values in the one or more tiles into vectors to generate the flattened input stream. This may comprise, for each of the one or more tiles of the input tensor, accessing the values of the tile in a defined order, arranging the values in a vector according to the defined order, and arranging the one or more vectors corresponding to each of the one or more tiles in a parallel arrangement to generate the flattened input stream. This defined order may be a row-major order, a column-major order, or an aisle-major order. The aisle-major order accesses elements in a three-dimensional (3D) tile first along an axis corresponding to the depth of the 3D tile and subsequently along axes corresponding to the width and height of the 3D tile. Although the flattened input is shown as being two-dimensional here, in other embodiments it includes more dimensions.

The flattened input stream may be stored in a buffer. The buffer can be read by a hardware accelerated processor to perform a multiply-add operation with 1) the values in the flattened input stream as selected by a control pattern, and 2) an expansion of the kernel, to generate an output of the convolution operation without multiple loads of the values of the input tensor into the buffer, as described herein.

In addition, the input tensor has a plurality of channels, wherein the kernel has a plurality of filters, and wherein the input channels are convolved with each kernel filter to generate an output with a plurality of output channels.

Additional examples of flattening the input stream are provided below with regards to FIGS. 4, 5A-5C, and 6A-6B for kernels of different dimensions.

Figure 4:
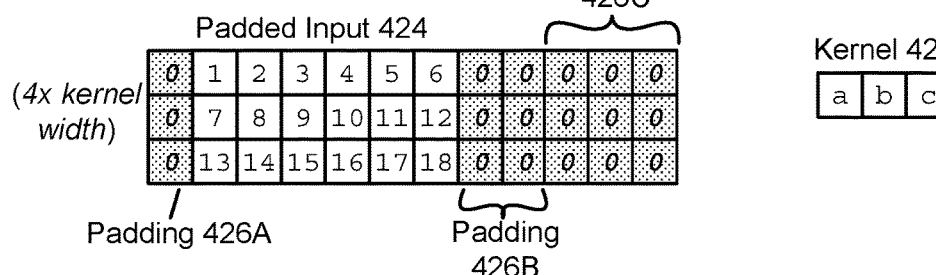
FIG. 4 illustrates an example of flattening of an input tensor in the case of a one dimensional kernel, in accordance with an embodiment.

FIG. 4 illustrates an example 400 of flattening of an input tensor in the case of a one dimensional kernel, in accordance with an embodiment. In one embodiment, the process described here may be performed by the input stream generator 122.

At 401, the input stream generator 122 receives the input 420. In the illustrated example, the input 420 is a 6×3 set of input values, represented as a matrix. At 402, the input stream generator 122 pads the input 420 based on the kernel size. The input stream generator 122 pads the input 420 such that the focus of the kernel 422 (which is the center value b) may correspond to the same positions of the input 420 in order to generate the same size output, as described previously. This causes the input stream generator 122 to add the padding 426A. The input stream generator 122 also pads the input 420 such that it is a multiple (modulo) of the kernel size. This adds the two columns of padding in padding 426B. Finally, in one embodiment, due to hardware requirements, the input stream generator 122 pads the trailing edge of the input 420 with padding equal to the width of the kernel. Here the kernel 422 is 3 wide, and so a 3 wide padding is added to the end of the input 420, resulting in three additional columns of padding at padding 426C.

At 403, the input stream generator 122 divides the now padded input 424 into tiles with size equal to the kernel 422 to create the tiled input 428. As the kernel is a 3×1 size matrix, the padded input 424 is divided into tiles each with size 3×1. This results in 12 tiles. Here the tiles are divided and ordered in row-major form, such that the padded input 424 is divided up row by row. However, the tiles could also be divided up column by column, in which case tile 1 would be [0,0,0], tile 2 would be [1,7,13], and so on. So long as subsequent operations also follow the same orientation, the resulting output will be identical.

At 404, the input stream generator 122 transforms the tiled input 428 into a flattened input 430. Here, the direction of input 432 indicates the direction in which the flattened input 430 is input into the next step (the multiply-add unit 140). Thus, tile 1 is placed first, followed by tile 2, until tile 12. Each tile is transformed into a single vector and placed parallel to the other vectors which are transformed from the other tiles. Since the tiles here are already vectors, no additional transformation takes place. However, as shown in subsequent examples, the tiles may not always be vectors, and in such a case they are flattened to become vectors.

This flattened input 430 may be stored as an array, tree, or other structure, and may be stored in a buffer, memory or other storage medium. Each of the values in the tiles may be accessed using a reference pointer, memory address, or according to a clock cycle delay. In the case of the clock cycle delay, the flattened input 430 may be read in one vector at a time, and different reads can be delayed by a certain number of clock cycles in order to access different vectors in the flattened input 430. For example, tile 7 may be accessed by delaying access by seven clock cycles.

FIG. 5A illustrates a first part of an example 500 of flattening an input tensor in the case of a two dimensional kernel, in accordance with an embodiment. In contrast to the example in FIG. 4, in FIGS. 5A-5B a two dimensional kernel is used, resulting in two dimensional tiles. In one embodiment, the process may be performed by the input stream generator 122.

At 501, the input stream generator 122 receives the input, and pads it based on the kernel size to generate the padded input 520. As noted previously, the padding satisfies three requirements: 1) to allow the output values to be the same size as the input values, padding may be added based on the focus point of the kernel; 2) the input may be further padded such that it is a modulo of the kernel size; and 3) an additional kernel width of padding is added to the trailing edge of the input in certain embodiments due to hardware requirements.

Therefore, in the illustrated example, a vector width of padding is added to the outside of the input, and an additional kernel width of padding is added to the right and bottom sides of the input (the trailing edges). As the kernel 522 is a 3×3 kernel, the additional padding is 3 unit wide on the right, and 3 units high on the bottom.

At 502, the input stream generator 122 divides the padded input 520 into tiles of size equal to the kernel. As the kernel is 3×3, each tile is thus 3×3 in size. This creates the tiled input 524. The row size of the tiled input 524 is indicated using the variable K, which is used subsequently to index to the tiles in a second row from the tile that is being processed. Thus, the first tile on the second row of the tiled input 524 is tile 1+K, while the tile to the right of this is tile 1+K+1. Note that if the first tile were indexed from "0," K would be set to [row tile size]+1 instead of the row tile size.

The process is further described in FIG. 5B, which illustrates a second part of the example of flattening an input tensor in the case of a two dimensional kernel, in accordance with an embodiment.

At 503, the input stream generator 122 flattens the tiles in the image into vectors according to a specific tile order. Here, the flattening order is row major, as indicated by the flattening order 532 for the single tile 530 example. In other words, for each tile, the values in that tile are read row by row, as shown by the directional arrow, and placed in a vector for that tile in the flattened input 528. This vector, like the one for the flattened input 430, is placed parallel to the vectors generated for the other tiles (according to the same flattening order) and used as input into the multiply-add unit 140 according to the direction of input 534. Although the vector is shown as being vertical, the orientation can be different in other embodiments.

In another embodiment, the flattening order 538 is column-major instead, meaning the values in each tile are read column by column and then placed in a single vector and placed parallel to other vectors generated from the other tiles of the padded input. Thus, in contrast to the flattened input 528, where the vector for tile 1 is ordered [0,0,0,0,1,2,0,11, 12], here the vector for tile 1 is instead ordered [0,0,0,0,1, 11,0,2,12], as the values in tile 1 were read column by column instead of row by row. The exact flattening order 538 does not impact the output, so long as the order of the other processes in the generation of the output values corresponds to the same ordering.

FIG. 5C illustrates an example of flattening an input tensor for multiple input channels, in accordance with an embodiment. In one embodiment, the input tensor 102 may have multiple input channels 104A-N as described in FIG. 1. The multiple input channels are be convolved with the kernel. The outputs of these convolutions with the kernel are summed together to generate the output activations. If there are multiple kernel filters in the kernel, each kernel filter is convolved with the multiple input channels to generate an output feature. Each input channel may correspond to a different component of the input, such as a color channel, etc. In one embodiment, the process may be performed by the input stream generator 122.

At 504, the input stream generator 122 tiles any additional input channels with the first flattened input. For the sake of clarity, the kernel 542 is shown as a 2×2 kernel. Thus, each tile is 2×2, and each vector is a 1×4 vector. Here, each input channel 540A (generally input channel 540) is similar to the input from 501, and thus the input stream generator 122 pads each input channel 540 and flattens it, generating the flattened input channels 544A-N. In one embodiment, these are then "stacked" on top of each other to generate the flattened input stream 546. However, in other embodiments, they may be combined differently, such as via concatenation, placement in a 3D array, and so on. In either of these cases, the flattened input stream 546 is a combination of the various flattened input channels 544, and the corresponding tiles of each of the flattened input channels 544 may be referenced together in the flattened input stream 546. Thus, for example, a reference to tile 5 with the flattened input stream 546 (whether by delayed clock cycle or other means) will be able to reference tile 5 in all the flattened input channels 544 that comprise the flattened input stream 546.

FIG. 6A illustrates a first part of an example of flattening an input tensor in the case of a three dimensional kernel, in accordance with an embodiment. As with the FIGS. 4-5C, in one embodiment the process described here may be executed by the input stream generator 122.

At 601, the input stream generator 122 receives the three dimensional input and pads the input to generate the padded input 626, similar to the method described above with reference to FIGS. 4-5C. For the sake of clarity, only a single width of padding 628 is shown here. In addition, and for clarity, the actual input values 630 are not shown here, as they would overlap in the perspective representation. Instead, padding 628 values are shown as cubes with a dark grey pattern, and input values 630 are shown as white cubes. The same applies for the kernel 632 and the kernel values 634. Note that the padded input 626 has three dimensions 106: a dimension 1 106A, dimension 2 106B, and a dimension 3 106C. In some cases, the dimension 1 may be referred to as the width, the dimension 2 as the height, and the dimension 3 as the depth. Furthermore, the dimension 1 may be referred to as having columns, the dimension 2 may be referred to as having rows, and the dimension 3 may be referred to as having aisles or layers.

At 602, the input stream generator 122 tiles the padded input 626 into tiles with a size equal to the kernel 632 to generate the tile input 626. As the exemplary kernel 632 is of size 2×2×2, and may be represented by a three dimensional matrix, the tiles are also of size 2×2×2. In addition to the K variable 636 indicating the number of tiles in a row of the tiled input, the three dimensional input also includes an M variable indicating the number of tiles in a layer of the tiled input. When computing output values that have a position corresponding to a current tile, inputs may be needed from a tile that is one layer behind the current tile, as well as the tile below the current tile (as with the case of the 2D input). Therefore, in addition to the K parameter that can be used to indicate the location of the tile that is below the current tile, the M parameter can be used to indicate the tile that is behind the current tile. Although reference is made to directions such as below and behind, in practice the input tiles may not be arranged geometrically as shown here and may be indicated abstractly in a data structure. However, the same K and M parameters would apply. As the padded input 626 has a width of 6 and a height of 6, each layer of tiles includes 9 tiles, as the 2×2 layers of the kernel divides evenly nine times into the 6×6 layers of the padded input 626. Therefore, the M parameter is 9, and the K parameter is 3 in the illustrated example.

Figure 6B:
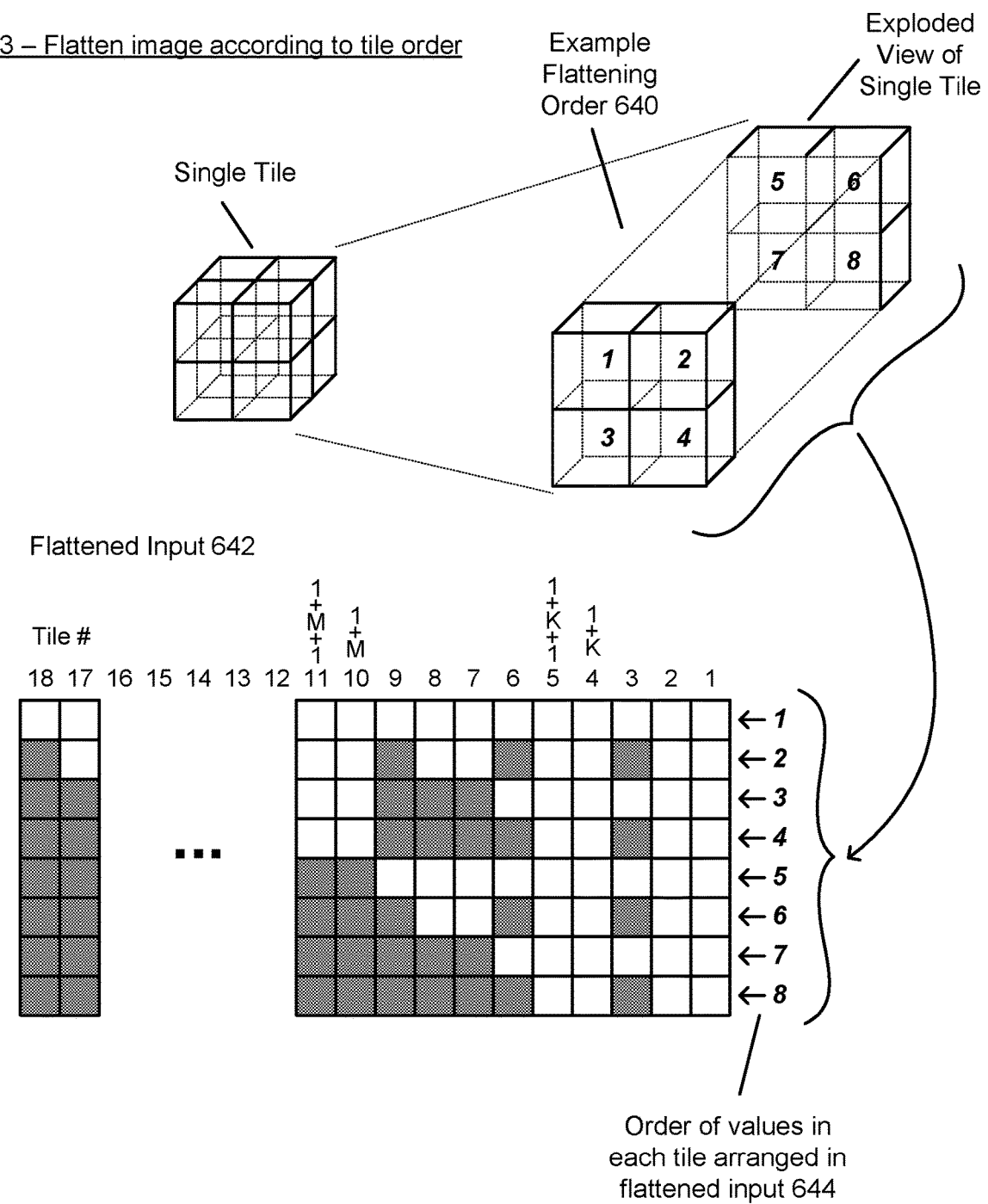
FIG. 6B illustrates a second part of the example of flattening an input tensor in the case of a three dimensional kernel, in accordance with an embodiment.

The process continues at FIG. 6B, which illustrates a second part of the example of flattening an input tensor in the case of a three dimensional kernel, in accordance with an embodiment. Here, at 603, the input stream generator 122 flattens each tile into a vector according to the example flattening order 640, and places the vectors parallel to each other, similar to the process described above with reference to FIG. 4 and FIG. 5B. Since the single tile is now of size 2×2×2, it includes 8 values. An order is established such that these eight values are read according to this order and laid out in a single vector. Here, the example flattening order 640 reads the single tile first row by row (row-major) and then by each layer/aisle (aisle-major). This order is indicated by the bold and italicized numbers in the example flattening order 640 which shows an exploded view of the single tile.

Thus, the value at the tile position indicated by "*1*" is read first, the value at the tile position indicated by "*2*" is read next, and so on, ending at the value at the tile position indicated by "*8*". Depending on the size of the tile, different orderings can be established. As with the previous orderings, so long as the orderings are consistent across the entire process, the output values will be the same regardless of the ordering used.

The result of this flattening by the input stream generator 122 is the flattened input 642. The example flattening order 640 is indicated with the order 644 in each vector of the flattened input. Therefore, for each vector, the "*1*" position as indicated by the order 644 has the value from the position of the corresponding tile that is in the "*1*" position of the example flattening order 640 for that tile. Here, as with FIG. 6A, the dark grey areas indicate padding values, and the white areas indicate input values. For example, tile 3 in FIG. 6A includes 4 input values and 4 padding values. After following the example flattening order 640, this is transformed into the vector indicated at tile #3 at the flattened input 642, with the input values alternating with the padding values. As with the flattened inputs in FIGS. 4 and 5B, this flattened input is sent to the multiply-add unit 140 for further processing to generate the output values.

Expanded Kernel Generation

Figure 7:
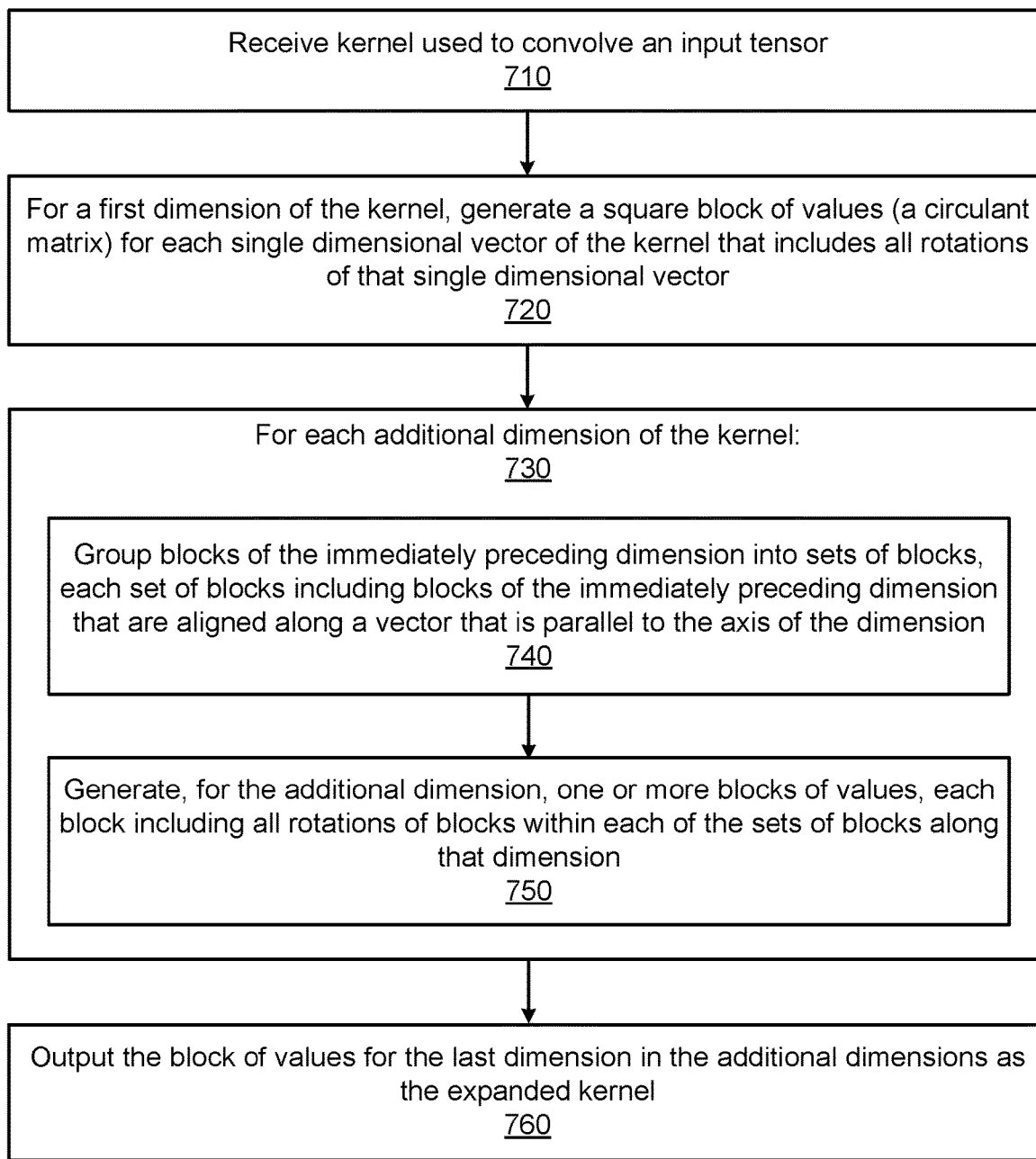
FIG. 7 is a flow diagram illustrating a method of generating an expanded kernel, in accordance with an embodiment.

FIG. 7 is a flow diagram 700 illustrating a method of generating an expanded kernel, in accordance with an embodiment. Although the illustrated flow diagram may show an order of operations, the operations illustrated may be performed in any order, and may have a greater or fewer number of operations. In one embodiment, the operations illustrated in FIG. 7 may be performed by the expanded kernel generator 126.

The expanded kernel generator 126 receives 710 a kernel used to convolve an input tensor. This kernel may be the kernel 110. For a first (smallest) dimension of the kernel, the expanded kernel generator 126 generates a square block of values (a circulant matrix) for each single dimensional vector of the kernel that includes all rotations of that single dimensional vector. Each single dimensional vector here is a unique vector that is a row of the kernel, a column of the kernel, a diagonal of the kernel, or an aisle of the kernel. The aisle of a kernel is a vector of the kernel aligned along an axis corresponding to a depth (in this case, the third dimension) of the kernel.

If the kernel 110 has multiple kernel filters 112, each kernel filter is processed separately in accordance with the flow diagram illustrated herein. If each kernel filter includes a sub-filter kernel, then that sub-filter kernel is also processed separately according to the flow diagram. Although the dimension here is referred to as "first" or "smallest" it is not intended to indicate that the dimensions of the kernel have a particular order or size relationship. Instead, any dimension of the kernel may be selected as the first dimension. For example, in the three dimensional kernel of FIG. 6A, either the dimension along the X-axis 620 (the X dimension), the Y-axis 622 (the Y dimension), or the Z-axis 624 (the Z dimension) may be selected as the first dimension.

Similarly, a kernel convolved with either a single-channel or a multi-channel input tensor generates a single output channel. If the kernel includes multiple filters, each filter is applied to the input tensor to generate a separate output activation.

Upon processing the first dimension, the expanded kernel generator 126, for each additional dimension of the kernel, groups 740 blocks of the immediately preceding dimension into sets of blocks, each set of blocks including blocks of the immediately preceding dimension that are aligned along a vector that is parallel to the axis of the (additional) dimension. The vector that is parallel to the axis of the dimension is a vector that is parallel to the axis of the dimension currently being processed. Therefore, using the above example, if the X dimension were the first dimension, the next dimension to be processed may be the Y dimension (although it could be the Z dimension as well). Along the Y dimension, one or more vectors may be drawn that are parallel to the Y axis and are also aligned with blocks from the preceding dimension. This is because four blocks are generated in the preceding dimension (the X dimension), and each of these, if conceptually "positioned" at the same location whence they were generated, form two "columns" of blocks. Each of these "columns" align with, or pass through, a vector that is parallel to the Y axis. Aligned blocks are grouped together.

For the additional dimension, the expanded kernel generator 126 further generates 750, one or more blocks of values, each block including all rotations of blocks within each of the sets of blocks of the immediately preceding dimension. Thus, in the above example, each column of blocks has the blocks within that column rotated to generate a new square block of values. This results in two square blocks of values for the Y dimension. To rotate a vector or set of blocks, the expanded kernel generator 126 rotates the values (e.g., barrel shifts the values) in the row, or the blocks in the set, to generate a new vector or ordering of blocks for each rotation. Once all possible rotations are generated, the generated combinations of vectors or orderings of blocks are "stacked" together to generate an output block that includes all rotations of the underlying vector or underlying set of blocks.

Continuing with the example, when processing the next dimension, the Z dimension, the vector is parallel to the Z axis. In this case, two blocks were generated from rotations of the previous two "columns" of two blocks each. Therefore, these two blocks are rotated as they are "positioned" in a way to align with the vector. No other blocks exist which do not pass through this vector, and thus it is the only one needed. However, if the kernel were higher dimensioned (i.e., more than 3 dimensions), then there may be additional blocks that would not align with this vector, and so additional vectors are needed to group the additional blocks.

When all dimensions are processed, the expanded kernel generator 126 outputs 760 as the expanded kernel the block of values corresponding to the last dimension in the additional dimensions of the kernel. Using the previous example, after rotating the two blocks from the Y dimension, a single block remains. This block is output as the expanded kernel.

Thus, as in the example, a three dimensional kernel has an expanded kernel that comprises a set of first vectors, each first vector having a rotational permutation of first blocks in a group of first blocks. Each first block of the group of first blocks corresponds to a second vector of a set of second vectors, and each second vector corresponding to a second block of a group of second blocks. Each second block of the group of second blocks corresponds to a vector in the kernel (a kernel vector), and each second block has a set of third vectors that represent all rotational permutations of the corresponding kernel vector of that second block, with each third vector representing one rotational permutation of the corresponding kernel vector. Here, each set of second vectors includes all rotational permutations of second blocks in the corresponding group of second blocks. In addition, the set of first vectors includes all rotational permutations of first blocks of the group of first blocks.

In one embodiment, instead of being a three-dimensional kernel as in the example, the kernel is a one-dimensional (1D) matrix, and the expanded kernel comprises a plurality of parallel vectors, each vector of the plurality of parallel vectors being a different rotational permutation of the kernel. Here, the expanded kernel is a square matrix having a size of each dimension equal to the size of the kernel.

In another embodiment, the kernel is a two-dimensional (2D) matrix, thus the expanded kernel comprises a set of first vectors, with each first vector having a rotational permutation of blocks in a group of blocks. Each block of the group of blocks corresponds to a vector in the kernel (a kernel vector), and each block has a set of second vectors that represent all rotational permutations of the corresponding kernel vector. Each second vector represents one rotational permutation of the corresponding kernel vector, and the set of first vectors includes all rotational permutations of the blocks of the group of blocks.

The expanded kernel, once generated, is a two-dimensional square matrix having a length equal to the product of the sizes of the dimensions of the corresponding kernel that is used to generate the expanded kernel. Additional examples for the generation of the expanded kernel for one, two, and three dimensional kernels are described below with reference to FIGS. 8, 9A-9C, and 10A-10C.

FIG. 8 illustrates an example 800 of generating an expanded kernel in the case of a one dimensional kernel, in accordance with an embodiment. In one embodiment the process described here may be executed by the expanded kernel generator 126.

At 801, the expanded kernel generator 126 receives the kernel 820. In the illustrated example, the kernel 820 has a size of 3×1 (the lowercase letters represent kernel values). Thus, it is a one dimensional kernel. Following the process described above in FIG. 7, at 802, the expanded kernel generator 126 rotates each single dimensional vector of the kernel 820. As the kernel 820 only has a single vector, that of [a, b, c], only this vector is available to rotate. Rotating this vector generates a total of three combinations, the combination shown in the original kernel 820 ([a, b, c]) and those of the rotation 822 ([c, a, b] and rotation 824 ([b, c, a]). The method in which the rotations are generated is indicated by the arrows shown in 802. These combinations are grouped together to form a circulant matrix. At 803, as there are no more additional dimensions of the kernel 820 to process, the expanded kernel generator 126 outputs the grouped vectors generated during the rotation as the expanded kernel 826.

As the expanded kernel includes the various rotations of the kernel, different rows of the expanded kernel can be used in a dot product against tiles of the flattened input stream, as selected by the control pattern (e.g., control pattern 136). Instead of striding the original kernel multiple times over a single value in the input, the kernel here is expanded so that it can be applied to the flattened input stream the above noted 2' times without having to read the input equal to the number of elements in the kernel. As the expanded kernel is much smaller in size than a likely input tensor 102, it is much more efficient to expand the kernel in the process described here, than to read in the values of the input tensor multiple times.

FIG. 9A illustrates examples of generating an expanded kernel for different two dimensional kernels, in accordance with an embodiment. As with FIG. 8, in one embodiment the process described here may be executed by the expanded kernel generator 126.

At 901, the expanded kernel generator 126 receives the kernel. Three examples of two dimensional kernels 920A-C are shown here having different sizes. Kernel 920A is of size 3×2, kernel 920B is of size 2×3, and kernel 920C is of size 3×3. At 902A, the single dimensional vectors of the kernels 920 are rotated in the kernel rotations 922A-C using a row-major order, i.e., the single dimensional vectors correspond to the rows of the kernels, which are rotated. As shown, depending on the size of the kernel, the number of single dimensional vectors differs. For example, kernel 920B, having three rows, has three sets of rotations in kernel rotation 922B, while kernel 920A has only two sets of rotations.

At 903A, the additional dimension, i.e., the second dimension is rotated. Here, as noted in FIG. 7, vectors are selected that align with the axis of the second dimension and those blocks that pass through each vector are rotated together. In example of kernel 920A, two blocks 926A-B were generated in kernel rotation 922A, and these are aligned with a single vector along the second dimensional axis. Block 926A is generated from combining the rotations of the row [a, b, c] and block 926B is generated from combining the rotations of the row [d, e, f]. These two blocks are rotated in kernel rotation 924A to generate the expanded kernel 932A. As there are no more dimensions in the kernel, there are no further rotations.

A similar process is performed for kernel 920B. However, this time there are three blocks 928A-C. Thus, in kernel rotation 924B, three blocks 928A-C are rotated and combined to generate the expanded kernel 932B. In the case of kernel 920C, three blocks 930A-C were also generated in kernel rotation 922C (as the kernel 920C has three rows). These blocks 930A-C are rotated in the second dimension at kernel rotation 924C, to generate the expanded kernel 932C. Each expanded kernel has equal size along both dimensions (e.g., a square matrix), and the size along each dimension is equal to the product of the sizes of each of the dimensions of the kernel. For example, kernel 920B has size 3×2, and thus the size of each dimension of its expanded kernel 932B is 3*2=6.

Figure 9B:
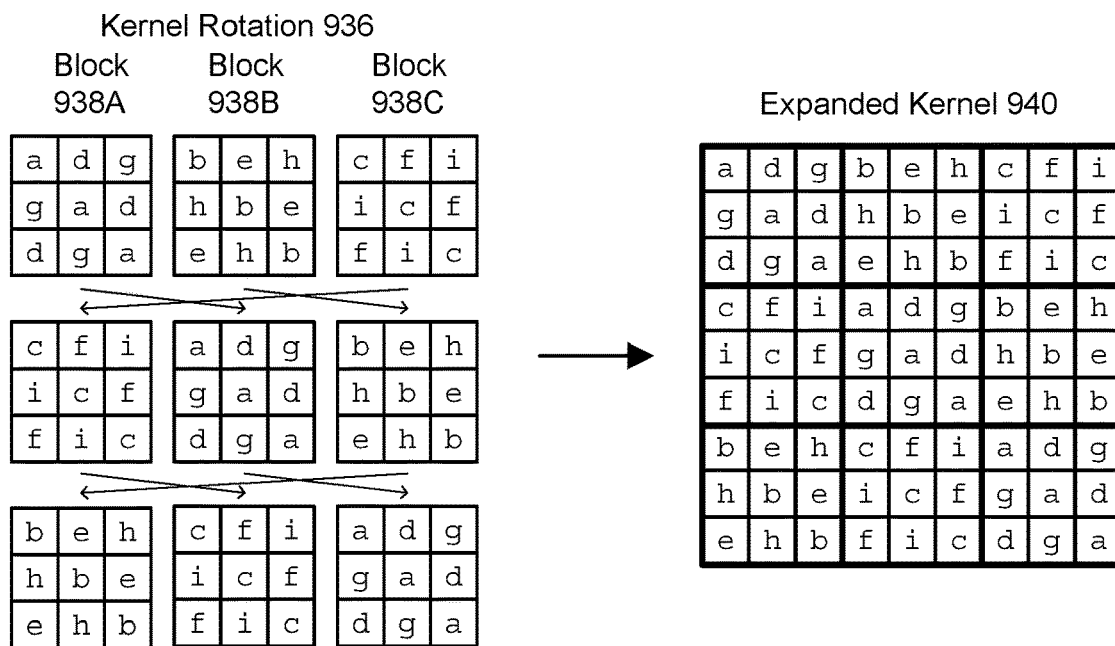
FIG. 9B illustrates an example of generating an expanded kernel using column-major expansion, in accordance with an embodiment.

FIG. 9B illustrates an example of generating an expanded kernel using column-major expansion, in accordance with an embodiment. Instead of using row-major order as in FIG. 9A, the illustrated example here uses column-major order.

At 902B, the expanded kernel generator 126 takes the kernel 920C and rotates each single dimensional vector. However, the single dimensional vectors are selected as the columns of the kernel 920C instead. Therefore, instead of a vector having the values [a, b, c], the first vector shown here has the values [a, d, g], corresponding to column 1 as labeled in the figure. The remaining two vectors correspond to the column 2 and 3 as labeled.

At 903A, the rotated vectors from 902B, which are formed into the blocks 938A-C, are rotated in the kernel rotation 936, which is similar to the kernel rotations 924 shown in FIG. 9A. This generates the expanded kernel 940, which differs from the expanded kernel 932C, despite using the same kernel. However, if the control pattern is also generated with consideration of this column-major order, the output values will not differ after the convolution is applied.

FIG. 9C illustrates an example of generating an expanded kernel in the case of multiple kernel filters, in accordance with an embodiment. If the kernel has multiple kernel "filters," each kernel filter is expanded in the same fashion as described previously for the single kernel. If each filter has further sub-filter kernels, then these are also expanded in the same fashion. Thus, the kernel filters 942A-N are expanded into the expanded kernel filters 944A-N as illustrated.

FIG. 10A illustrates a first part of an example 1000 of generating an expanded kernel in the case of a three dimensional kernel, in accordance with an embodiment. As with FIGS. 8 and 9A-C, in one embodiment the process described here may be executed by the expanded kernel generator 126.

At 1001 the expanded kernel generator 126 receives the kernel 1026. In an exploded view as shown, kernel 1026 can be seen to have layers 1028A and 1028B. Each layer has different kernel values "a"-"h", resulting in eight values for the 2×2×2 kernel 1026.

At 1002, the expanded kernel generator 126 rotates all the single dimensional vectors of the kernel 1026 (using row-major order in this example). There are four of these in the kernel 1026, corresponding to the four rows in the kernel 1026, two on each layer 1028. Thus, four sets of rotations generate [OR: are generated by???] the kernel rotation 1030.

At 1003A, the expanded kernel generator 126 rotates the second dimension (i.e., the next dimension) by grouping the blocks generated in the kernel rotation 1030. Here, those blocks from the kernel rotation 1030, which align along a vector that is parallel to the axis of the current dimension being processed (i.e., the second dimension), are grouped together. Here, the blocks forming set 1034A align along a vector (namely vector 1032A) that is parallel to the second dimension axis, i.e., Y axis 1022. The blocks forming set 1034B, which were formed from values that were on a separate layer from those in set 1032A, are also aligned along a vector (namely vector 1032B) that is parallel to the second dimension axis.

Although two vectors are drawn here, they are presented to show the conceptual reasoning behind how the blocks are grouped. In practice no vectors are drawn and the expanded kernel generator 126 groups these blocks by determining the index of the dimension from which they were generated. For example, the blocks of set 1034A are generated from layer 1028A (which may have an index of "0"), and those of set 1034B are generated from layer 1028B. Therefore, the expanded kernel generator 126 knows to rotate the blocks generated from these different layers separately. This process is iterated for subsequent dimensions, with the index value of the current dimension used to group the blocks generated in the preceding dimension.

The process continues in FIG. 10B, which illustrates a second part of the example of generating an expanded kernel in the case of a three dimensional kernel, in accordance with an embodiment.

Here, at 1003B, the expanded kernel generator 126 generates rotations of the blocks from the preceding generation that have been grouped into the sets 1034A-B. The blocks of each set are rotated separately. As shown, this generates two blocks, the block generated from the rotation of the two blocks of set 1034A, and that from the two blocks of set 1034B.

At 1004A, the expanded kernel generator 126 repeats the step 1003A, but for the next dimension, i.e., the $3^{rd}$ dimension, which is also the last dimension for the three dimensional kernel 1026. Here, the expanded kernel generator 126 groups the blocks along a vector aligned with the axis of the dimension. This vector as illustrated is vector 1040, and the axis is the Z axis 1024. Each of the blocks generated in 1003B were generated from blocks on different layers of the kernel, and thus the blocks generated in 1003B are on different layers as well, conceptually. The vector 1040 aligns with both blocks that were generated (i.e., can pass through both blocks), and therefore these blocks are grouped into the set 1038A. As there are no other blocks to group, this is the only set for the $3^{rd}$ dimension.

Figure 10C:
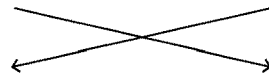
FIG. 10C illustrates a third part of the example of generating an expanded kernel in the case of a three dimensional kernel, in accordance with an embodiment.

The process continues in FIG. 10C, which illustrates a third part of the example of generating an expanded kernel in the case of a three dimensional kernel, in accordance with an embodiment. Here, at 1004B, the expanded kernel generator 126 generates all rotations for the blocks in the sets of blocks generated when processing the preceding dimension. In the illustrated example, only one set 1038A is present, and therefore the blocks in this set are rotated to generate the final expanded kernel 1044, as this is the last dimension of the dimensions of the kernel 1026.

Control Pattern Generation

Figure 11:
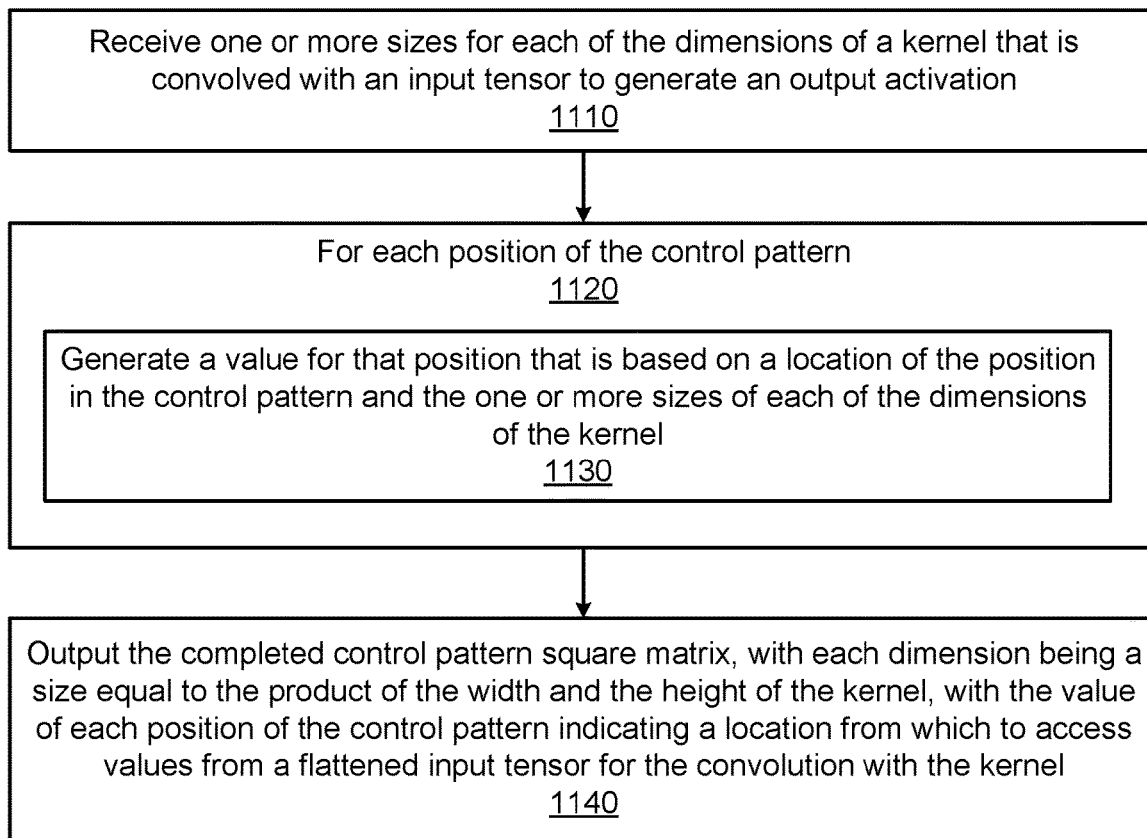
FIG. 11 is a flow diagram illustrating a method of generating a control pattern, in accordance with an embodiment.

FIG. 11 is a flow diagram 1100 illustrating a method of generating a control pattern, in accordance with an embodiment. Although the illustrated flow diagram may show an order of operations, the operations illustrated may be performed in any order, and may have a greater or fewer number of operations. In one embodiment, the operations illustrated in FIG. 7 may be performed by the control pattern generator 134.

The control pattern generator 134 receives 1110 one or more sizes for each of the dimensions of a kernel that is convolved with an input tensor to generate an output activation. This kernel may be kernel 110 in FIG. 1. The kernel may be one dimensional, two dimensional, three dimensional, or beyond. Each dimension of the kernel has a size, and this is received by the control pattern generator 134.

At 1120, for each position of the control pattern, the control pattern generator 134 generates 1130 a value for that position that is based on a location of the position in the control pattern and the one or more sizes of each of the dimensions of the kernel.

Once the values in all positions are generated, the control pattern generator 134 outputs 1140 the completed control pattern square matrix. Each dimension of the control pattern being a size equal to the product of the width and the height of the kernel. In addition, the value of each position of the control pattern indicating a location from which to access values from a flattened input tensor for the convolution with the kernel.

In one embodiment, each position of the control pattern has a row number and a column number, and the generation of each value comprises determining, for each dimension of the kernel, a result of a test based on the row number, the column number and the one or more sizes of each of the dimensions of the kernel. Each test generates a binary output indicating an amount of relative offset from which to access values from the flattened input stream, which as described above, is generated from the input tensor by flattening kernel-sized tiles of the input tensor. The value for that position of the control pattern is generated as a combination of the binary outputs of the tests for each dimension of the kernel. Each test may be an inequality test that compares a first modulo computation using the row number of the position with a second modulo computation using the column number of the position. The first modulo computation is a modulo between the row number and the one or more sizes for each of the dimensions of a kernel. The second modulo computation is a modulo between the column number and one or more sizes for each of the dimensions of a kernel. In the case of a two dimensional kernel, the first test is r mod h<c mod w, and the second test is floor((r mod (h*w))/h)<floor((c mod (h*w))/w), where r is the row number, c is the column number, h is the height of the kernel, and w is the width of the kernel.

In one embodiment, the control pattern includes a plurality of vectors, with the number of vectors of the plurality of vectors corresponding to a number of output value positions in a kernel-sized tile of the output activation. The values within each vector of the plurality of vectors correspond to delay values, with each delay value indicating an amount of delay for which to access an individual input value in a flattened input stream. As described above, the flattened input stream includes a set of parallel vectors that are generated from an input tensor, and the delay amount specifies one of the parallel vectors within the flattened input stream.

In one embodiment, the delay values are used to generate an output value for each output value position of a kernel-sized tile of the output activation by selecting, for the output value position corresponding to the output value to be generated, a vector in the control pattern corresponding to that output value position. The delay values in the selected vector of the control pattern are accessed, with each delay value indicating a parallel vector within the flattened input stream from which to access each input value used to generate the output value. A dot product is executed between the accessed input values and a vector of an expanded kernel to generate the output value at the output value position in the kernel-sized tile of the output activation. In one embodiment, the expanded kernel is generated by modifying the kernel to include a sets of hierarchical blocks, with each block in the set of hierarchical blocks including all rotational permutations of blocks that are nodes of that block. The leaves of the set of hierarchical blocks are blocks which include all rotational permutations of individual vectors of the kernels, and each block in the set of hierarchical blocks has nodes that are blocks that are aligned with a vector that is parallel to an axis of the dimension represented by that block within the kernel.

In one embodiment, the control pattern is a two-dimensional square matrix having a length equal to the product of the sizes of the dimensions of a corresponding kernel that is used to convolve an input tensor.

In one embodiment, an order in which the delay values in the control pattern are arranged is based on a defined order in which kernel-sized tiles of the input tensor are accessed to generate a flattened input stream.

In one embodiment, the defined order is a row-major order, column-major order, or aisle-major order. The aisle-major order accesses elements in a three-dimensional (3D) kernel-sized tile of the input tensor first along an axis corresponding to the depth of the 3D tile and subsequently along axes corresponding to the width and height of the 3D tile.

Although the above flow diagram illustrates a method of generating the control pattern from the sizes of the dimensions of the kernel, in another embodiment the various control patterns for various kernel sizes are stored in memory and retrieved according to the kernel size being used. Additional details regarding the generation of the control pattern are described below with reference to FIGS. 12-13.

FIG. 12A illustrates a first part of an example 1200 of a conceptual basis for the generation of the control pattern, in accordance with an embodiment.

As noted previously, the purpose of the control pattern is to select values from the correct tile in the flattened input stream for combination with the expanded kernel to generate the output values. As the kernel strides over the input values in a naïve implementation of convolution, different values from the input are read and combined with the weights in the kernel to generate the output. The control pattern allows this to be simulated by selecting the different tiles from which the different input values are located in order to generate the correct output values. However, in contrast to the naïve implementation, the input values are not read in multiple times, but rather only a minimal number of reads are made. In order to determine the pattern in the control pattern that indicates which tile to select from, the following method may be used. However, while the following method can be used to generate the control pattern, in practice the hardware will likely use a separate method, such as the methods described above with reference to FIG. 11, as the method described herein may lack efficiency. Therefore, the method described herein may serve more to provide a conceptual understanding of the control pattern.

At 1201, an input is flattened, similar to the method described above with reference to FIGS. 4-6. The input tensor here is of size 4×4, and as the kernel 1220 is of size 2×2, each tile is thus 2×2 in size, and there are 4 tiles overall (no padding is applied here). The flattened input 1218 therefore has four vectors, each representing a tile. The kernel is also expanded to generate the expanded kernel 1224, similar to the process described above with reference to FIGS. 7-10.

At 1202, the first tile, tile 1 (1222A), in the flattened input 1218 is multiplied with the expanded kernel to generate an element-wise product 1226A. Thus, the "1" in the tile 1 1226A is multiplied with each of the four kernel values "a," "b," "c," and "d" in the expanded kernel 1224 in the corresponding row to generate four products "a1," "b1," "c1," and "d1". This is repeated for the remaining values of the tile, as well as for the other tiles 2-4 (1222B-C). This creates the element-wise products 1226A-D as shown.

The process continues in FIG. 12B, which illustrates a second part of the example of a conceptual basis for the generation of the control pattern, in accordance with an embodiment. Now that the element-wise products 1226A-D are generated, at 1203, it is determined, for each position of the kernel that overlaps over a single tile the original input, those tile values that are needed to generate the element-wise convolution product (using row-wise stride of the kernel in the illustrated example). Thus, at position 1 (1230A), where the position of the kernel is in the top left-most position of the input, as indicated by the kernel position boundary box 1232, the kernel values "a," "b," "c," and "d" as overlaid over the input are multiplied against the underlying values of the input for which the kernel values overlay. Thus, "a" is multiplied with "1" in the input, "b" with "2," "c" with "3," and "d" with "4," to generate the element-wise product pairs for position 1 (1234A) as illustrated. These product pairs are shown as columns in the illustrated example, but could be transposed to be shown as rows as well, depending on whether the flattened input stream or the expanded kernel were generated using row or column-major format, respectively.

Based on the element-wise pair 1234A, it is determined from which of the element-wise products 1226A-D these element-wise pairs can be located. In the first example of position 1 (1230A), all these pairs can be located in element-wise product 1226A, and are given the label "A." Thus, the control pattern after analyzing position 1 is shown at 1236A to be a column of all "A"s. Here A may represent the current tile being processed, which may be generalized as tile X.

With position 2 (1230B), the kernel position 1232 is moved one to the right, although it still overlaps over the first tile in the input. The element-wise product pairs 1234B are "a2," "b5," "c4," and "d7". Since "d" in the kernel is now over value "7" in the input, this "d7" product pair cannot be found in element-wise product 1226A, but rather is found in element-wise product 1226B, which is indicated with a "B." Therefore, the next column for the control pattern indicated at 1236B has a "B" at the last value corresponding to the position of "d7" in the element-wise product pairs 1234B. Furthermore, here B corresponds to the current tile X, plus one, or tile X+1.

With position 3, the kernel position 1232 is moved one down and one to the left. The kernel is not moved further to the right as, if that were to happen, it would no longer overlap the first tile. This would be unnecessary as the control pattern is generated to determine only those values from the flattened input stream that are used to generate the output values of a single tile corresponding to the same tile position in the input, i.e., the current tile. Additional tiles are computed separately. Thus, as the system computes the output values tile by tile, the process described here is only concerned with those positions of the kernel in which the kernel overlaps over the single tile in question. In addition, as the focus of the kernel 1220 in the illustrated example is the top left position of the kernel 1220 (indicated by "a"), the positions 1232 of the kernel over the current tile which are of concern are those in which the focus of the kernel is overlaid over each of the input values of the current tile. Thus, position 3 is a position in which the focus of the kernel is overlaid over the third value in the current tile (using row-wise order). In this case, the kernel reads from the current tile, but also from the tile below the current tile, which is tile X+K, where K, as noted previously is the number of tiles in a row (or column). These values are combined with the kernel to generate the element-wise product pairs 1234C. As shown in the element-wise product pairs 1234C, "c9" and "d10" include values from the tile below the current tile and can be found in element-wise product 1226C, i.e., "c9" and "d10" can be located in one of the values of element-wise product 1226C. The first two product pairs, "a3" and "b4," can be found in the element-wise product 1226A, as they only include values from the current tile. Therefore, the next column of the control pattern after position 3 as shown at 1236C has two "A"s and two "C"s, with the ordering of the letters corresponding to the order of the product pairs.

Finally, at position 4 (1230D), the position 1232 of the kernel overlaid on the input touches values from the current tile and all three other tiles surrounding the current tile. Thus, the product pairs 1234D are "a4," "b7," "c10," and "d13." These can be identified in each of the element-wise products 1226A-D, respectively. Therefore, the last column of the control pattern as indicated in 1236D indicates all four of the element-wise products 1226A-D, using the letters "A"-"D," respectively. Here, D would represent the current tile X, plus the row size variable K, plus 1, or X+K+1, and thus refers to the tile below and to the right of the current tile.

As shown here, because the values in the control pattern indicate which tiles surrounding the current tile for which to retrieve values to compute the convolution for a focus position of the kernel on the current tile, it can also be used to select values from the flattened input stream, which are then combined with a corresponding vector of the expanded kernel to generate the output value for the corresponding focus position in the output.

FIG. 13A illustrates an example 1300 of a portion of the generation of values for a control pattern for a two dimensional kernel, in accordance with an embodiment. In one embodiment, the process described here is performed by the control pattern generator 134.

At 1131, the control pattern generator 134 generates all values for a control pattern 1320. Here, most of the values of the control pattern 1320 have already been generated, but the remaining value 1324 is not yet generated to illustrate the process. This value 1324 is at row 0 and column 8 as shown. The control pattern generator 134, at 1312, determines test results for the position using the row and column numbers/coordinates for that position. The test results refer to the inequality tests 1330. The number of tests is equal to the number of dimensions of the kernel. As the kernel is two dimensional here, two tests are generated. Each test corresponds to one of the shifting variables used to identify the tiled size of each dimension in the input tensor. For example, K represents the size or number of tiles in the first dimension, i.e., each row, while M represents the number of tiles in the second dimension, i.e., each layer. Alternatively, each shifting variable of a particular dimension can be defined as being equal to the product of the tiled size of that dimension and the products of the tiled sizes of any preceding dimensions. Here the tiled size indicates the number of tiles spanning a length parallel to a dimension in the input tensor.

In addition, a test is generated for the first dimension, which corresponds to not to a shifting variable, but to the current tile. Therefore, here, a test_k and a test_1 are generated. Alternatively, these may be referred to as delay_k and delay_1, because as noted above, the shifting variable can be used to indicate a delay amount for accessing the flattened input stream.

As can be seen here, the generating of the test inequality follows a pattern. The test inequality for the first dimension 1, is $r \bmod h < c \bmod w$, where r is the row number of the control pattern as shown in control pattern 1320, h is the height of the kernel as shown at kernel 1322, c is the column number, and w is the width of the kernel (mod is the modulo operation, and < indicates less than). The second test_k corresponding to the K variable is similar but includes the area, i.e., h*w in the computation, as this is the second dimension. Thus, the resulting test inequality is $\text{floor}((r \bmod (h*w))/h) < \text{floor}((c \bmod (h*w))/w)$, with floor being a floor or round-down operation (to the nearest integer). Although the kernel 1322 here is a square kernel, in other cases the kernel may not be square, and thus both the height and the width of the kernel are considered in the test inequality.

The results of both tests are referenced in the results table 1332. Here, depending upon the true or false (i.e., 1 or 0) result of each test, a different value (i.e., indicator) is placed at that corresponding position in the control pattern. Here, as there are two tests, there are a total of 4 possible values, which are represented here as the letters A, B, C, and D, and equivalently as the binary values 00, 01, 10, and 11, respectively. As described herein, these values indicate the vector/tile of the flattened input stream from which to access values to compute the output activations. Here, as shown in the test results 1326, with the row number being 0 and the column number being 8, the result of both tests is true, and thus the value at 1324 is "D" or 11, which references the current tile x+k+1. Although the row number and column numbers are ordered as shown, in another embodiment the ordering can be reversed. So long as the test inequalities are modified (e.g., by reversing them), the result here would be the same. Therefore, the process here is not limited by the specific method in which the rows or columns of the control pattern are labeled.

FIG. 13B illustrates an example 1301 of a portion of the generation of values for a control pattern for a three dimensional kernel, in accordance with an embodiment. In one embodiment, the process described here is performed by the control pattern generator 134.

Here, at 1351, the control pattern generator 134 generates the values for the control pattern 1360. In contrast to the control pattern in FIG. 13A, the control pattern 1360 is generated for the three dimensional kernel 1362 which has height 2, width 2, and depth 2 (labeled h, w, and d, respectively).

As described previously in FIG. 13A, each dimension of the kernel is associated with a test inequality. Thus, here three test inequalities are generated in the tests table 1370. As with FIG. 13A, they may also be referred to as delay m, delay_k, and delay_1 instead of test m, test_k, and test_1, respectively. Both test_1 and test_k are the same as the test inequalities shown in FIG. 13A. Test m, which corresponds to the M shifting variable (i.e., how many tiles in a layer of the input tensor), follows a similar pattern to test_k but now includes the depth of the kernel (d).

If the kernel were to include additional dimensions, this test inequality would be further expanded to include the additional dimension. For example, with four dimensions, the test inequality may be floor((r mod (h*w*d*t))/(11*d*t) <floor((c mod (h*w*d*t))/(w*d*t), with t representing "trength," or the size of the fourth dimension of the kernel. This pattern continues with higher dimensions, with the additional dimension being added to the test inequality. Thus, the test inequality takes the form of floor((r mod (product of sizes of dimensions of kernel))/(h*product of sizes of dimensions of kernel excluding width)<floor((c mod (product of sizes of dimensions of kernel))/(w*product of sizes of dimensions of kernel excluding height) for the kernel with N number of dimensions, with the remaining test inequalities for that kernel being the test inequalities for lower dimensional kernels N−1, N−2 . . . 1, with the test inequality for the kernel having 1 dimension being the same as test_1 shown here (and that of the kernel having 2 dimensions being the same as test_k shown here, and so on).

As there are three tests for the three dimensional kernel, there are a total of eight combinations, shown in results table 1372. Each combination corresponds to an indicator A-H or a three bit binary value. As described further below with reference to FIG. 13C, the pattern of the binary bits can be used to efficiently store the control pattern in some embodiments. At 1352, the control pattern generator 134 generates the last remaining value 1364 at row 0 and column 7 for the control pattern 1360. As shown in test results 1366, all three test inequalities result in true, corresponding to the indicator H, or the binary value 111, for this position. Thus, H would be stored in the row 0, column 7 position of the control pattern 1360. However, if not all the test inequalities came back as true, a different indicator would be selected based on selecting the row in the results table 1372 which indicates the three test inequality results that matches the results of the computed test inequalities.

If the kernel included additional dimensions, the size of the results table 1372 would increase, similar to the number of test inequalities. The number of rows in the results table would be equal to $2^x$ rows, where X is the number of dimensions of the kernel. As can be seen, if organized such that the test inequality results are ordered such that the result of the largest dimension forms the most significant bit of a binary value and the result of the smallest dimension forms the least significant bit, each of the combination of results can be considered as a binary value, and can be ordered sequentially in the table (e.g., in ascending order from top to bottom). The indicators associated with each combination also increase sequentially, and are also associated with combinations of shifting variables of sequentially increasing dimension size. For example, in the illustrated example, A and B are associated with no shifting variables, but rather with only the current tile (i.e., current tile x and x+1), C and D involve the shifting variable k (i.e., x+k and x+k+1), E and F involve the next highest dimension shifting variable m (i.e., x+m and x+m+1), and G and H involve the sum of k and m (i.e., x+m+k and x+m+k+1). If the kernel were of additional dimensions, this would continue with combinations of the shifting variables in ever increasing size. Each combination would include two indicators, with one being the combination itself, and the other being the combination plus 1. Thus, for a four dimensional kernel, the pattern would continue with I and J (x+t and x+t+1), K and L (x+t+k and x+t+k+1), M and N (x+t+m and x+t+m), and O and P (x+t+m+k and x+t+m+k+1). These would correspond with the binary values 1000 to 1111 (or 8 to 15), with the most significant digit corresponding to a test inequality for the fourth dimension (i.e., a "test t" or "delay t") and the remaining bits corresponding to the same three tests illustrated herein.

Note that to compute the test inequality, the variable r is substituted for the row number of the position of the control panel for which a value is to be generated (0 here), the variable c is substituted for the column number of the position of the control panel for which a value is to be generated (7 here), and the variables h, w, and d are substituted for the size of the height, width, and depth of the kernel (2, 2, and 2, here).

Figure 13C:
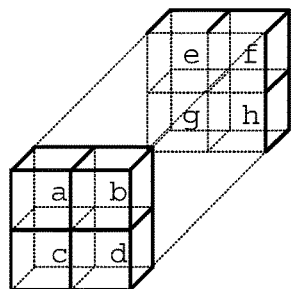
FIG. 13C illustrates examples of generated control patterns for kernels of different dimensions, in accordance with an embodiment.

FIG. 13C illustrates examples 1300 of generating the control pattern for kernels of different dimensions, in accordance with an embodiment. In FIG. 13, a 3×1 1D kernel 1310, a 3×3 2D kernel 1314, and a 2×2×2 3D kernel 1318 are illustrated, with the 3D kernel 1318 illustrated in an exploded view for clarity. The corresponding control patterns 1312, 1316, and 1320 are illustrated, respectively, for these kernels. They may be generated according to the method described above with reference to FIG. 11. For the 1D kernel, the identifier "A" in the control pattern 1312 indicates the current tile X, while "B" indicates the tile X+1. For the control pattern 1316, "A" indicates the current tile X, "B" indicates tile X+1, "C" indicates tile X+K, where K is the row size variable described previously, and "D" indicates the tile X+K+1. For the control pattern 1320, "A" through "D" indicate the same tiles as with the control pattern 1316. In addition, "E" corresponds to the tile X+M (the tile behind the current tile), with M being the layer tile size (i.e., the number of tiles in a layer). "F" corresponds to tile X+M+1, i.e., the tile to the right of the tile behind the current tile. "G" is tile X+M+K and corresponds to the tile behind and below the current tile. "H" corresponds to tile X+M+K+1, and corresponds to the tile behind, below, and to the right of the current tile.

In one embodiment, instead of storing the control pattern using indicators such as the letters shown in FIG. 13, or as sequences of bits representing these letters, the fractal nature of the control pattern is utilized to store it in a more efficient manner. For each of the control patterns 1312, 1316, and 1320, the identifiers begin with "A"s along the top and right edges, then leading to an alternating pattern between "A" and "B," and further divided patterns until the left bottom-most value is the identifier indicating the tile furthest from the current tile (and as illustrated is the largest letter alphabetically). Due to this fractal nature, each control pattern can be divided hierarchically into one or more levels depending upon the number of unique identifiers in the control pattern. The number of levels corresponds to the number of dimensions of the kernel used to generate the control pattern. Thus, the control pattern 1312 has a single level. The control pattern 1316 has two levels, and the control pattern 1320 has 3 levels.

Each level includes a square matrix containing single binary values (i.e., bits). The size of each dimension of the square matrix of each level is equal to the size of a dimension of the previous level, multiplied by the size of the largest dimension of the kernel. The smallest level has a square matrix that has a size of each dimension that is equal to the size of the largest dimension of the kernel. Thus, for example, with the control pattern 1316, the largest level has a square matrix of bits with a size 9×9, while the next smallest level has a size of each dimension that is 3×3 (i.e., 9 divided by 3, which is the size of a dimension of the kernel).

Each bit in a level that is not the largest level is matched to multiple bits in a larger level. In particular, the larger level is equally divided into a number of regions equal to the number of bits in the next smallest level, and a bit in the next smallest level is matched to the bits in a region of the larger level. The position of the matched bit among the bits in the next smallest level corresponds to the position of the region in the set of regions of the larger level. The combination of the matched bits across multiple levels allows for a bit sequence for every position in the control pattern in order to reference an identifier. Thus, in the example of the control pattern 1316, each bit of the 3×3 matrix is matched to a 3×3 portion of the 9×9 larger matrix. The combination of the bit from the 9×9 matrix, along with the matched bit from the 3×3 matrix, form a two bit value, which can be used to reference to one of the four unique indicators of the control pattern 1316. In the example of the control pattern 1320, as there are 8 unique identifiers, there are three levels, with the largest level being an 8×8 matrix, the second largest being a 4×4 matrix, and the smallest level being a 2×2 matrix. Three bits may be used to reference the correct one of the eight unique identifiers in the control pattern 1316 (i.e., the letters "A"–"H" as illustrated). These bits were also previously illustrated in the results tables in the examples of FIGS. 13A-B.

This method allows the control pattern to be stored efficiently. To extract the correct bit sequence from the various levels, the multiply-add unit 140 may determine a position of the indicator in the control pattern, and then use this to determine the correct position in the largest level, and the matched positions in the remaining levels, in order to determine the bit sequence that corresponds to that indicator.

Output Generation Using Flattened Input, Expanded Kernel, and Control Pattern

FIG. 14 is a flow diagram illustrating a method of generating an output of a convolution using the flattened input, expanded kernel, and control pattern, in accordance with an embodiment. Although the illustrated flow diagram may show an order of operations, the operations illustrated may be performed in any order, and may have a greater or fewer number of operations. In one embodiment, the operations illustrated in FIG. 14 may be performed by the multiply-add unit 140 (which may also be known as the multiply-accumulation unit).

The multiply-add unit 140 accesses 1410, from a buffer, a flattened input stream that includes a set of parallel vectors, with each vector representing a set of input values of a unique kernel-sized tile of an input tensor that is to be convolved by a kernel to generate an output activation. This flattened input stream may be the flattened input stream 124 and may be generated by the input stream generator 122 as described above.

The multiply-add unit 140 receives 1420 an expanded kernel generated by rotationally permuting values from the kernel, with the expanded kernel having vectors that each correspond to an output value position of a kernel-sized tile of the output activation. This may be the expanded kernel 128 and may be generated by the expanded kernel generator 126 as described above.

The multiply-add unit 140 receives 1430 a control pattern that includes a set of vectors, with each vector corresponding to the output value position for the kernel-sized tile of the output activation, and with each vector including delay values that indicate a parallel vector of the flattened input stream to access input values for the convolution. The control pattern may be the control pattern 136 and may be generated using the control pattern generator 134 as described above.

The multiply-add unit 140 generates 1440 for each output value position of each kernel-sized tile of the output activation, a dot product between a first vector that includes values of the flattened input stream as selected by the delay values of the corresponding vector of the control pattern, and a second vector corresponding to a vector in the expanded kernel corresponding to the output value position. The multiply-add unit 140 repeats this for all output values.

In one embodiment, the input tensor has a plurality of channels, and the kernel has multiple filters. Each channel of the input tensor is convolved with one or more filters of the kernel to generate an output activation with a plurality of output features. Additional examples for generation of the output values via the multiply-add unit 140 are described below with reference to FIGS. 15A-C, 16A-F, and 17A-B.

FIG. 15A illustrates a first part of an example 1500 of generating an output activation using the flattened input, expanded kernel, and control pattern in the case of a one dimensional kernel, in accordance with an embodiment. In one embodiment the process described here may be executed by the multiply-add unit 140.

At 1501A, the multiply-add unit 140 processes the first tile #1 of the output activations (which is the same tile position in the input tensor). This is the current tile being processed. The multiply-add unit 140, at 1502A, further processes the output position 1 of 3 of the first tile (with 3 being the number of values in each tile). In the processing of the first output position, the multiply-add unit 140 at 1511A selects values from the flattened input 1522 according to the tile position (e.g., a delay amount) as indicated by a vector in the control pattern 1524 for that output position. For position 1, this vector is the right-most column in the control pattern 1524. Thus, as shown, the control pattern vector 1528A for position 1 in an output tile is all "A"s, which indicates the current tile X, or tile 1, from which to select values. The values in the flattened input 1522 may be selected by referencing a memory address, an index value, or it may be selected by delaying the clock cycle at which the multiply-add unit 140 reads from the flattened input 1522. Here, as all the values of the control pattern vector 1528A indicate "A," the selected input values 1530A are selected from tile 1 in the flattened input 1522, and are [0, 1, 2] as illustrated.

At 1512A, the multiply-add unit 140 multiply-accumulates, i.e., performs a dot product, between the selected values 1530A and the expanded kernel vector 1532A corresponding to the position 1 in the output tile. For position 1, the expanded kernel vector 1532A is the top row of the expanded kernel 1526. The dot product operation results in the computation a0+b1+c2 as shown, which generates the output 1534A at position 1, as shown.

The process continues at FIG. 15B, which illustrates a second part of the example of generating an output activation using the flattened input, expanded kernel, and control pattern in the case of a one dimensional kernel, in accordance with an embodiment.

At 1503A, the second position of the three output positions of the current tile is processed. At 1513A, similar to 1511A, the control pattern vector 1536A is selected that corresponds to the position 2 of a tile. In this case, this vector is the middle column of the control pattern 1524. This control pattern vector 1536 is used to select the corresponding values from the flattened input 1522. For each identifier in the control pattern vector 1536, the tile indicated by that identifier is selected from the flattened input 1522 and a value is selected from the flattened input 1522 at that tile at a position that corresponds to the same position of the indicator in the control pattern vector 1536. Therefore, the first (top) position in the control pattern vector 1536A has the identifier "A," which corresponds to tile X (as noted in the legend), or tile 1 in the flattened input 1522 in the current example. Thus, the value in tile 1 of the flattened input 1522 from the same first position is selected (this is the value "0"). The same operation is performed for the second position in the control pattern vector 1536A, leading to a "1" being selected from the second position of the first tile of the flattened input 1522. For the third and final position of the control pattern vector 1536A, the identifier is now "B" indicating (as noted in the legend) that the tile that should be referenced is tile X+1, or tile 2 in the current example. Therefore, the multiply-add unit 140 selects from tile 2 the value in the same third position, or "5". Thus, the selected input values 1538A is [0, 1, 5] as shown.

At 1514A, the multiply-accumulate operation is performed similarly to the operation in 1512A. However, instead of selecting the first row from the expanded kernel 1526, the row, i.e., the vector, corresponding to the position 2 of the output is selected instead. This happens to be the second row of the expanded kernel 1526 in the current example. Thus, the expanded kernel vector 1524A for the position 2 is [c, a, b]. The dot product between this expanded kernel vector 1524A and the selected input values 1538A is c0+a1+b5, or output 1544A at position 2 of the output tile.

The process is continued in FIG. 15C, which illustrates a third part of the example of generating an output activation using the flattened input, expanded kernel, and control pattern in the case of a one dimensional kernel, in accordance with an embodiment.

At 1504A, the final position 3 of the output tile is processed. The process described here is similar to that of 1503A and 1502A, but all selections are shifted appropriately for the third position.

Thus, at 1515A, the control pattern vector 1546A that is selected is now corresponding to position 3 of the output tile, and thus is the left-most column of the control pattern 1524. This control pattern vector 1546A has one indicator for tile 1, and two for tile 2. Thus, the selected input values 1548A include a "0" from tile 1, and a "4" and "5" from tile 2.

At 1516A, the multiply accumulate operation is performed on the selected input values 1548A and the expanded kernel vector 1552 for position 3, which corresponds to row 3 of the expanded kernel 1526 in the current example. The output for this dot product is the output 1554A for position 3.

At 1505, this process is repeated for all the tiles in the input, to generate the same number of tiles for the output. Thus, the operations in 1501A are repeated from 1501B, for tile 2, to 1501L, for tile 12 in the flattened input 1522 of the current example. If the flattened input 1522 included more tiles, then the process shown in 1501A are repeated until all tiles are processed.

Figure 16A:
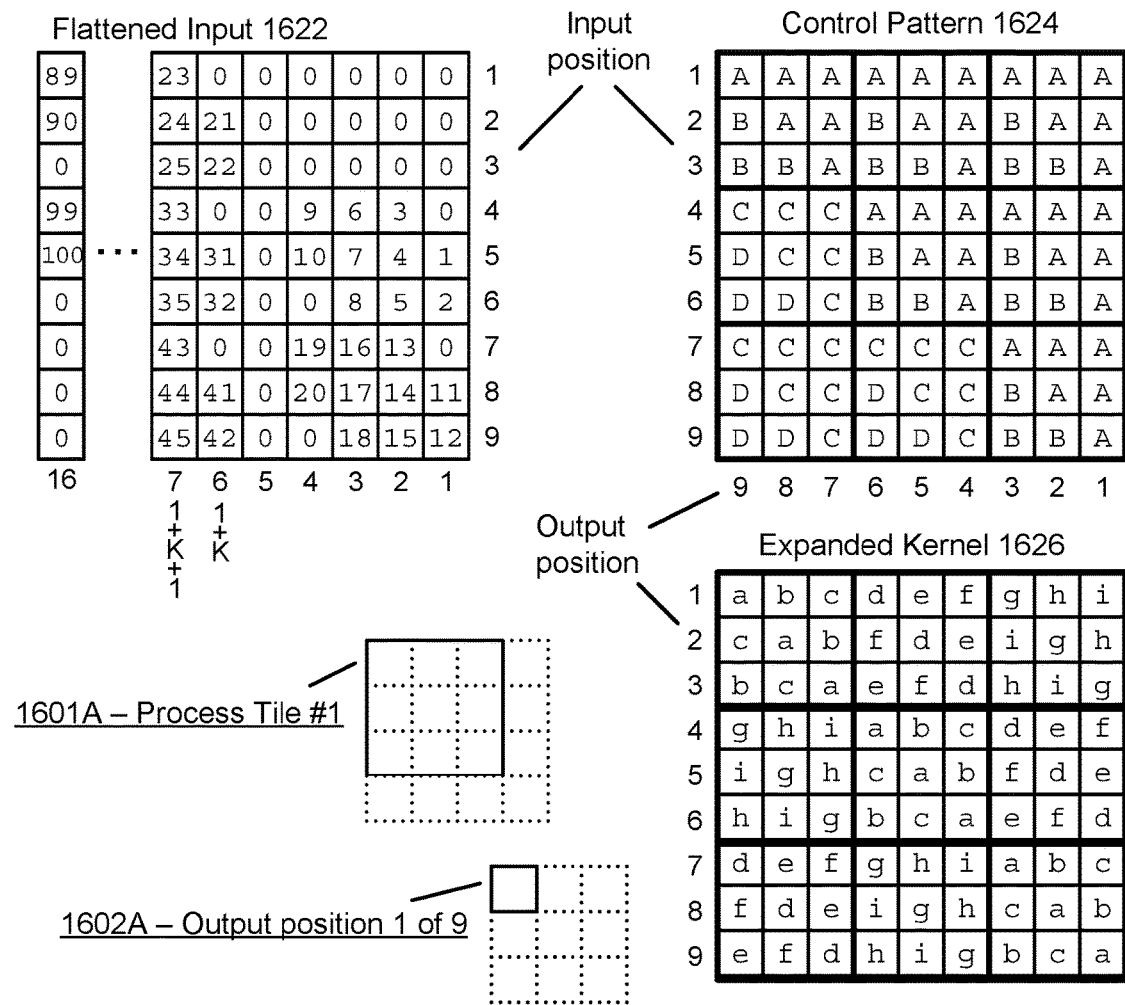
FIG. 16A illustrates a first part of an example of generating an output activation using the flattened input, expanded kernel, and control pattern in the case of a two dimensional kernel, in accordance with an embodiment.

FIG. 16A illustrates a first part of an example 1600 of generating an output activation using the flattened input, expanded kernel, and control pattern in the case of a two dimensional kernel, in accordance with an embodiment. In contrast to FIGS. 15A-C, the process described herein is with respect to a two dimensional kernel instead of a one dimensional kernel. In one embodiment, the process described herein is performed by the multiply-add unit 140.

At 1601A, the first tile is processed by the multiply-add unit 140. As each tile has nine positions, each position is processed to generate an output value for that position. At 1602A, the output position 1 is processed. As with the one dimensional kernel example, a control pattern vector 1628A is selected from the control pattern 1624 according to the output position value. As the output position is 1, the column labeled with the output position 1 of the control pattern 1624 is selected as the control pattern vector 1628A. This control pattern vector 1628A has "A" as all of its identifiers. Thus, this control pattern vector 1628A indicates that the selected input values 1630A should all be selected from tile 1 of the flattened input 1622 (as the current tile X is tile 1).

The process is continued at FIG. 16B, which illustrates a second part of the example of generating an output activation using the flattened input, expanded kernel, and control pattern in the case of a two dimensional kernel, in accordance with an embodiment.

At 1612A, the multiply-accumulate operation is performed on the selected input values 1630A and an expanded kernel vector 1632A selected from the expanded kernel 1626 according to the output position labels shown in FIG. 16A for the expanded kernel 1626. In this case, output position 1 corresponds to the top row of the expanded kernel 1626. This top row is selected for the multiply-accumulate operation. This top row thus forms the expanded kernel vector 1632A. A dot product is performed by the multiply-add unit 140 between the selected input values 1630A and the expanded kernel vector 1632A to generate the output 1634A for position 1.

At 1603A, output position 2 is processed. Output position 2 corresponds to the second column from the right for the control pattern 1624 (as labeled). Note that the ordering of the columns here does not have to follow the order shown. Instead, so long as the correct column corresponding to the correct output position is selected, the ordering of the columns can be any order. Furthermore, the control pattern 1624 does not need to be ordered by column, but can be ordered by row as well. So long as the correct row is referenced that corresponds to the correct output position, the output will also be the same. Finally, the order of the identifiers in the control panel can be reversed as well. So long as the identifiers are referenced in the correct order when using them to select the input values, the output will also be the same. This same concept applies to the expanded kernel 1626 as well, as it can be ordered differently from the ordering described here.

As noted in the legend, the identifier "A" in the control pattern 1624 refers to tile X of the flattened input 1622, where X is the current tile, while the identifier "B" refers to tile X+1. The control pattern vector 1636A includes both identifiers "A" and "B". For each position in the control pattern vector 1636A, the multiply-add unit 140 determines which tile the identifier is referring to, and selects from that referenced tile in the flattened input 1622 the input value that is at the same input position in the vector of the tile in the flattened input 1622, as the position of the identifier in the control pattern vector 1636A. Thus, for example, the position 6 in the control pattern vector 1636A has the identifier "B" which indicates that a value should be selected from the tile X+1, which is tile 2 of the flattened input 1622 (current tile #1+1=tile 2). The multiply-add unit 140 selects from the tile 2 vector of the flattened input 1622 the value at input position 6, which corresponds to the position 6 in the control pattern vector 1636A, and places this at position 6 of the selected input values 1638A. The remaining values are selected in a similar fashion.

The process is continued in FIG. 16C, which illustrates a third part of the example of generating an output activation using the flattened input, expanded kernel, and control pattern in the case of a two dimensional kernel, in accordance with an embodiment.

At 1614A, the selected input values 1638A generated in the previous operation are combined with the expanded kernel vector 1642A in a dot product to generate the output 1644A for position 2. Here, the expanded kernel vector 1642A is once again selected according to the output position number, which is 2 in this case. Thus, the second row of the expanded kernel 1626 is selected as the expanded kernel vector 1642A.

The multiply-add unit 140 performs the above process for the remaining output positions of the tile. As an example, at 1606A, the process is performed for output position 5. Here, at 1615A, the control pattern vector 1646A is selected from the output position 5 column as shown in FIG. 16A. Here, the control pattern vector 1646A includes the two new identifies "C" and "D" which correspond to tile X+K and X+K+1, respectively, where K represents the number of tiles in a row of the input. Thus, as shown, position 9 in the control pattern vector 1646A is selected from position 9 of tile 6 in the flattened input stream. This results in the selected input values 1648A for this output position.

The process continues in FIG. 16D, which illustrates a fourth part of the example of generating an output activation using the flattened input, expanded kernel, and control pattern in the case of a two dimensional kernel, in accordance with an embodiment.

At 1615A, the multiply-accumulate operation is performed. The multiply-add unit 140 performs a dot product between the selected input values 1648A and the expanded kernel vector 1652A selected for position 5. In the illustrated example this is row 5 of the expanded kernel 1626. The dot product result is output 1654A of position 5. This process is repeated at 1616 until all outputs in the current tile are generated. Furthermore, this process is repeated at 1617 until all tiles are processed.

Figure 16E:
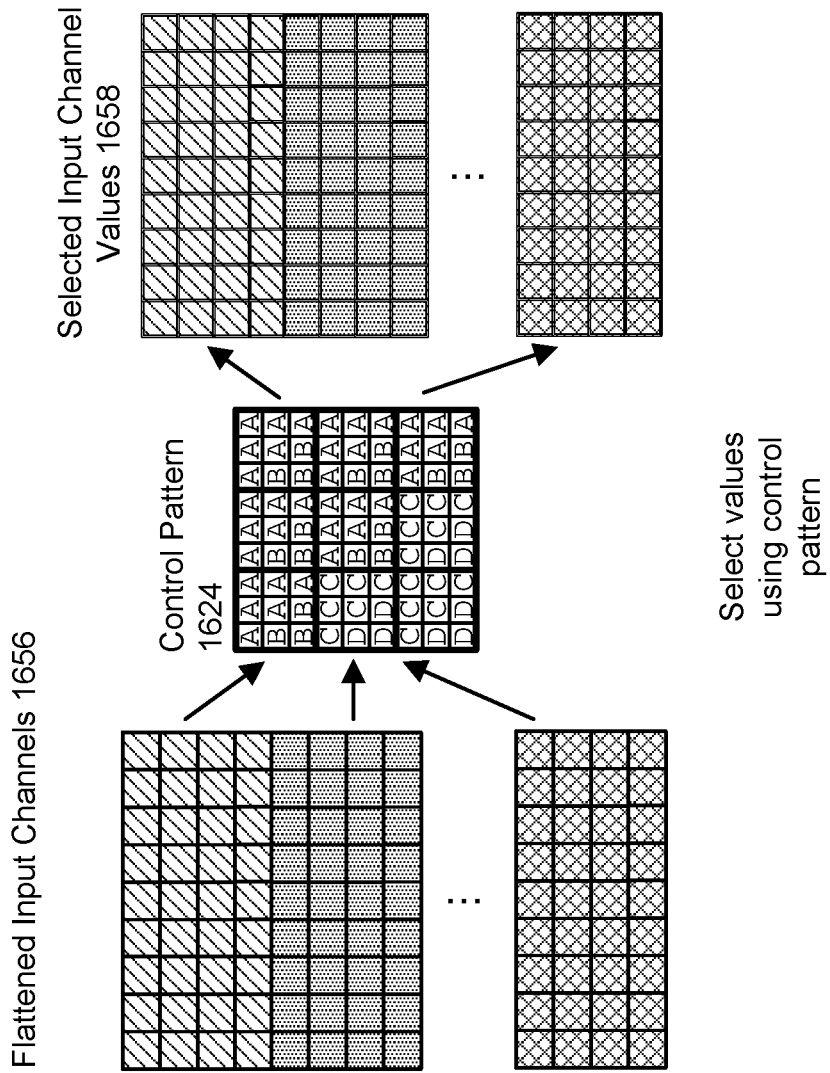
FIG. 16E illustrates an example of generating an output activation with multiple channels using the flattened input, expanded kernel, and control pattern in the case of a two dimensional kernel, in accordance with an embodiment.

FIG. 16E illustrates an example of generating an output activation with multiple channels using the flattened input, expanded kernel, and control pattern in the case of a two dimensional kernel, in accordance with an embodiment.

As described previously, an input tensor 102 may have multiple channels, with each channel being a separate matrix of input values. As described previously with reference to FIG. 5C, the multiple channels of an input are flattened and "stacked" on top of each other. At 1618, each of these input channels are flattened according to the methods described in FIGS. 4-6, and values from the flattened input channels 1656 are selected by the control pattern 1624 to generate the selected input channel values 1658. Although a new matrix of selected input channel values 1658 are shown here, in practice no new matrix may be generated. Instead, the multiply-add unit 140 may select values from the flattened input channel 1656 on the fly. Thus, the selected input channel values 1658 are shown here to illustrate the concept conceptually.

Figure 16F:
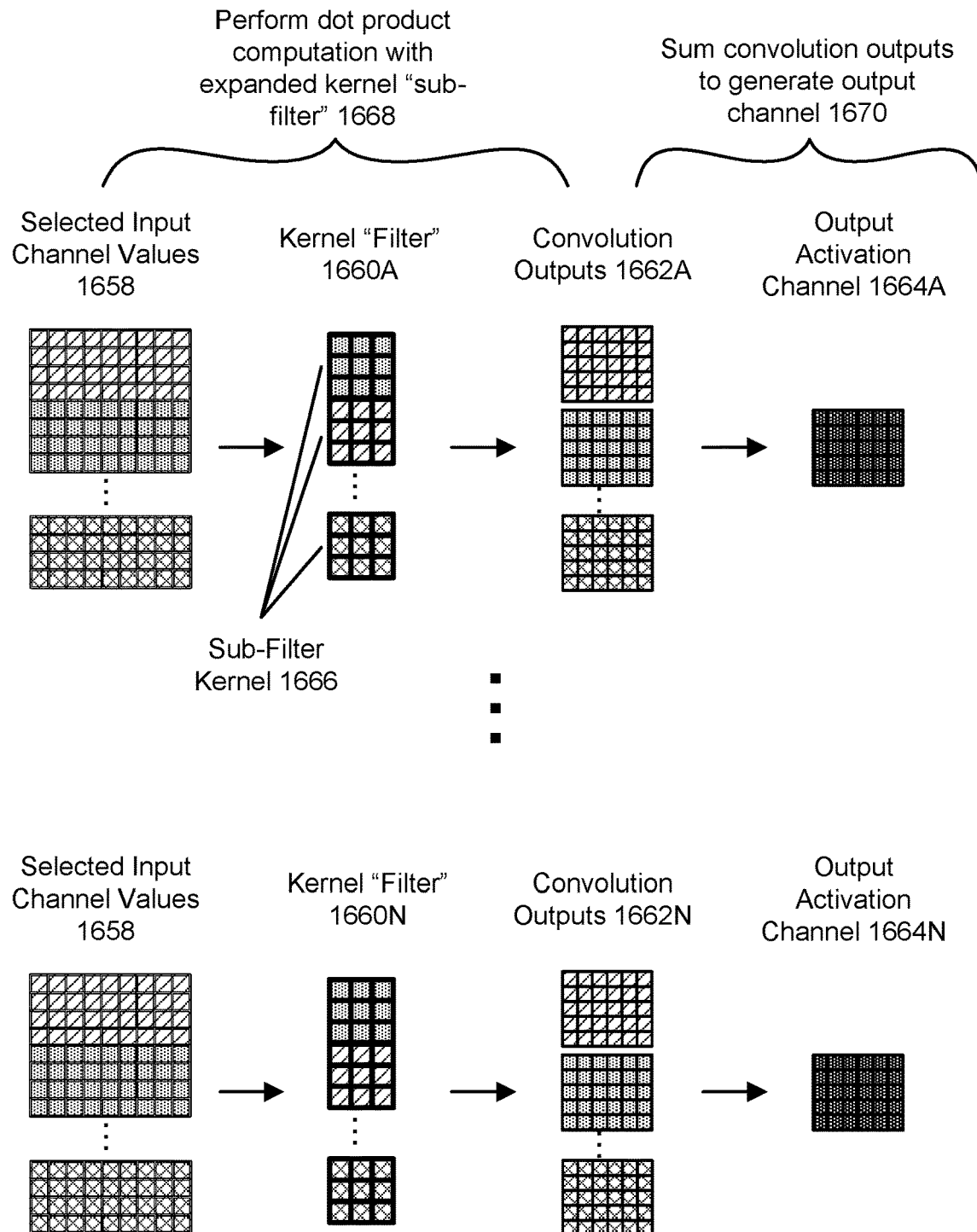
FIG. 16F illustrates a second part of the example of generating an output activation with multiple channels using the flattened input, expanded kernel, and control pattern in the case of a two dimensional kernel, in accordance with an embodiment.

The process continues in FIG. 16F, which illustrates a second part of the example of generating an output activation with multiple channels using the flattened input, expanded kernel, and control pattern in the case of a two dimensional kernel, in accordance with an embodiment.

At 1618, multiply-add unit 140 perform 1668 the dot product (i.e., the multiply-accumulate) with the selected input channel values 1658 and the kernel filter 1660A-N. Each input channel in the selected input channel values 1658 are convoluted with a different sub-filter kernel 1666, which are kernels themselves. Each sub-filter kernel 1666 may have the same or different values. The convolution process may be similar to that described above for FIGS. 16A-D. The generated convolution outputs 1662A are summed 1670 together for a single kernel filter to generate the output activation channel 1664A. For each remaining kernel filter 1660B-N, this process is repeated, such that multiple output activations 1664B-N are generated. These output activations 1664A-N can serve as the input to additional convolution layers in a neural network.

Figure 17A:
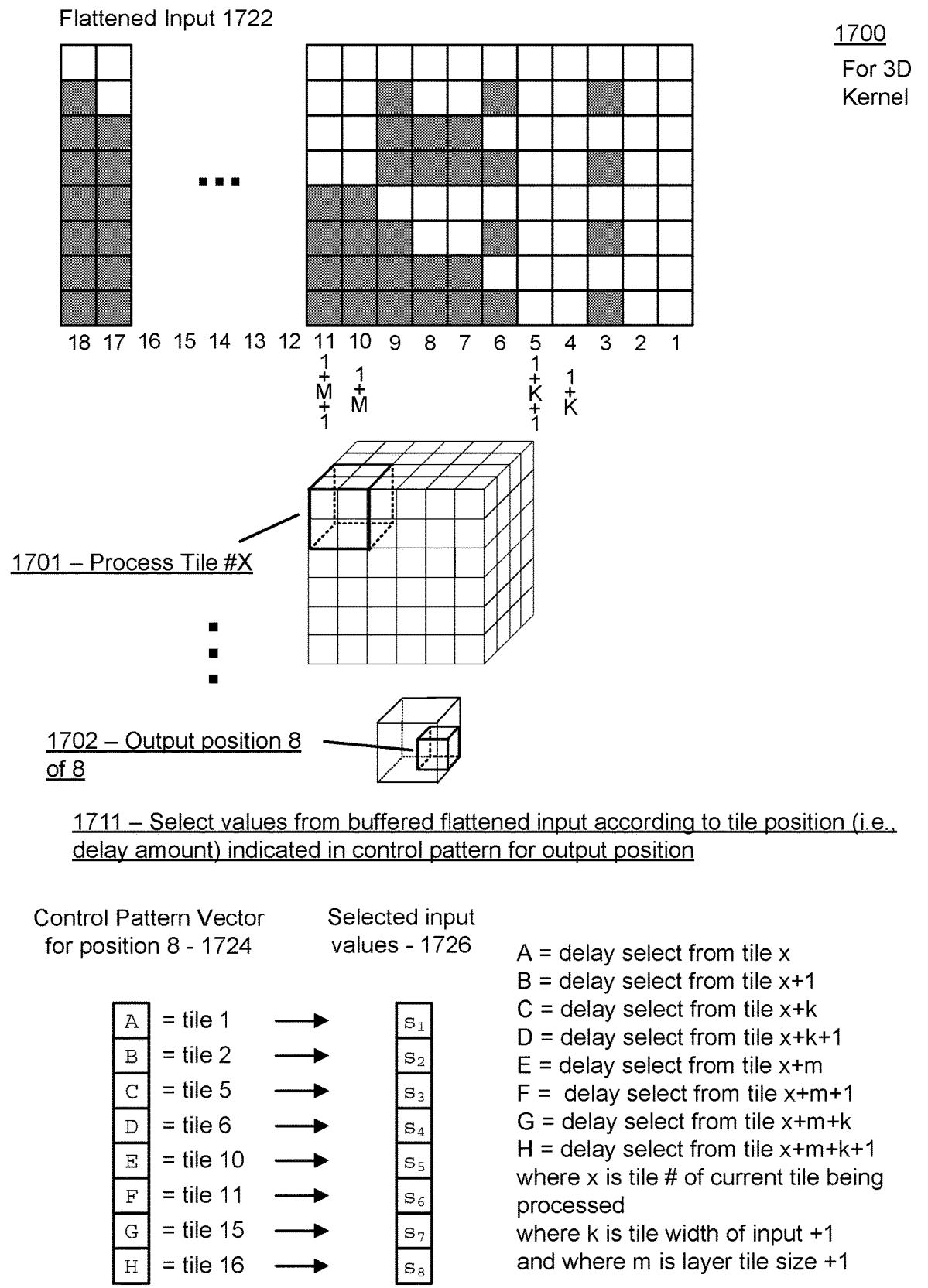
FIG. 17A illustrates a first part of an example of generating an output activation using the flattened input, expanded kernel, and control pattern in the case of a three dimensional kernel, in accordance with an embodiment.

FIG. 17A illustrates a first part of an example of generating an output activation using the flattened input, expanded kernel, and control pattern in the case of a three dimensional kernel, in accordance with an embodiment. In one embodiment, the process described herein may be performed by the multiply-add unit 140.

At 1701, a tile X of the input is being processed by the multiply-add unit 140. At 1702, the multiply-add unit 140 processes an output position 8 of 8 of the tile X. At 1711, the multiply-add unit 140 selects the values from the flattened input 1722 using the selected control pattern vector 1724 for position 8. As with the processes described above for the one and two dimensional kernels, a vector of the control pattern corresponding to the output position (in this case position 8) is selected as the control pattern vector 1724. The control panel vector 1724 has eight different identifiers, from "A" to "H." As shown in the legend in FIG. 17A, each identifier indicates a different tile of the flattened input 1722. For example, identifier "H" corresponds to tile X+M+K+1, where M is the number of tiles in each layer and K is the number of tiles in each row of the input. For each identifier, the multiply-add unit 140 selects from the indicated tile of the flattened input 1722 a value at a position corresponding to the position of the identifier for the selected input values 1726.

The process is continued at FIG. 17B, which illustrates a second part of an example of generating an output activation using the flattened input, expanded kernel, and control pattern in the case of a three dimensional kernel, in accordance with an embodiment.

At 1712, multiply-add unit 140 combines the selected input values 1728 for position 8 with the expanded kernel vector 1730 for position 8 in a dot product to generate the output 1732 for position 8 for the current tile. The expanded kernel vector 1730 that is selected corresponds to the position of the output.

At 1713, the process described above is repeated by the multiply-add unit 140 for all output positions for each tile in the input to generate the output activation.

Exemplary Processor Components

Figure 18A:
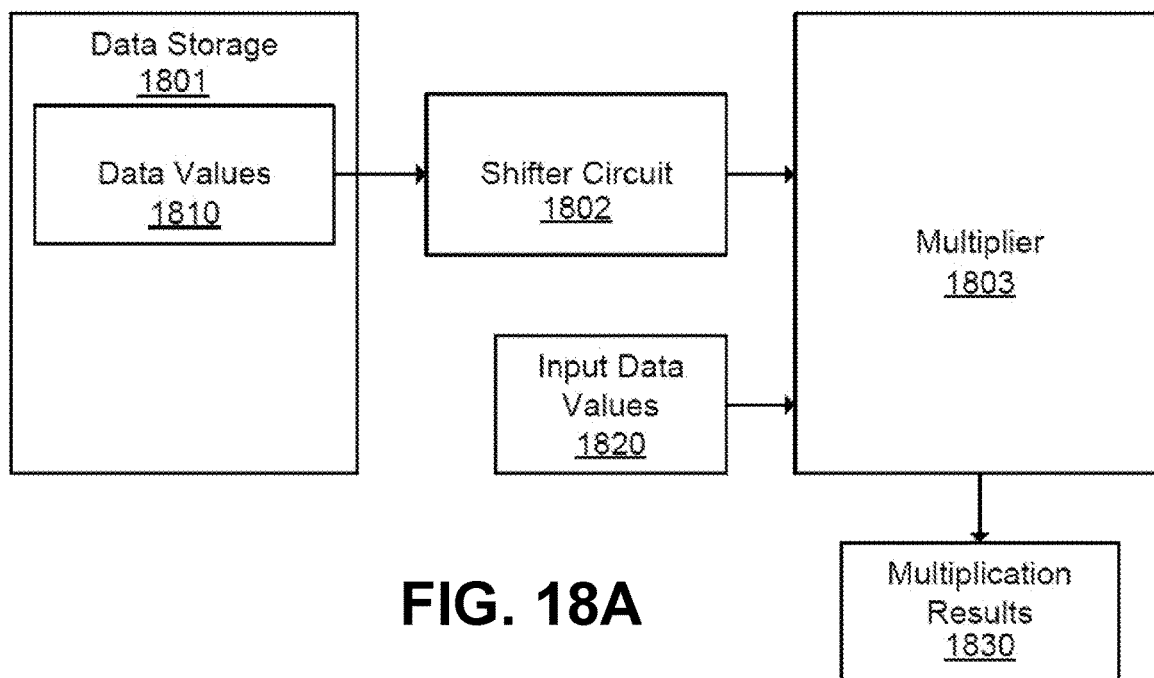
FIG. 18A illustrates a hardware diagram for an exemplary component to generate the expanded kernel, in accordance with an embodiment.

FIG. 18A illustrates a hardware diagram for an exemplary component to generate the expanded kernel, in accordance with an embodiment. In some embodiments, data values 1810 corresponding to an array (e.g., a kernel of weights) are be stored in a data storage circuit 1801 (e.g., a memory circuit). In some embodiments, the data values corresponding to an array are be stored as a sequence (e.g., as a single column). In this example, data values 1810 are coupled to a shifter circuit 1820 on one or more inputs. The shifter circuit may receive the array as a sequence of data values. Each data value may comprise one or more bytes of digital data values, for example, which may be integers, floating point numbers, or other types of data values, for example. Accordingly, each data value may be coupled to shifter circuit 1802 on a plurality of conductors (e.g., wire interconnects on an integrated circuit), where a set of conductors may carry one data value, and groups of conductors may carry a sequence of data values, for example. In one embodiment, the data values are weights and the input data values are activation values for a neural network.

Conductors carrying data values may be received on an input of shifter circuit 1802. The input of shifter circuit 1802 may receive conductors for carrying some or all of a sequence, for example. As mentioned above, data values corresponding to an array may be received as a sequence. In one embodiment, the sequence comprises all the data values of the corresponding array received from data storage 1810 in parallel. However, in other embodiments, the sequence may comprise a portion of the data values of the corresponding array (e.g., received and permuted one column at a time or one row at a time). Shifter circuit 1802 may couple data values from one or more inputs to one or more outputs in a different order to produce the permuted sequences. In some embodiments, a plurality of outputs each carry one sequence, which may be coupled to a multiplier 1803. In other embodiments, data values of a sequence received on a first input are shifted to different positions and coupled to one or more outputs. In one example embodiment shown below, a sequence is received on a first input, data values are shifted to different positions, and permuted sequences are generated on a second output sequentially.

In some embodiments, the permutations produced by shifter circuit 1802 may correspond to an expanded kernel, as described above. Accordingly, in some embodiments, only one sequence may be stored in memory, rather than multiple permuted sequences so that memory usage is advantageously reduced, for example. For example, the sequence received from data storage 1801 may comprise a plurality of subsequences based on columns or rows of the array. Shifter circuit 1802 may permute the sequence as follows. The data values may be coupled from the one or more inputs to the one or more outputs of the shifter circuit 1802 in a same order as the sequence. Accordingly, the input sequence may comprise one of the sequences produced by the output. Additionally, for a plurality of permutations of the subsequences, where positions of each subsequence are moved within said sequence, and for a plurality of permutations of the data values in each subsequence, where the data values are moved within each subsequence, the data values are coupled from the one or more inputs to the one or more outputs in a different order. Examples of such permutations for different arrays are illustrated above. In one embodiment, the data values are received on a first input of the shifter circuit 1802, and the data values are coupled from the first input to a first output to produce the input sequence on the first output. Additionally, the data values may be coupled from the first input to a plurality of second outputs in different orders to produce the plurality of permuted sequences on the plurality of second outputs. An example implementation of this approach is illustrated below in FIG. 18B. In another embodiment, the data values are received on one or more inputs of shifter circuit 1802, the data values are shifted to different positions between the input(s) and one or more outputs to produce the input sequence and a plurality of permuted sequences.

A multiplier circuit 1803 may be coupled to the one or more outputs of the shifter circuit 1802. Accordingly, the sequences produced on the one or more outputs of the shifter circuit 1802 may be loaded into a plurality of register circuits in multiplier 1803. Multiplier 1803 may further receive input data values 1820. The input data values 1820 may be loaded in a plurality of second registers. Accordingly, a plurality of multiplication results 1830 may be generated. As mentioned above, the expanded kernel may result in a plurality of convolution results being generated in parallel, for example. In one embodiment, the data values correspond to an M×N array (e.g., a kernel to be applied to input data values 1820). Shifter circuit 1802 may receive an M*N length sequence from data storage 1810 and produce M*N different sequences each of length M*N. The sequences may be coupled from shifter circuit 1802 and loaded into multiplier circuit 1803 (e.g., in parallel).

Figure 18B:
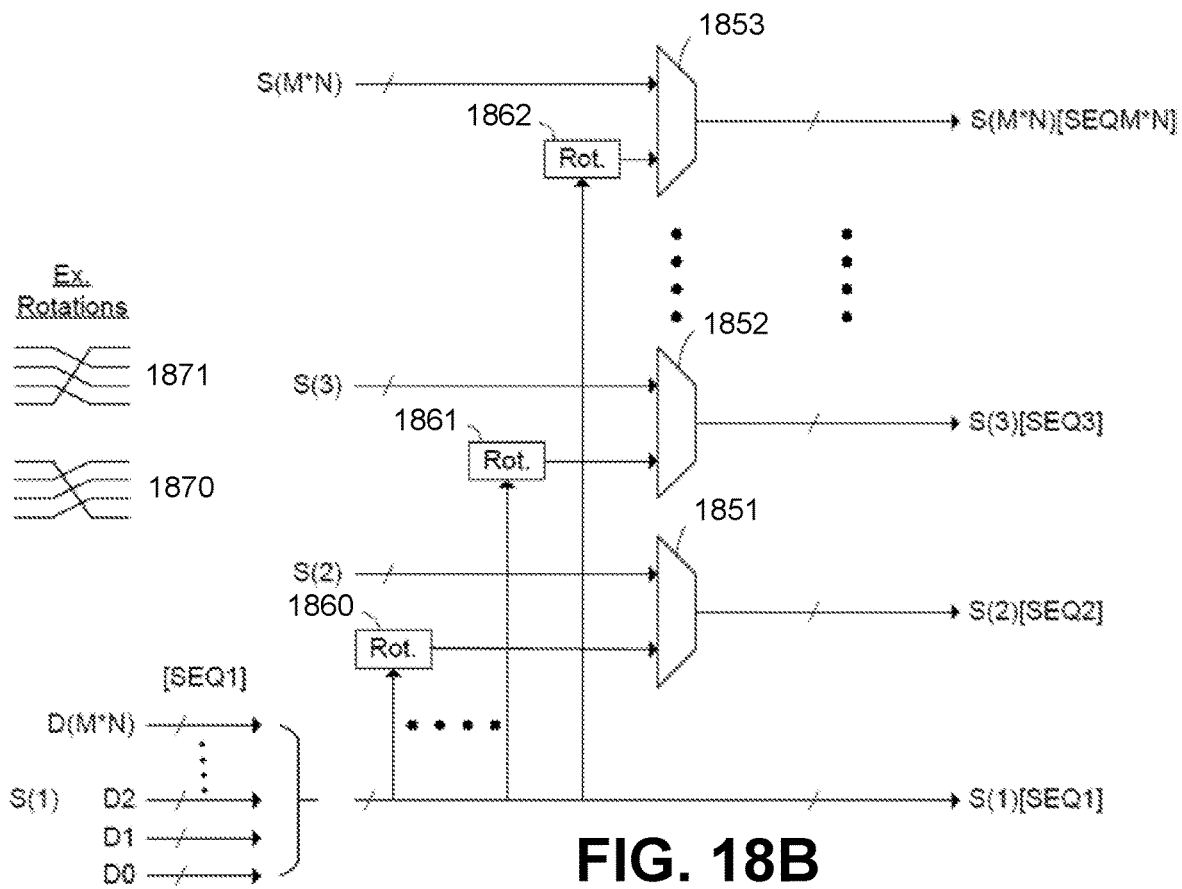
FIG. 18B illustrates a hardware diagram for an exemplary shifter circuit used in the exemplary component to generate the expanded kernel, in accordance with an embodiment.

FIG. 18B illustrates a hardware diagram for an exemplary shifter circuit used in the exemplary component to generate the expanded kernel, in accordance with an embodiment.

In this example, the input sequence SEQ1 corresponds to an M×N array, where M and N are integers and one or more of M and N are greater than 1, for example. Thus, sequence SEQ1 comprises M*N data values, D0-D(M*N). Sequence SEQ1 may be coupled from an input to a first output (e.g., stream S(1)) comprising the M*N data values unpermuted. Additionally, sequence SEQ1 may be permuted along M*N−1 different paths into M*N−1 different sequences SEQ2−SEQM*N, which are provided on M*N−1 outputs (e.g., streams S(2)-S(M*N), which each comprise M*N permuted data values, D0-D(M*N), for example.

More specifically, in this example, a sequence SEQ1 comprising a plurality of data values D0-D(M*N) are received on a first input stream S(1). Each data value in the sequence may comprise one or more bytes carried on a plurality of conductors, for example. Here, the data values are coupled from a first input (e.g., stream S(1)) to a plurality of different outputs (e.g., streams S(1)-S(M*N)) along different conductive paths in different orders to produce the original sequence SEQ1 and a plurality of permuted sequences SEQ2-SEQM*N on the plurality of different outputs (e.g., streams S(1)-S(M*N)). For example, each data value D0-D(M*N) in the input sequence may comprise one or more bytes carried on a plurality of conductive wires. The conductive wires carrying different data values are reordered differently between the input (e.g., stream S(1)) and each of a plurality of outputs (e.g., streams S(2)-S(M*N)) to produce a different permuted sequence on each of the plurality of outputs. More specifically, in this example, SEQ1 on input S(1) is coupled to a plurality of rotators 1860-1862. Rotators 1860-1862 may reorder the positions of the data values in each sequence by changing the positions of the conductors carrying the data values, for example. Two example rotations are illustrated at 1870 and 1871. In this example, after rotation, each permuted sequence may be coupled to an input of a multiplexer circuit. Embodiments of the disclosure may include an integrated circuit comprising a plurality of streams, S. Permuted sequences generated from SEQ1 via rotators 1860-1862 may be coupled to adjacent streams S(2)-S(M*N) using multiplexers 1851-1853, for example. For instance, each of the reordered conductive wires carrying different permuted sequences SEQ2-SEQM*N of data values D0-D(M*N) may be coupled to an input of each multiplexer. A second input of each multiplexer is coupled one of the streams, S(2)-S(M*N). Accordingly, an output of each multiplexer couples one of the permuted sequences onto each stream. Additionally, conductive wires for the input carrying the original sequence SEQ1 of data values D0-D(M*N) are coupled to a first output (e.g., stream S(1)) in a same order to produce the original sequence on the output carrying stream S(1). Streams S(1)-S(M*N) carrying SEQ1-SEQM*N, respectively, may be coupled to multiplier circuit, for example. Accordingly, in this example, all permutations of sequence SEQ1 may advantageously be generated in parallel on the same cycle and loaded into multiplier in parallel.

Figure 19:
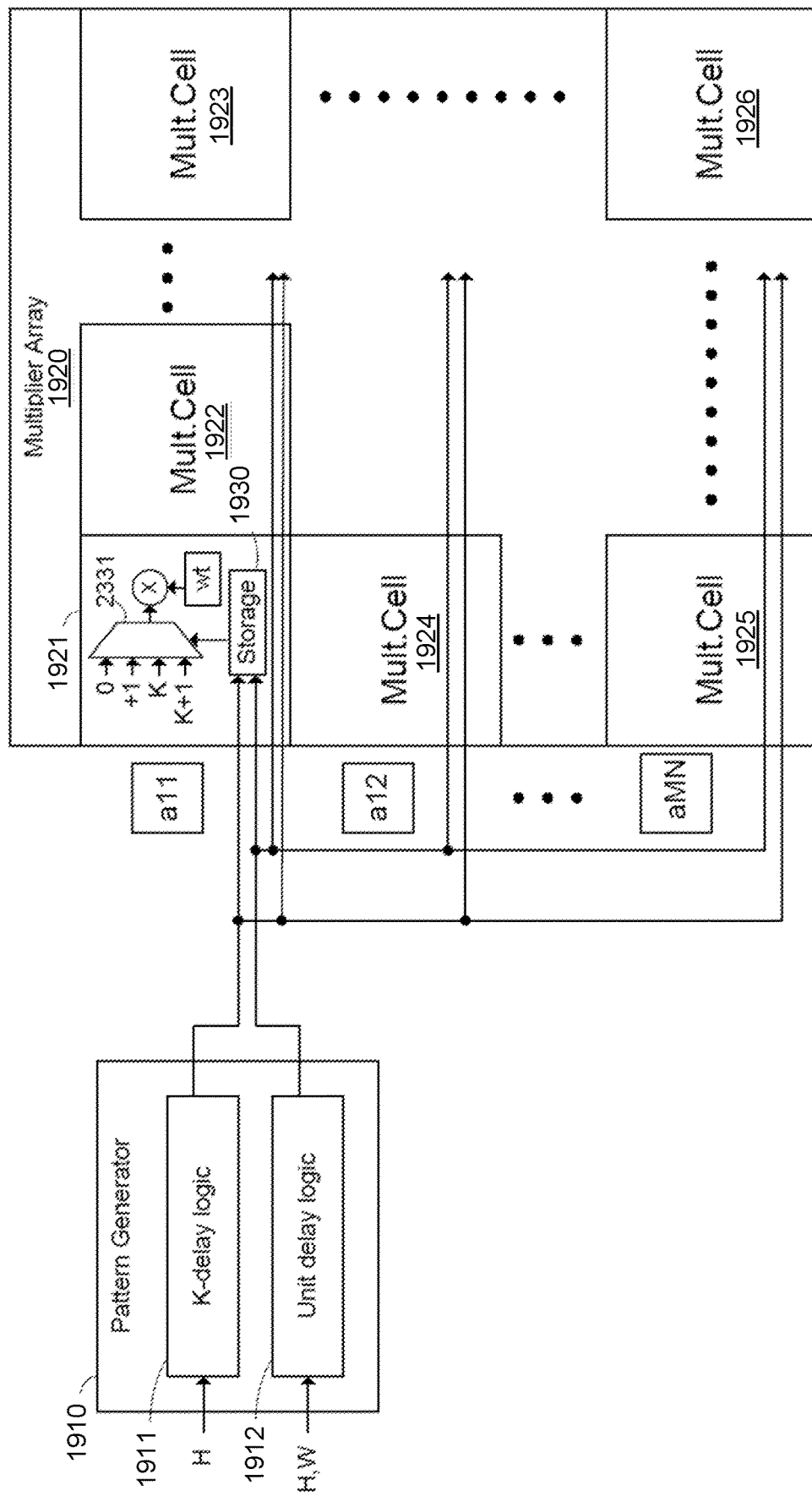
FIG. 19 illustrates a hardware diagram for an exemplary component to generate the control pattern, in accordance with an embodiment.

FIG. 19 illustrates a hardware diagram for an exemplary component to generate the control pattern, in accordance with an embodiment. Features and advantages of some embodiments may include a control pattern generator circuit 1910, which may be integrated on the same semiconductor surface as a multiplier array circuit 1920, for example. In one embodiment, control pattern generator 1910 is configured (e.g., via software) to receive dimensions of a kernel, such as a height (H) and width (W). Control pattern generator 1910 may produce two bits, for example, for each of the multiplier cells 1921-1926 in multiplier array 1920. One bit may select between a K-delayed or not K-delayed input, and the other bit may select between a unit delayed and not unit delayed input (e.g., 1-delay or no delay). Each multiplier cell may comprise a storage unit (e.g., a register) for storing two pattern control bits, for example. Together, the two bits may select one of four data values using selection circuitry: x, x+1, x+K, x+K+1, where x is the current tile, and K is the variable indicating the tile sized width of the input tensor, as described above. For kernels with additional dimensions, the control pattern generator 1910 generates an additional bit for each additional dimension, with that bit selecting between an additional delay by a shifting variable for that additional dimension, or no additional delay. Note that although the term delay is used here, in some cases the accessed values of the flattened input stream are not accessed via a delay, but rather via a relative or absolute addressing system that can use the delay values as index values into the memory.

In this example, control pattern generator 1910 comprises a K-delay logic circuit 1911 and a unit delay logic circuit 1912. K-delay logic circuit 1911 may receive a single dimension of a kernel, for example, and produce H*H bit values for selecting between a K delayed input and a non-K delayed input. In this example, K-delay logic circuit 1911 receives a height of the kernel, H, and produces $H^2$ bit values corresponding to an H×H triangular array of the control pattern. While H is used as the input to the K-delay logic circuit 1911 in this example, other embodiments could use another dimension, such as width W, for example, as an input to K-delay logic circuit. Further, unit delay logic circuit 1912 may receive two dimensions, such as height, H, and width, W, for example. Unit delay logic circuit 1912 produces H*W bit values for selecting between inputs (e.g., either undelayed or K-delayed) that are either unit delayed (+1) or not unit delayed (e.g., 0), for example. In this example, unit delay logic circuit 1912 receives a height of the kernel, H, and a width of the kernel, W, and produces H*W bit values corresponding to an H*W triangular array (e.g., array 2220 in FIG. 22). Pairs of bit values for selecting undelayed/K-delayed and unit delay/no unit delay are coupled to a plurality of multiplier cells 1921-1926 and stored in a storage circuit 1930, such as a register, in each multiplier cell, for example. Selection is illustrated here with a multiplexer FIG. 1931, but a number of different selection circuits are known to those skilled in the art. In this example, one bit from K-delay logic circuit 1911 and one bit from unit delay logic circuit 1912 may be stored in storage units in each of multiplier cells 1921-1926 to select one of the undelayed, unit delayed, K delayed, or K+1 delayed input values, for example. A pattern similar to pattern 2220 shown in FIG. 22 may correspond to first bit values in storage circuits 1930 across multiplier array 1920, and patterns similar to pattern 2210 in FIG. 22 may correspond to second bit values in storage circuits 1930 repeated across multiplier array 1920 to control selection of inputs across the multiplier array.

Figure 20:
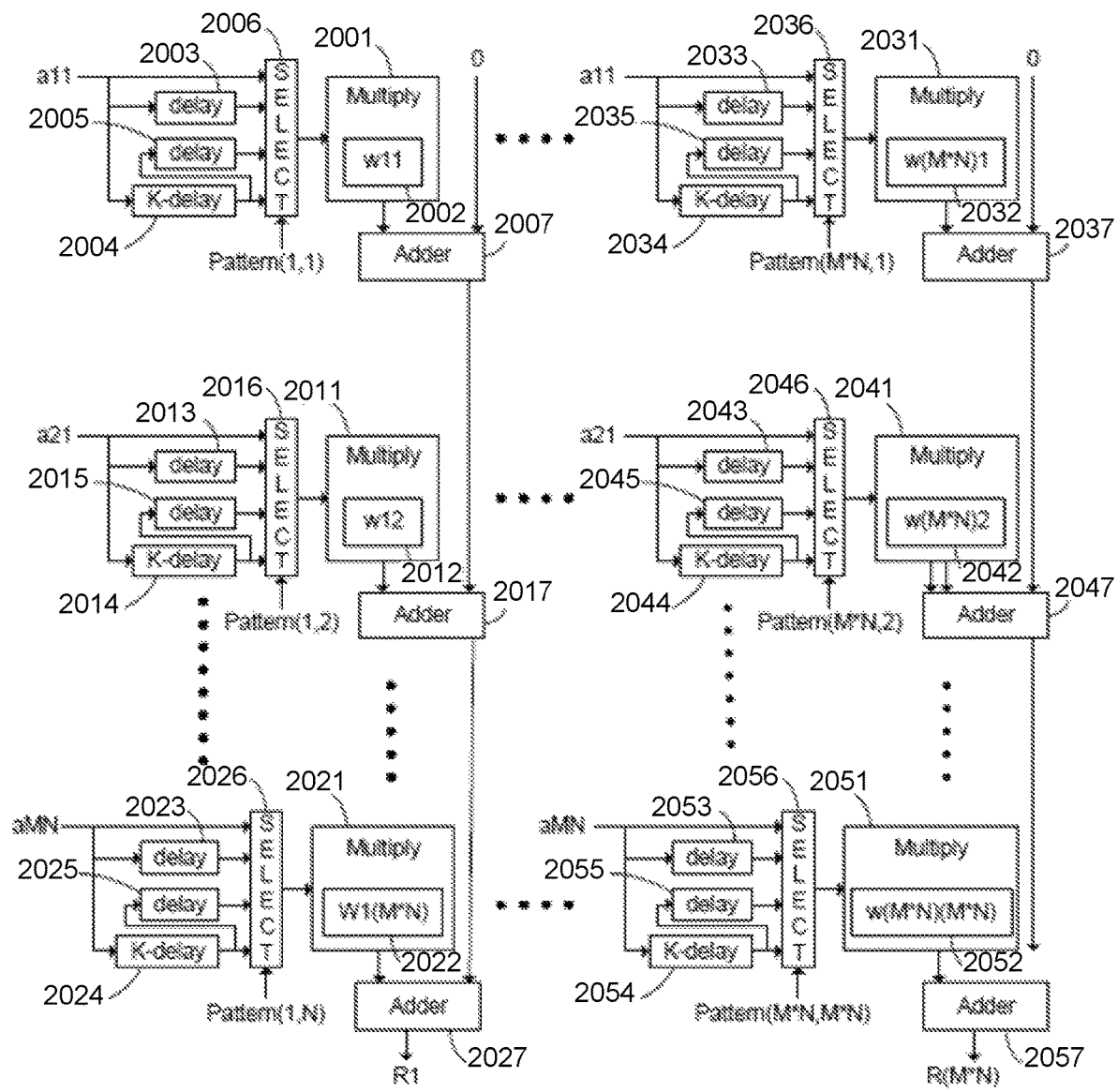
FIG. 20 illustrates a hardware diagram for an exemplary component to perform the multiply-add operation to generate the output activations, in accordance with an embodiment.

FIG. 20 illustrates a hardware diagram for an exemplary component to perform the multiply-add operation to generate the output activations, in accordance with an embodiment. In this example, values from an expanded kernel (M*N) are loaded into first input registers of a plurality of multiply-accumulator circuits, and the input values, aij, are loaded into second input registers of the plurality of multiply-accumulator circuits. For instance, multiply-accumulator circuits may include a plurality of multipliers 2001, 2011, 2021, 2031, 2041, and 2051, where a plurality of multiplier circuits may be loaded with different values, wij, from the expanded kernel. Each multiplier may further be loaded with an input value from one of a plurality of tiles of the flattened input stream. For example, a11 corresponds to the value in the all position of a first tile (i.e., the first row and first column in the tile), which may be coupled to one input of a select circuit 2006 (e.g., a multiplexer or "Mux"). The all input may further be coupled to a delay circuit 2003 to produce a delayed version of a11 (e.g., one cycle delay) at a second input of select circuit 2006. This delayed version selects for a tile one unit from the current tile. Additionally, all may be coupled to a K-delay circuit 2004 (e.g., a buffer or first in first out data storage unit ("FIFO")) to produce a version of all delayed by K cycles, for example, at another input of select circuit 2006. This corresponds to a tile that is one row below the current tile. Further, the output of K-delay circuit 2004 may be received at the input of another delay circuit 2005 to produce a K+1 delayed version of all at yet another input of select circuit 2006. Similarly, multipliers 2011 through 2021 receive values w12, . . . , w1(M*N) corresponding to the first row of an expanded array and input values a11 . . . aMN, for example. Likewise, other rows of the expanded array may be multiplied by the input values a11 . . . aMN up to a last row of an expanded array, w(M*N)1, . . . , w(M*N)(M*N), where the rows comprise permuted values as described above, for example. Multipliers 2011, 2021, 2031, 2041, and 2051 comprise delays 2013, 2023, 2033, 2043, and 2053, K-delays 2014, 2024, 2034, 2044, and 2054, delays 2015, 2025, 2035, 2045, and 2055, and select circuits 2016, 2026, 2036, 2046, and 2056, respectively.

A control pattern may be used to select between the various versions of a11, for example, so that an input value from the appropriate tile is multiplied with the weight stored in a particular multiplier. In this example, the input values are multiplied by the sequence in the first row of the expanded kernel, and thus, a11w11 . . . aMNw1(M*N) have a control pattern value corresponding to A (a current tile subject to the convolutions). However, in this example, calculating a convolution across an entire tile, including convolutions involving adjacent tiles, may include waiting for the input values in the adjacent tiles to arrive. Thus, calculating a convolution for a given "current tile" may include waiting K+1 cycles for the adjacent tile values to be available. Additional control pattern values may be used as described above depending upon the dimensions of the kernel. To calculate a convolution of a current tile, the system may store input values and wait for input values from the other tiles to be available to make the calculation, for example. Accordingly, convolutions for a particular tile may be calculated using K+1 delayed input values for the particular tile, K delayed input values as values in the adjacent column tile, 1 delayed values as the input values in the adjacent row tile, and undelayed values as the input values in the tile adjacent to the adjacent row and adjacent column tiles, for example. While the present specification refers to current values (e.g., for current tiles, or undelayed values), unit (or 1) delayed values, K delayed values, and K+1 delayed values, it is to be understood that such delays may be relative to each other (e.g., at the input of a select circuit).

A variety of other delays may exist in the signal path, but are omitted here for illustrative purposes. Furthermore, if the kernel were to have additional dimensions, additional delayed values, such as an M delayed value, etc., and corresponding circuitry, would be included.

An array of input values all-aMN (e.g., all-a33) may be loaded into an array of multiplier circuits 2001, 2011, ..., 2021, which are each also loaded with different weights w11, w12, ..., w1(M*N) (e.g., w33). As described above, each multiplier receives an input selected using a different control pattern input from a control pattern array having the same dimensions as the expanded kernel providing the weights, for example. The outputs of each multiplier 2001, 2011, ..., 2021 may be coupled to one or more adder circuits (e.g., adders 2007, 2017, 2027) to sum the products and output a convolution result, R1. Similarly, each row of the expanded kernel may be loaded into a plurality of multipliers and multiplied by a vector of input values masked with a corresponding row from the control pattern array. Here, a last row of the expanded kernel comprising values w(M*N)1, w(M*N)2, ..., w(M*N)(M*N) are loaded into a column of multipliers 2031, 2041, and 2051 and combined with input values all, a12, ..., aMN controlled by a last row in the control pattern array comprising values at locations (M*N,1), (M*N,2), ..., (M*N, M*N), for example. Outputs of the last column of multipliers are added together in adders 2037, 2047, and 2057 to produce an M*Nth convolution result, R(M*N), for example. In an equivalent alternative embodiment, the delays may be coupled to outputs of the multipliers.

Figure 21:
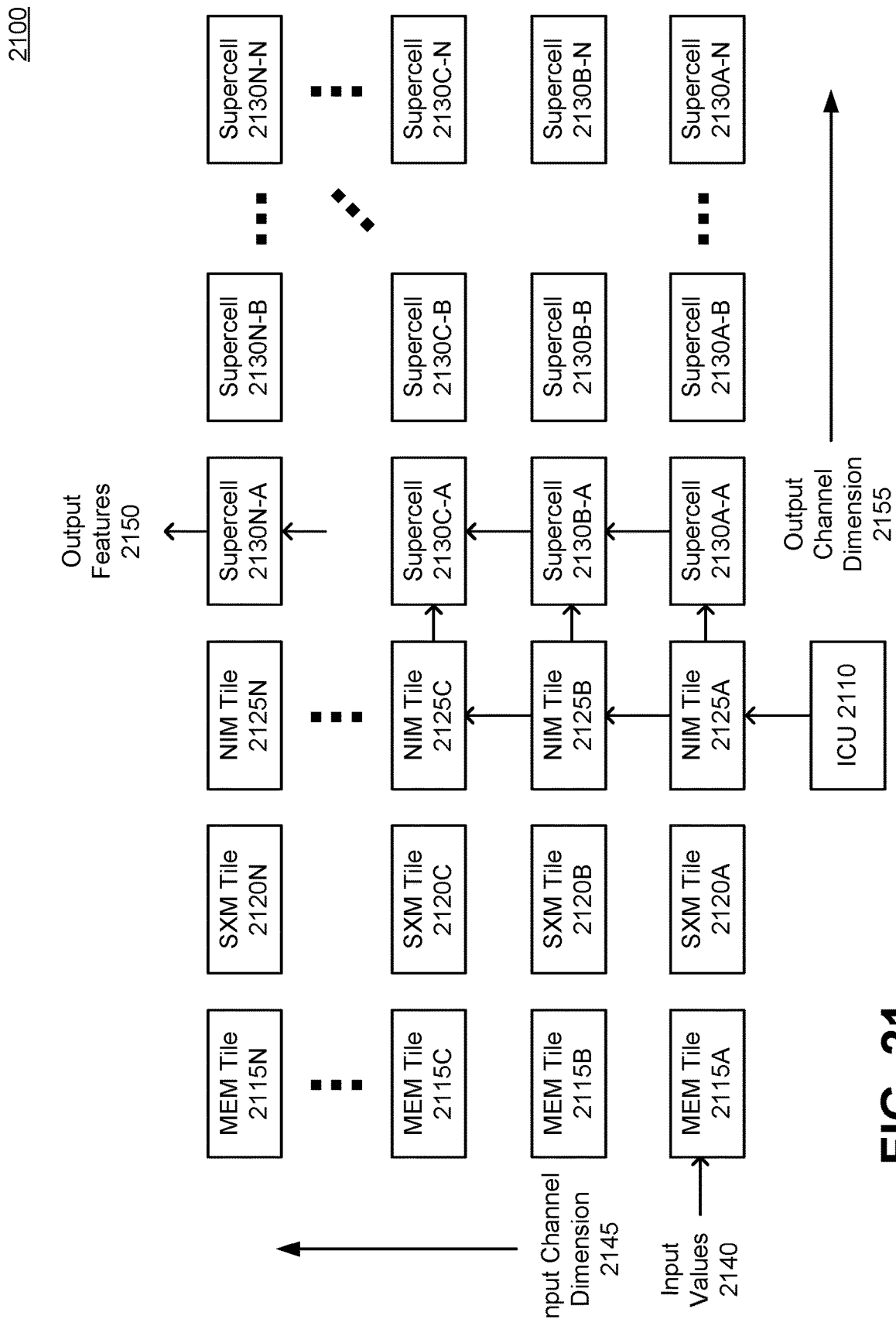
FIG. 21 illustrates an exemplary component layout for computing the output activations in a machine learning processor, according to an embodiment.

FIG. 21 illustrates an exemplary component layout 2100 for computing the output activations in a machine learning processor, according to an embodiment. The illustrated layout represents one possible layout of components (logical and/or physical) in a machine learning processor (or other processor) to perform the operations described herein. The layout 2100 includes the ICU 2110, a plurality of MEM tiles 2115A-N, a plurality of S×M tiles 2120A-N, a plurality of NIM tiles 2125A-N, and an array of supercells 2130A-A through 2130N-N. These elements may be referred to generally in the following description by omitting their alphabetical suffix.

The ICU 2110 issues instructions to the NIM tiles 2125. These instructions instruct the NIM tiles 2125 to configure the supercells 2130 with the correct control pattern values in order to perform the convolution operation described herein. The supercells 2130 are arranged in a square grid. Each supercell 2130 has a size, which indicates how many values it can process in parallel. The supercells 2130 may all have the same size. For example, each supercell may be a 16×16 grid and can process 256 values.

In one embodiment, input channels are divided among the supercells 2130 vertically, as indicated by 2145, such that each input channel, after being flattened, is processed by one or more layers of the supercells 2130 (the layers indicated by the first letter in the naming scheme). The one or more layers may include only a fractional portion of a layer, as an input layer may be smaller than the size of a supercell 2130, or when the vertical dimension of the input channel does not divide evenly into the vertical dimension of a supercell 2130. In the same embodiment, output features (i.e., different output "channels") are divided among the supercells 2130 horizontally, as indicated by 2155. Thus, one or more columns (or fractional portions) of the supercells 2130 (indicated by the second letter in the naming scheme) are used to process each output feature.

The supercells 2130 themselves may be similar to the multiply-accumulate units described above. The supercells, after performing the convolution operation for the input values 2140, transmit its outputs to the supercells 2130 above it. This allows the convolutions of different input layers to be summed together to generate an output features 2150 from the multiple input layers. Multiple sets of output features 2150 are generated if there are multiple channels for the output, using the methods described above (e.g., in FIGS. 16E-F).

On a first clock cycle, the ICU 2110 instructs the first NIM tile 2125A to configure one or more supercells 2130 associated with that NIM tile 2125A. In the illustrated example, the supercells 2130 on the same layer as the NIM tile 2125A are configured by the NIM tile 2125A. These are the supercells 2130A-* (where * is any letter from A to N). On a second clock cycle, the NIM tile 2125A configures the supercell 2130A-A with the correct control pattern values, using the methods described in FIGS. 13A-B. For the first supercell 2130A-A, the row and column numbers have no offset when generating the control pattern values. However, for any other supercell 2130 other than the supercell 2130A-A, the row and column numbers used to generate the control pattern values have an additional offset. For the column number, this offset is equal to the number of supercells 2130 to the left ("west") of the supercell 2130 being configured, multiplied by the cell width of a supercell 2130. For the row number, this offset is equal to the number of supercells 2130 below ("south") the supercell 2130 being configured, multiplied by the cell height of a supercell 2130. The offset values may additionally be padded according to how much of a fraction of a supercell may already be used from processing a previous input channel or output channel. The reason that this offset is used is because the tile, control pattern, and expanded kernel sizes may not be a multiple of the size of the supercell, and thus different tiles may span across different supercells 2130. This means that control pattern values may span across different supercells 2130 as well, thus requiring the computation of each control pattern value to be offset by the position of the supercell 2130 to generate the correct control pattern value corresponding to the tile, tiles, or fractions of tiles that the supercell 2130 is to process.

In parallel (on the same clock cycle) to the supercell 2130A-A being configured with the control pattern values, the NIM tile 2125A transmits instructions to the subsequent NIM tile 2125B (the one above or "north" of the current NIM tile 2125) with instructions to configure its supercells 2130B-*. This instruction includes the offset value noted previously, such that the NIM tile 2125B configures the supercells 2130B-* with the correct control pattern values accounting for the offset. This propagation of instructions is repeated until a number of supercells 2130 equal to the size of the input is configured by the NIM tiles 2125.

During each configuration of a supercell(s) 2130 in a superlane, a NIM tile 2125 may only be configuring supercells 2130 for a specific channel of the output (i.e., an output channel). The channel may be specified in the instructions from the ICU 2110. In order to configure the supercells 2130 for additional channels of the output, the ICU 2110 may issue additional instructions each clock cycle to the NIM tiles 2125 to configure the supercells 2130 for additional channels of the output. These instructions include the correct offset values such that the supercells 2130 processing that output layer have the correct row and column position values to be able to generate the correct control pattern values.

At each clock cycle, the instructions from the ICU 2110 are propagated "north" from one NIM tile 2125 to a subsequent NIM tile 2125, while the ICU 2110 continues to issue instructions for supercells along the "east" direction. Thus, over multiple clock cycles, the supercells 2130 are configured in a diagonal "wave." In this fashion, the configuration for the entire set of input channels and output channels are configured after a number of clock cycles. Once this is completed, the input values 2140 are received by the system described here and processed tile by tile by the supercells 2130 in a process similar to the multiply-accumulate operations described above in order to generate the output features 2150.

Figure 22A:
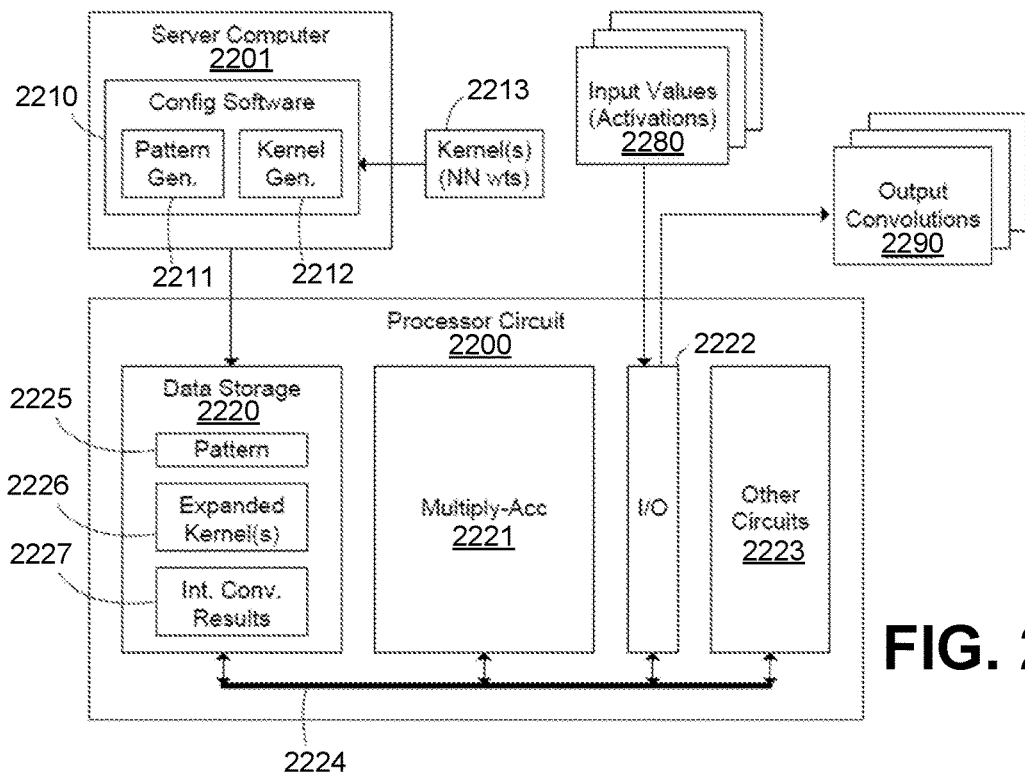
FIG. 22A illustrates an example machine learning processor according to embodiment.
Figure 22B:
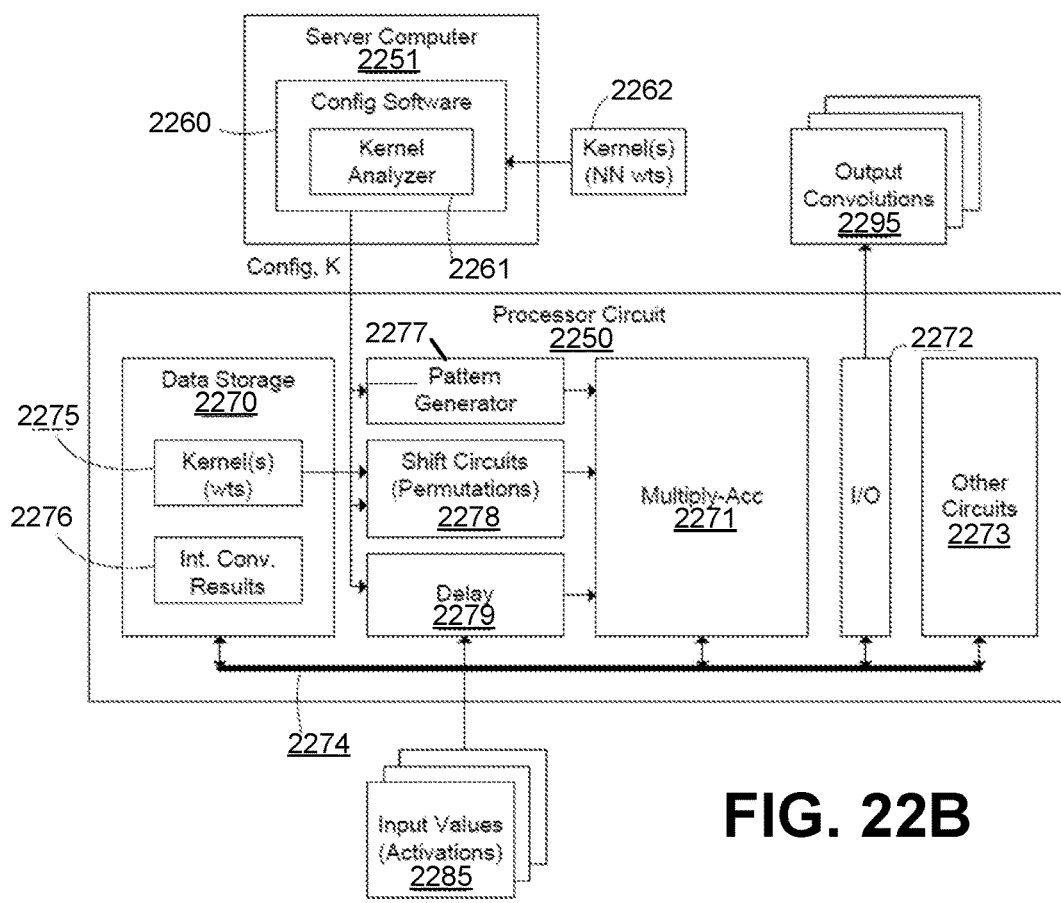
FIG. 22B illustrates an example machine learning processor according to another embodiment.

FIG. 22A illustrates an example machine learning processor according to an embodiment. Features and advantages of the present disclosure include a processor circuit capable of performing convolution operations at very high rates. In this example, a server computer 2201 (or host) may include configuration software 2210, which may receive one or more kernels 2213 to be used to perform convolutions. Processor circuit 2200 may be a machine learning processor, which refers to a circuit that receives input data (e.g., activations, such as images) and applies a kernel (e.g., neural network weights) to the input data as part of a machine learning (aka artificial intelligence) algorithm, for example. In this example, configuration software 2210 (sometimes referred to as a compiler) receives neural network weights 2213. In this example, an expanded kernel or control pattern (or both) may be generated in software. For example, the weights 2213 may be analyzed by a kernel generator 2212 and control pattern generator 2211 to produce a control pattern 2225 and expanded kernel 2226, which may be stored in data storage 2220 in processor circuit 2200, such as memory or register circuits, for example. Input values 2280 may be received in an input/output (I/O) circuit 2222 and coupled to a multiply-accumulator circuit 2276 over a data bus 2224, for example. The expanded kernel 2226 and control pattern 2225 may also be coupled to the multiply-accumulator circuit 2221. Multiply-accumulator circuit 2221 may generate convolution results as described above, for example. In some embodiments, intermediate convolution results 2227 are stored in data storage 2220 and applied against new activation inputs 2280. In other embodiments, convolution results 2290 may be provided as outputs, for example. Alternatively, the convolution results may be processed by other circuits 2223, such as a vector processor (not shown), for example.

FIG. 22A illustrates an example machine learning processor according to another embodiment. In this example, the kernel is analyzed by configuration software but the expanded kernel and control pattern may be generated in hardware. For example, one or more kernels (e.g., neural network weights) 2262 are received in configuration software (e.g., a compiler) 2260 and analyzed by a kernel analyzer component 2261 to produce configuration information for generating an expanded kernel including a value, K, which may be derived from a kernel's size and other information (e.g., the dimensions of the inputs to be processed). Server computer 2251 may send the configuration information and a value of K to processor circuit 2250. In this example, K may correspond to the number tiles in each row of the input 2285, for example, where the tiles are the same size as the kernel. The configuration information may be used to configure control pattern generator 2277 and shifter circuits 2278. The shifter circuits 2278 may be configured to permute the kernel to generate an expanded kernel from one or more kernels 2275 stored in data storage 2270, for example.

In this embodiment, an expanded kernel is generated in hardware. One or more kernels 2275 may be stored in data storage 2270. For example, a kernel may be stored in data storage 2270 as a sequence of values, where a sequence may be accessed from data storage 2270 and coupled to shift circuitry 2278 (e.g., simultaneously). A variety of shift circuits may be used to permute the input sequence and generate an expanded kernel as described above. One example circuit for permuting the sequence to produce an expanded kernel is described in more detail below. The values of the expanded kernel may be loaded into multiply-accumulator 2271, for example. Expanding the kernel in hardware may reduce the amount of data storage required, which may be advantageous in some embodiments.

Embodiments of the disclosure include configuring a K delay circuit in series with multiply-accumulator 2271. In this example, input values 2285 may be coupled to a delay circuit 2279, which may be a programmable delay circuit such as a programmable buffer, for example. In one embodiment, delay 2279 may be configured to have a delay of K, for example, which may be different depending on the size of the kernel and the number of tiles along a dimension of an input array. In one embodiment, delay 2279 may be a first-in first-out (FIFO) circuit where the outputs are delayed versions of the inputs and the delay is set to K, for example. The input values may also be coupled directly to the multiply-accumulator circuit 2271 without being delayed. Accordingly, multiply-accumulator circuit 2271 may receive current input values and input values delayed by K cycles, for example.

Control pattern generator 2277 may generate control signals for implementing a control pattern so that various delayed or undelayed input data values are combined with particular weights as described above. Particular pattern control signals may correspond to the path by which the kernel is applied to each input tile and the path used for flattening the tiles and kernel, for example. The output of the control pattern generator 2277 may be used for selecting various delayed version of the input values as described above, for example.

Accordingly, multiply-accumulator circuit 2271 receives current input values, K delayed input values, an expanded kernel, and control signals for selecting different inputs. As described above, multiply-accumulator 2271 may include additional unit delay circuits for delaying both the current input values and K delayed input values, and control signals from control pattern generator 2277 may be used to select the appropriate input value to be multiplied against different values in the expanded kernel, for example. The output of multiply-accumulator circuit 2271 may be intermediate convolutions 2276, which may be stored in data storage 2270 and convolved with subsequent inputs 2285, or the convolution results may be output at 2295, for example. Alternatively, the convolution results may be processed by other circuits 2273, such as a vector processor (not shown), for example.

Exemplary Computing Machine Architecture

Figure 23:
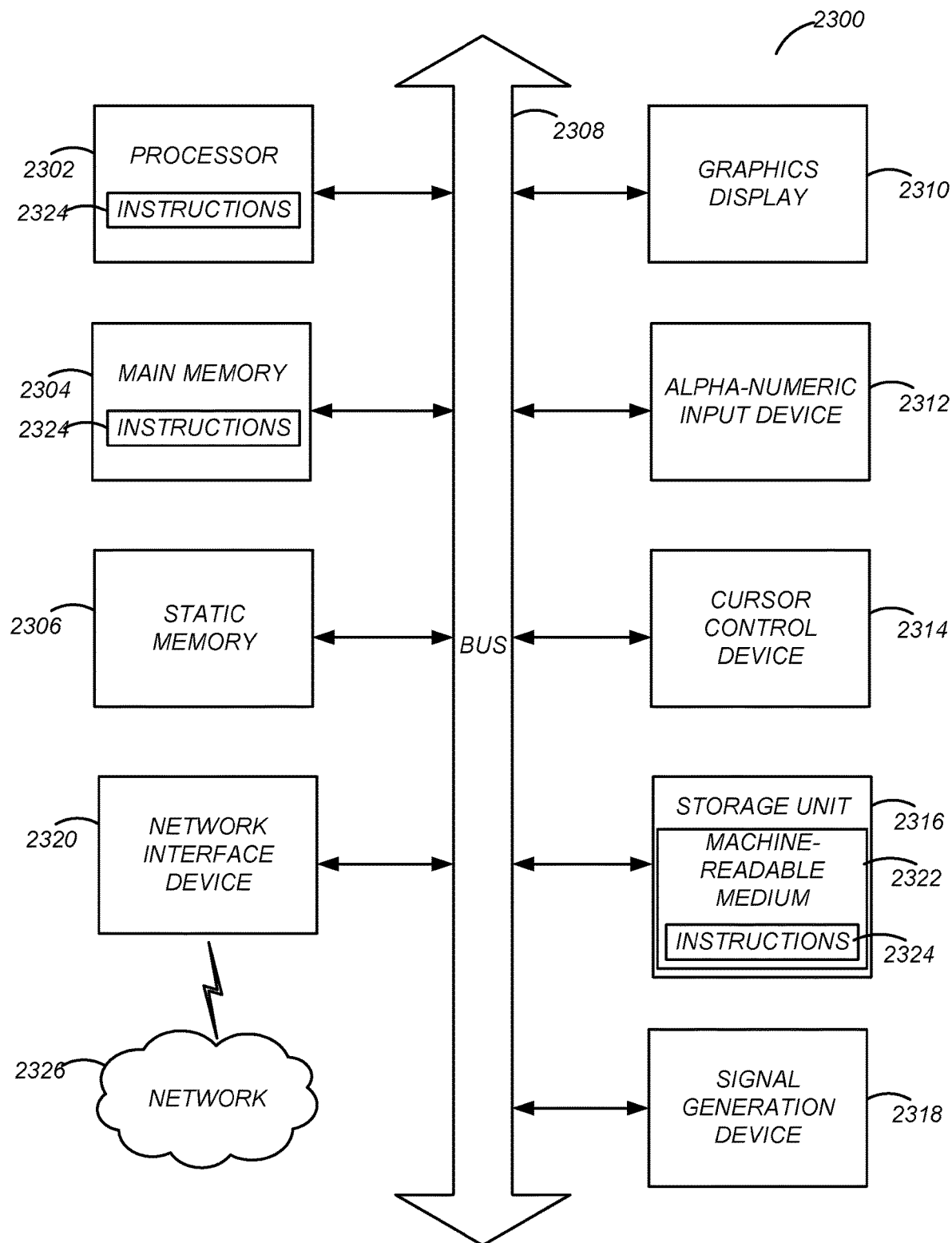
FIG. 23 is a block diagram illustrating components of an example computing machine that is capable of reading instructions from a computer-readable medium and execute them in a processor (or controller).

FIG. 23 is a block diagram illustrating components of an example computing machine that is capable of reading instructions from a computer-readable medium and execute them in a processor (or controller). A computer described herein may include a single computing machine shown in FIG. 23, a virtual machine, a distributed computing system that includes multiple nodes of computing machines shown in FIG. 23, or any other suitable arrangement of computing devices. The computer described herein may be used by any of the elements described in the previous figures to execute the described functions.

By way of example, FIG. 23 shows a diagrammatic representation of a computing machine in the example form of a computer system 2300 within which instructions 2324 (e.g., software, program code, or machine code), which may be stored in a computer-readable medium for causing the machine to perform any one or more of the processes discussed herein. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 23 may correspond to any software, hardware, or combined components shown in the figures above. While FIG. 23 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 2324 that specify actions to be taken by that machine. Further, while only a single machine is illustrated, the term "machine" shall also be taken to include any collection of machines that individually or jointly execute instructions 2324 to perform any one or more of the methodologies discussed herein.

The example computer system 2300 includes one or more processors (generally, processor 2302) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2304, and a static memory 2306, which are configured to communicate with each other via a bus 2308. The computer system 2300 may further include graphics display unit 2310 (e.g., a plasma display panel (PDP), a liquid crystal display (LCD), a projector, or a cathode ray tube (CRT)). The computer system 2300 may also include alphanumeric input device 2312 (e.g., a keyboard), a cursor control device 2314 (e.g., a mouse, a trackball, a joystick, a motion sensor, or other pointing instrument), a storage unit 2316, a signal generation device 2318 (e.g., a speaker), and a network interface device 2320, which also are configured to communicate via the bus 2308.

The storage unit 2316 includes a computer-readable medium 2322 on which is stored instructions 2324 embodying any one or more of the methodologies or functions described herein. The instructions 2324 may also reside, completely or at least partially, within the main memory 2304 or within the processor 2302 (e.g., within a processor's cache memory) during execution thereof by the computer system 2300, the main memory 2304 and the processor 2302 also constituting computer-readable media. The instructions 2324 may be transmitted or received over a network 2326 via the network interface device 2320.

While computer-readable medium 2322 is shown in an example embodiment to be a single medium, the term "computer-readable medium" should be taken to include a single medium or multiple media (e.g., a centralized or distributed database, or associated caches and servers) able to store instructions (e.g., instructions 2324). The computer-readable medium may include any medium that is capable of storing instructions (e.g., instructions 2324) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Certain embodiments are described herein as including logic or a number of components, engines, modules, or mechanisms, for example, as illustrated in the above figures. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 202, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, at a shifter circuit, a kernel;
   for a first dimension of the kernel, generating, by the shifter circuit, a square block of values for each single dimensional vector of the kernel that includes all rotations of that single dimensional vector;
   for each additional dimension of a plurality of additional dimensions of the kernel:
      grouping, by the shifter circuit, blocks of an immediately preceding dimension into sets of blocks, each set of blocks including blocks of the immediately preceding dimension that are aligned along a vector that is parallel to an axis of each additional dimension;
      generating, by the shifter circuit, one or more blocks of values, each block including all rotations of blocks within each of the sets of blocks of the immediately preceding dimension; and
      outputting, by the shifter circuit, the block of values corresponding to a remaining dimension in the additional dimensions of the kernel as an expanded kernel for a convolution with an input tensor at a multiplier circuit coupled to the shifter circuit.

2. The method of claim 1, wherein the kernel is a three-dimensional (3D) matrix, and wherein the expanded kernel comprises a plurality of parallel vectors, each vector of the plurality of parallel vectors being a different rotational permutation of elements in the kernel, the expanded kernel being a square matrix having a size of each dimension equal to a product of values of dimensions of the kernel.

3. The method of claim 1, wherein the kernel is a three-dimensional (3D) matrix, and wherein the expanded kernel comprises:
   a set of first vectors, each first vector having a rotational permutation of first blocks in a group of first blocks, wherein each first block of the group of first blocks corresponds to a second vector of a set of second vectors; and
   a group of second blocks, each second block having a set of third vectors that represent all rotational permutations of a corresponding kernel vector of that second block, with each third vector representing one rotational permutation of the corresponding kernel vector.

4. The method of claim 1, wherein the kernel is a three-dimensional (3D) matrix, and the expanded kernel comprises:
   a set of first vectors, each first vector having a rotational permutation of first blocks in a group of first blocks, each first block of the group of first blocks corresponding to a second vector of a set of second vectors, each second vector corresponding to a second block of a group of second blocks,
   each second block of the group of second blocks corresponding to a vector in the kernel,
   each second block having a set of third vectors that represent all rotational permutations of a corresponding kernel vector of that second block, with each third vector representing one rotational permutation of the corresponding kernel vector,
   each set of second vectors including all rotational permutations of second blocks in the corresponding group of second blocks, and the set of first vectors including all rotational permutations of first blocks of the group of first blocks.

5. The method of claim 1, wherein each single dimensional vector is a unique vector that is at least one of a row of the kernel, a column of the kernel, a diagonal of the kernel, and an aisle of the kernel, and wherein the aisle of the kernel is a vector of the kernel aligned along an axis corresponding to a depth of the kernel.

6. The method of claim 1, wherein the kernel includes multiple kernel filters, and the method further comprising:
   generating a plurality of expanded kernels, each expanded kernel of the plurality of expanded kernels generated from a kernel filter of the kernel, each kernel filter of the kernel including a kernel.

7. The method of claim 6, wherein each expanded kernel of the plurality of expanded kernels are used to convolve one or more channels of a flattened input stream, the flattened input stream being a flattened version of the input tensor.

8. The method of claim 1, wherein an output of the convolution of the expanded kernel with the input tensor having one or more channels generates multiple outputs, each of the multiple outputs combined into a single output activation.

9. The method of claim 1, further comprising:
   accessing a flattened input stream from a buffer, the flattened input stream being a modified version of the input tensor, the flattened input stream having flattened parallel vectors each generated using input values from a corresponding kernel-sized tile of the input tensor;
   accessing a control pattern, the control pattern having delay values that indicate, for each output value position of a target kernel-sized tile of the input tensor, a delay amount for which to access a specified tile of the flattened input stream in the buffer; and
   for each output value position of the target kernel-sized tile of the input tensor, executing, via a hardware accelerated processor, a dot product between a corresponding vector of the expanded kernel and a vector of values selected from the flattened input stream using a set of corresponding delay values from the control pattern selected for the output value position to generate an output value for the output value position.

10. The method of claim 1, wherein the expanded kernel is a two-dimensional square matrix having a length equal to a product of sizes of dimensions of a corresponding kernel that is used to generate the expanded kernel.

11. A system comprising:
    a processor having an expanded kernel generator, the expanded kernel generator configured to:
    receive a kernel;
    for a first dimension of the kernel, generate a square block of values for each single dimensional vector of the kernel that includes all rotations of that single dimensional vector;
    for each additional dimension of a plurality of additional dimensions of the kernel:
       group blocks of an immediately preceding dimension into sets of blocks, each set of blocks including blocks of the immediately preceding dimension that are aligned along a vector that is parallel to an axis of each additional dimension;
       generate one or more blocks of values, each block including all rotations of blocks within each of the sets of blocks of the immediately preceding dimension; and output the block of values corresponding to a remaining dimension in the additional dimensions of the kernel as an expanded kernel for a convolution with an input tensor at the processor.

12. The system of claim 11, wherein the kernel is a three-dimensional (3D) matrix, and wherein the expanded kernel comprises a plurality of parallel vectors, each vector of the plurality of parallel vectors being a different rotational permutation of elements in the kernel, the expanded kernel being a square matrix having a size of each dimension equal to a product of values of dimensions of the kernel.

13. The system of claim 11, wherein the kernel is a three-dimensional (3D) matrix, and wherein the expanded kernel comprises:
a set of first vectors, each first vector having a rotational permutation of first blocks in a group of first blocks, wherein each first block of the group of first blocks corresponds to a second vector of a set of second vectors; and
a group of second blocks, each second block having a set of third vectors that represent all rotational permutations of a corresponding kernel vector of that second block, with each third vector representing one rotational permutation of the corresponding kernel vector.

14. The system of claim 11, wherein the kernel is a three-dimensional (3D) matrix, and the expanded kernel comprises:
a set of first vectors, each first vector having a rotational permutation of first blocks in a group of first blocks,
each first block of the group of first blocks corresponding to a second vector of a set of second vectors, each second vector corresponding to a second block of a group of second blocks,
each second block of the group of second blocks corresponding to a vector in the kernel,
each second block having a set of third vectors that represent all rotational permutations of a corresponding kernel vector of that second block, with each third vector representing one rotational permutation of the corresponding kernel vector,
each set of second vectors including all rotational permutations of second blocks in the corresponding group of second blocks, and the set of first vectors including all rotational permutations of first blocks of the group of first blocks.

15. The system of claim 11, wherein each single dimensional vector is a unique vector that is at least one of a row of the kernel, a column of the kernel, a diagonal of the kernel, and an aisle of the kernel, and wherein the aisle of the kernel is a vector of the kernel aligned along an axis corresponding to a depth of the kernel.

16. The system of claim 11, wherein the kernel includes multiple kernel filters, and wherein the expanded kernel generator is further configured to:
generate a plurality of expanded kernels, each expanded kernel of the plurality of expanded kernels generated from a kernel filter of the kernel, wherein each kernel filter of the kernel including a kernel.

17. The system of claim 16, wherein each expanded kernel of the plurality of expanded kernels are used to convolve one or more channels of a flattened input stream, the flattened input stream being a flattened version of the input tensor.

18. The system of claim 11, wherein an output of the convolution of the expanded kernel with the input tensor having one or more channels generates multiple outputs, each of the multiple outputs combined into a single output activation.

19. The system of claim 11, wherein expanded kernel generator is further configured to:
access a flattened input stream from a buffer, the flattened input stream being a modified version of the input tensor, the flattened input stream having flattened parallel vectors each generated using input values from a corresponding kernel-sized tile of the input tensor;
access a control pattern, the control pattern having delay values that indicate, for each output value position of a target kernel-sized tile of the input tensor, a delay amount for which to access a specified tile of the flattened input stream in the buffer; and
for each output value position of the target kernel-sized tile of the input tensor, execute, via the processor, a dot product between a corresponding vector of the expanded kernel and a vector of values selected from the flattened input stream using a set of corresponding delay values from the control pattern selected for the output value position to generate an output value for the output value position.

20. The system of claim 11, wherein the expanded kernel is a two-dimensional square matrix having a length equal to a product of sizes of dimensions of a corresponding kernel that is used to generate the expanded kernel.

* * * * *

UNITED STATES PATENT AND TRADEMARK OFFICE
CERTIFICATE OF CORRECTION

PATENT NO. : 11,204,976 B2
APPLICATION NO. : 16/686864
DATED : December 21, 2021
INVENTOR(S) : Ross et al.

It is certified that error appears in the above-identified patent and that said Letters Patent is hereby corrected as shown below:

On the Title Page

Item (72), in Column 1, in "Inventors", Line 2, delete "Tom" and insert -- Thomas --, therefor.

Signed and Sealed this
Twenty-third Day of August, 2022

Katherine Kelly Vidal
*Director of the United States Patent and Trademark Office*